US011866328B1

(12) United States Patent
Sheludko et al.

(10) Patent No.: US 11,866,328 B1
(45) Date of Patent: Jan. 9, 2024

(54) SYSTEMS AND METHODS FOR PROCESSING AMMONIA

(71) Applicant: AMOGY Inc., Brooklyn, NY (US)

(72) Inventors: Boris Sheludko, Brooklyn, NY (US); Jongwon Choi, Brooklyn, NY (US); Young Suk Jo, Brooklyn, NY (US); Gregory Robert Johnson, Annandale, NJ (US); Hyunho Kim, Brooklyn, NY (US)

(73) Assignee: AMOGY INC., Brooklyn, NY (US)

( * ) Notice: Subject to any disclaimer, the term of this patent is extended or adjusted under 35 U.S.C. 154(b) by 0 days.

(21) Appl. No.: 18/066,163

(22) Filed: Dec. 14, 2022

Related U.S. Application Data

(60) Provisional application No. 63/427,286, filed on Nov. 22, 2022, provisional application No. 63/418,249, filed on Oct. 21, 2022.

(51) Int. Cl.
*C01B 3/04* (2006.01)
*C01B 3/56* (2006.01)
(Continued)

(52) U.S. Cl.
CPC .............. *C01B 3/047* (2013.01); *B01J 21/04* (2013.01); *B01J 23/10* (2013.01); *B01J 23/42* (2013.01);
(Continued)

(58) Field of Classification Search
CPC ... B01J 21/04; B01J 23/10; B01J 23/42; B01J 23/44; B01J 23/462; C01B 3/047;
(Continued)

(56) References Cited

U.S. PATENT DOCUMENTS 2,601,221 A * 6/1952 Cohn ................. C01B 21/02
252/375
3,689,042 A 9/1972 Pere et al.
(Continued)

FOREIGN PATENT DOCUMENTS

AU 2020267318 A1 6/2021
CA 2676027 A1 8/2008
(Continued)

OTHER PUBLICATIONS

Co-pending U.S. Appl. No. 18/133,388, inventors Sheludko; Boris et al., filed Apr. 11, 2023.
(Continued)

*Primary Examiner* — Patricia L. Hailey
(74) *Attorney, Agent, or Firm* — Wilson Sonsini Goodrich & Rosati

(57) ABSTRACT

A method for ammonia decomposition is disclosed. The method may comprise providing a catalyst comprising an alumina support and a layer adjacent to the support. The layer comprises a perovskite phase comprising aluminum, cerium, and lanthanum, an oxide of at least one of an alkali metal and a rare earth metal, and an active metal. The method may comprise bringing the catalyst in contact with ammonia at a temperature of from about 400° C. to 700° C. to generate a reformate stream comprising hydrogen and nitrogen at an ammonia conversion efficiency of at least about 70%. The method may further comprise directing the hydrogen to a fuel cell to generate electricity. The method may further comprise generating heat for a reformer comprising the catalyst by combustion of gases or by electricity generated from hydrogen.

48 Claims, 20 Drawing Sheets

(51) Int. Cl.
  *B01J 21/04* (2006.01)
  *B01J 23/10* (2006.01)
  *B01J 23/46* (2006.01)
  *B01J 23/42* (2006.01)
  *H01M 8/22* (2006.01)
  *H01M 8/0606* (2016.01)
  *H01M 8/04014* (2016.01)
  *B01J 23/44* (2006.01)

(52) U.S. Cl.
  CPC ............ *B01J 23/44* (2013.01); *B01J 23/462* (2013.01); *C01B 3/56* (2013.01); *H01M 8/04022* (2013.01); *H01M 8/0606* (2013.01); *H01M 8/222* (2013.01); *C01B 2203/042* (2013.01); *C01B 2203/0465* (2013.01); *C01B 2203/066* (2013.01)

(58) Field of Classification Search
  CPC ................ C01B 3/56; C01B 2203/042; C01B 2203/0465; C01B 2203/066; H01M 8/04022; H01M 8/0606; H01M 8/222
  USPC ................... 429/423; 502/302, 330, 332–334
  See application file for complete search history.

(56) References Cited

U.S. PATENT DOCUMENTS

| | | |
|---|---|---|
| 4,155,986 A | 5/1979 | Gladden |
| 5,055,282 A | 10/1991 | Shikada et al. |
| 5,912,198 A | 6/1999 | Feitelberg et al. |
| 6,350,540 B1 | 2/2002 | Sugita et al. |
| 6,555,084 B2 | 4/2003 | Ohtsuka |
| 6,936,363 B2 | 8/2005 | Kordesch et al. |
| 6,984,750 B2 | 1/2006 | Chaturvedi et al. |
| 7,071,239 B2 | 7/2006 | Ortego, Jr. et al. |
| 7,157,166 B2 | 1/2007 | Vajo |
| 7,160,360 B2 | 1/2007 | Wu et al. |
| 7,220,699 B2 | 5/2007 | Chellappa |
| 7,276,214 B2 | 10/2007 | Johnston et al. |
| 7,282,467 B2 | 10/2007 | Huisman et al. |
| 7,294,425 B2 | 11/2007 | Hodge et al. |
| 7,374,838 B2 | 5/2008 | Gallagher |
| 7,439,273 B2 | 10/2008 | Woods et al. |
| 7,569,294 B2 | 8/2009 | Graham et al. |
| 7,662,435 B2 | 2/2010 | Chellappa et al. |
| 7,670,587 B2 | 3/2010 | Porter et al. |
| 7,731,918 B2 | 6/2010 | Chellappa |
| 7,763,086 B2 | 7/2010 | Woods et al. |
| 7,803,496 B2 | 9/2010 | Koyama et al. |
| 7,862,631 B2 | 1/2011 | Burch et al. |
| 8,043,767 B2 | 10/2011 | Benson |
| 8,166,926 B2 | 5/2012 | Sasaki et al. |
| 8,440,357 B2 | 5/2013 | Hossain et al. |
| 8,617,265 B2 | 12/2013 | Chellappa |
| 8,664,148 B2 | 3/2014 | Brey et al. |
| 8,795,918 B2 | 8/2014 | Shimomura |
| 8,877,407 B2 | 11/2014 | Akiyama |
| 8,900,420 B2 | 12/2014 | Veeraraghavan et al. |
| 8,916,300 B2 | 12/2014 | McElroy et al. |
| 8,921,000 B2 | 12/2014 | Takeshita et al. |
| 8,932,773 B2 | 1/2015 | Nakanishi et al. |
| 8,961,923 B2 | 2/2015 | Grannell et al. |
| 9,023,542 B2 | 5/2015 | Kaneko et al. |
| 9,105,891 B2 | 8/2015 | Nagaosa |
| 9,163,541 B2 | 10/2015 | Kumagai et al. |
| 9,172,106 B2 | 10/2015 | Berning |
| 9,187,321 B2 | 11/2015 | Fuse et al. |
| 9,236,624 B2 | 1/2016 | Page et al. |
| 9,341,111 B2 | 5/2016 | Hikazudani et al. |
| 9,359,270 B2 | 6/2016 | Daly et al. |
| 9,359,271 B2 | 6/2016 | LeViness et al. |
| 9,506,400 B2 | 11/2016 | Tange et al. |
| 9,670,063 B2 | 6/2017 | David et al. |
| 9,737,869 B2 | 8/2017 | Kamata et al. |
| 9,819,040 B2 | 11/2017 | Littau |
| 9,861,951 B2 | 1/2018 | Vu |
| 9,884,770 B2 | 2/2018 | Takeshima |
| 9,896,332 B2 | 2/2018 | Hikazudani et al. |
| 9,958,211 B2 | 5/2018 | Vernon |
| 10,166,526 B2 | 1/2019 | Hamada et al. |
| 10,322,940 B2 | 6/2019 | Hosono et al. |
| 10,449,506 B2 | 10/2019 | Kamata et al. |
| 10,450,192 B2 | 10/2019 | Finkelshtain et al. |
| 10,478,805 B2 | 11/2019 | Hinokuma et al. |
| 10,596,551 B2 | 3/2020 | Sharma et al. |
| 10,830,125 B2 | 11/2020 | Pomar |
| 10,875,002 B2 | 12/2020 | Patel et al. |
| 10,906,804 B2 | 2/2021 | Li et al. |
| 10,914,212 B1 | 2/2021 | Bargman et al. |
| 10,919,025 B2 | 2/2021 | Li et al. |
| 10,961,890 B2 | 3/2021 | Sung et al. |
| 11,014,809 B2 | 5/2021 | Miura |
| 11,038,181 B2 | 6/2021 | Kandlikar |
| 11,065,591 B2 | 7/2021 | Speth et al. |
| 11,084,012 B2 | 8/2021 | Jiang et al. |
| 11,084,719 B2 | 8/2021 | Andersen et al. |
| 11,110,434 B2 | 9/2021 | Jiang et al. |
| 11,117,809 B2 | 9/2021 | Hojlund Nielsen |
| 11,148,955 B2 | 10/2021 | Gorval et al. |
| 11,149,662 B2 | 10/2021 | Heggen |
| 11,156,168 B2 | 10/2021 | Nose et al. |
| 11,161,739 B2 | 11/2021 | Gray |
| 11,167,732 B1 | 11/2021 | Cohen et al. |
| 11,287,089 B1 | 3/2022 | Cohen et al. |
| 11,305,250 B2 | 4/2022 | Verykios et al. |
| 11,309,568 B2 | 4/2022 | Achrai et al. |
| 11,374,246 B2 | 6/2022 | Luo et al. |
| 11,437,637 B2 | 9/2022 | Ikemoto et al. |
| 11,465,114 B2 | 10/2022 | Jo et al. |
| 11,539,063 B1 | 12/2022 | Choi et al. |
| 2002/0028171 A1* | 3/2002 | Goetsch ............. B01J 35/04 429/513 |
| 2003/0015093 A1 | 1/2003 | Wegeng et al. |
| 2003/0189037 A1 | 10/2003 | Kochman et al. |
| 2005/0281735 A1* | 12/2005 | Chellappa ............. C07C 1/041 423/648.1 |
| 2006/0048808 A1 | 3/2006 | Ruckman et al. |
| 2006/0112636 A1 | 6/2006 | Chellappa et al. |
| 2006/0121322 A1 | 6/2006 | Haas et al. |
| 2007/0190389 A1 | 8/2007 | Hinsenkamp et al. |
| 2007/0221060 A1 | 9/2007 | Song |
| 2007/0254204 A1 | 11/2007 | Shin et al. |
| 2008/0145733 A1 | 6/2008 | Asazawa et al. |
| 2008/0171255 A1 | 7/2008 | Brantley et al. |
| 2010/0060404 A1 | 3/2010 | Raiser et al. |
| 2011/0136027 A1 | 6/2011 | Chen et al. |
| 2012/0088168 A1 | 4/2012 | Pledger |
| 2012/0121488 A1 | 5/2012 | Comrie |
| 2013/0140295 A1 | 6/2013 | Yoshioka et al. |
| 2013/0156687 A1 | 6/2013 | Araki et al. |
| 2013/0189603 A1 | 7/2013 | Sakamoto et al. |
| 2014/0005041 A1 | 1/2014 | Jia et al. |
| 2014/0154163 A1 | 6/2014 | Andersen et al. |
| 2014/0287911 A1 | 9/2014 | Wang et al. |
| 2014/0356738 A1 | 12/2014 | Bell et al. |
| 2016/0167962 A1 | 6/2016 | Hikazudani et al. |
| 2016/0339387 A1 | 11/2016 | Ikoma et al. |
| 2017/0070088 A1 | 3/2017 | Berntsen et al. |
| 2017/0087541 A1 | 3/2017 | Andersen et al. |
| 2018/0015443 A1 | 1/2018 | Finkelshtain et al. |
| 2020/0032676 A1 | 1/2020 | Nose et al. |
| 2020/0062590 A1 | 2/2020 | McCullough et al. |
| 2020/0099072 A1 | 3/2020 | Ikemoto et al. |
| 2020/0123006 A1 | 4/2020 | Speth et al. |
| 2020/0197889 A1 | 6/2020 | Jo et al. |
| 2020/0266469 A1 | 8/2020 | Kojima et al. |
| 2020/0269208 A1 | 8/2020 | Way et al. |
| 2020/0346937 A1 | 11/2020 | Beach et al. |
| 2020/0388869 A1 | 12/2020 | Galbiati |
| 2020/0398240 A1 | 12/2020 | Jiang et al. |
| 2020/0403258 A1 | 12/2020 | Luo et al. |
| 2021/0001311 A1 | 1/2021 | Wu et al. |
| 2021/0113983 A1 | 4/2021 | Mortensen et al. |

(56) References Cited

U.S. PATENT DOCUMENTS

| | | | |
|---|---|---|---|
| 2021/0178377 A1 | 6/2021 | Khatiwada et al. |
| 2021/0178378 A1 | 6/2021 | Khatiwada et al. |
| 2021/0234179 A1 | 7/2021 | Klein et al. |
| 2021/0237046 A1 | 8/2021 | Gascon et al. |
| 2021/0245139 A1 | 8/2021 | Seabaugh et al. |
| 2021/0395082 A1 | 12/2021 | Iwai |
| 2021/0395101 A1 | 12/2021 | Giddey et al. |
| 2021/0395883 A1 | 12/2021 | Dip |
| 2022/0002151 A1 | 1/2022 | Katikaneni et al. |
| 2022/0090576 A1 | 3/2022 | Sia |
| 2022/0119250 A1 | 4/2022 | Shin et al. |
| 2022/0154646 A1 | 5/2022 | Araki et al. |
| 2022/0158202 A1 | 5/2022 | Nishibayashi et al. |
| 2022/0162490 A1 | 5/2022 | Jo et al. |
| 2022/0162989 A1 | 5/2022 | Cocks et al. |
| 2022/0162999 A1 | 5/2022 | Cocks et al. |
| 2022/0163002 A1 | 5/2022 | Takeuchi |
| 2022/0195919 A1 | 6/2022 | Akbari et al. |
| 2022/0205415 A1 | 6/2022 | Takeuchi et al. |
| 2022/0212172 A1 | 7/2022 | Song et al. |
| 2022/0234886 A1 | 7/2022 | Yamazaki et al. |
| 2022/0347644 A1 | 11/2022 | Jo et al. |
| 2022/0362748 A1 | 11/2022 | Jo et al. |
| 2022/0364505 A1 | 11/2022 | Kim et al. |
| 2022/0389864 A1 | 12/2022 | Jo et al. |
| 2022/0395810 A1 | 12/2022 | Sheludko et al. |
| 2022/0395812 A1 | 12/2022 | Sheludko et al. |
| 2022/0403775 A1 | 12/2022 | Jo et al. |
| 2023/0001377 A1 | 1/2023 | Jo et al. |
| 2023/0053230 A1 | 2/2023 | Jo et al. |
| 2023/0053549 A1 | 2/2023 | Choi et al. |
| 2023/0055180 A1 | 2/2023 | Choi et al. |
| 2023/0055949 A1 | 2/2023 | Choi et al. |
| 2023/0118083 A1 | 4/2023 | Jo et al. |
| 2023/0123946 A1 | 4/2023 | Mann |

FOREIGN PATENT DOCUMENTS

| | | | | | |
|---|---|---|---|---|---|
| CA | 3132213 | A1 | 9/2020 | | |
| CN | 1946470 | A | 4/2007 | | |
| CN | 101172575 | A | 5/2008 | | |
| CN | 106517092 | A | 3/2017 | | |
| CN | 110265688 | A | 9/2019 | | |
| CN | 210528460 | U | 5/2020 | | |
| CN | 111332447 | A | 6/2020 | | |
| CN | 210973870 | U | 7/2020 | | |
| CN | 112901339 | A | 6/2021 | | |
| CN | 113048469 | A | 6/2021 | | |
| CN | 113058595 | A | 7/2021 | | |
| CN | 113058610 | A | 7/2021 | | |
| CN | 113074046 | A | 7/2021 | | |
| CN | 113181957 | A | 7/2021 | | |
| CN | 213651846 | U | 7/2021 | | |
| CN | 213726378 | U | 7/2021 | | |
| CN | 213738601 | U | 7/2021 | | |
| CN | 113198476 | A | 8/2021 | | |
| CN | 113202660 | A | 8/2021 | | |
| CN | 113289693 | A | 8/2021 | | |
| CN | 213943062 | U | 8/2021 | | |
| CN | 213976966 | U | 8/2021 | | |
| CN | 214059903 | U | 8/2021 | | |
| CN | 214060653 | U | 8/2021 | | |
| CN | 113332987 | A | 9/2021 | | |
| CN | 113363545 | A | 9/2021 | | |
| CN | 113451615 | A | 9/2021 | | |
| CN | 113540541 | A | 10/2021 | | |
| CN | 214399815 | U | 10/2021 | | |
| CN | 214406970 | U | 10/2021 | | |
| CN | 214406981 | U | 10/2021 | | |
| CN | 214486811 | U | 10/2021 | | |
| CN | 113604813 | A | 11/2021 | | |
| CN | 113666334 | A | 11/2021 | | |
| CN | 113694922 | A | 11/2021 | | |
| CN | 214611516 | U | 11/2021 | | |
| CN | 214716493 | U | 11/2021 | | |
| CN | 214753865 | U | 11/2021 | | |
| CN | 214880199 | U | 11/2021 | | |
| CN | 214959115 | U | 11/2021 | | |
| CN | 214959751 | U | 11/2021 | | |
| CN | 113775924 | A | 12/2021 | | |
| CN | 113788134 | A | 12/2021 | | |
| CN | 113864783 | A | 12/2021 | | |
| CN | 214990264 | U | 12/2021 | | |
| CN | 215002336 | U | 12/2021 | | |
| CN | 215066412 | U | 12/2021 | | |
| CN | 215364901 | U | 12/2021 | | |
| CN | 113896168 | A | 1/2022 | | |
| CN | 215578650 | U | 1/2022 | | |
| CN | 215592611 | U | 1/2022 | | |
| DE | 102017011833 | A1 | 6/2019 | | |
| DK | 201900097 | U3 | 3/2020 | | |
| EP | 2070141 | B1 | 12/2012 | | |
| EP | 2774202 | B1 | 8/2015 | | |
| EP | 1868941 | B9 | 2/2017 | | |
| EP | 3028990 | B1 | 8/2017 | | |
| EP | 3059206 | B1 | 8/2017 | | |
| EP | 3258524 | A1 | 12/2017 | | |
| EP | 2715847 | B1 | 1/2019 | | |
| EP | 3448803 | A1 | 3/2019 | | |
| EP | 3632543 | A1 | 4/2020 | | |
| EP | 2332646 | B1 | 7/2020 | | |
| EP | 3409354 | B1 | 9/2021 | | |
| EP | 3878806 | A1 | 9/2021 | | |
| EP | 3015164 | B1 | 2/2022 | | |
| EP | 3981054 | A1 | 4/2022 | | |
| EP | 3981739 | A1 | 4/2022 | | |
| EP | 4017947 | A1 | 6/2022 | | |
| IN | 394309 | B | 4/2022 | | |
| JP | H11253759 | A | * 9/1999 | ............ | B01D 53/94 |
| JP | 2005145748 | A | 6/2005 | | |
| JP | 3940551 | B2 | 7/2007 | | |
| JP | 2008153091 | A | 7/2008 | | |
| JP | 2009035458 | A | 2/2009 | | |
| JP | 2010195642 | A | 9/2010 | | |
| JP | 4666301 | B2 | 4/2011 | | |
| JP | 2012005926 | A | 1/2012 | | |
| JP | 5263677 | B2 | 8/2013 | | |
| JP | 5272762 | B2 | 8/2013 | | |
| JP | 5272767 | B2 | 8/2013 | | |
| JP | 5321230 | B2 | 10/2013 | | |
| JP | 5346693 | B2 | 11/2013 | | |
| JP | 5352343 | B2 | 11/2013 | | |
| JP | 5371542 | B2 | 12/2013 | | |
| JP | 5380233 | B2 | 1/2014 | | |
| JP | 5389525 | B2 | 1/2014 | | |
| JP | 5426201 | B2 | 2/2014 | | |
| JP | 5430224 | B2 | 2/2014 | | |
| JP | 5755160 | B2 | 7/2015 | | |
| JP | 5810710 | B2 | 11/2015 | | |
| JP | 5811494 | B2 | 11/2015 | | |
| JP | 2016131065 | A | 7/2016 | | |
| JP | 2016198720 | A | 12/2016 | | |
| JP | 6308844 | B2 | 4/2018 | | |
| JP | 2018076214 | A | 5/2018 | | |
| JP | 6381131 | B2 | 8/2018 | | |
| JP | 6482022 | B2 | 3/2019 | | |
| JP | 2019053854 | A | 4/2019 | | |
| JP | 2019177381 | A | 10/2019 | | |
| JP | 6604501 | B2 | 11/2019 | | |
| JP | 2020040860 | A | 3/2020 | | |
| JP | WO2018221701 | A1 | 4/2020 | | |
| JP | 6706277 | B2 | 6/2020 | | |
| JP | 6778370 | B2 | 11/2020 | | |
| JP | 6789080 | B2 | 11/2020 | | |
| JP | 2020183337 | A | 11/2020 | | |
| JP | 2020196646 | A | 12/2020 | | |
| JP | 2020197169 | A | 12/2020 | | |
| JP | 6850449 | B2 | 3/2021 | | |
| JP | 6866570 | B2 | 4/2021 | | |
| JP | 2021095300 | A | 6/2021 | | |
| JP | 2021110463 | A | 8/2021 | | |
| JP | 6929045 | B2 | 9/2021 | | |
| JP | 6938186 | B2 | 9/2021 | | |
| JP | 2021127861 | A | 9/2021 | | |

(56) References Cited

FOREIGN PATENT DOCUMENTS

| | | |
|---|---|---|
| JP | 2021128904 A | 9/2021 |
| JP | 2021130100 A | 9/2021 |
| JP | 2021161006 A | 10/2021 |
| JP | 2021161921 A | 10/2021 |
| JP | 2021173232 A | 11/2021 |
| JP | 6996181 B2 | 2/2022 |
| JP | 7036318 B2 | 3/2022 |
| JP | 7074103 B2 | 5/2022 |
| JP | 7076930 B2 | 5/2022 |
| JP | 7079068 B2 | 6/2022 |
| KR | 20040039951 A | 5/2004 |
| KR | 101173456 B1 | 8/2012 |
| KR | 101388755 B1 | 4/2014 |
| KR | 101689356 B1 | 12/2016 |
| KR | 101768078 B1 | 8/2017 |
| KR | 102159237 B1 | 9/2020 |
| KR | 102174654 B1 | 11/2020 |
| KR | 102219136 B1 | 2/2021 |
| KR | 102247199 B1 | 5/2021 |
| KR | 102254196 B1 | 5/2021 |
| KR | 102256907 B1 | 5/2021 |
| KR | 102303094 B1 | 9/2021 |
| KR | 102304381 B1 | 9/2021 |
| KR | 102304406 B1 | 9/2021 |
| KR | 102309466 B1 | 10/2021 |
| KR | 102315763 B1 | 10/2021 |
| KR | 20210136381 A | 11/2021 |
| KR | 102335322 B1 | 12/2021 |
| KR | 20220005829 A | 1/2022 |
| KR | 102392578 B1 | 5/2022 |
| KR | 20220057717 A | 5/2022 |
| KR | 20220093960 A | 7/2022 |
| KR | 20220094475 A | 7/2022 |
| NL | 2017963 B1 | 6/2018 |
| TW | I274604 B | 3/2007 |
| WO | WO-9840311 A1 | 9/1998 |
| WO | WO-0183108 A1 | 11/2001 |
| WO | WO-0187770 A1 * | 11/2001 ............ B01J 12/007 |
| WO | WO-0208117 A1 | 1/2002 |
| WO | WO-02071451 A2 | 9/2002 |
| WO | WO-02086987 A2 * | 10/2002 .......... B01J 19/2475 |
| WO | WO-2005091418 A2 | 9/2005 |
| WO | WO-2005099885 A1 | 10/2005 |
| WO | WO-2006113451 A2 | 10/2006 |
| WO | WO-2006134419 A2 | 12/2006 |
| WO | WO-2007119262 A2 | 10/2007 |
| WO | WO-2008024089 A2 | 2/2008 |
| WO | WO-2008088319 A2 | 7/2008 |
| WO | WO-2009098452 A2 | 8/2009 |
| WO | WO-2009116679 A1 | 9/2009 |
| WO | WO-2010116874 A3 | 4/2011 |
| WO | WO-2011107279 A1 | 9/2011 |
| WO | WO-2012039183 A1 | 3/2012 |
| WO | WO-2013057473 A1 | 4/2013 |
| WO | WO-2013063169 A1 | 5/2013 |
| WO | WO-2013122849 A1 | 8/2013 |
| WO | WO-2013142123 A1 | 9/2013 |
| WO | WO-2014054277 A1 | 4/2014 |
| WO | WO-2015044691 A1 | 4/2015 |
| WO | WO-2015074127 A1 | 5/2015 |
| WO | WO-2016013652 A1 | 1/2016 |
| WO | WO-2016051633 A1 | 4/2016 |
| WO | WO-2017099143 A1 | 6/2017 |
| WO | WO-2017186614 A1 | 11/2017 |
| WO | WO-2018185663 A1 | 10/2018 |
| WO | WO-2018198635 A1 | 11/2018 |
| WO | WO-2019032591 A1 | 2/2019 |
| WO | WO-2019038251 A1 | 2/2019 |
| WO | WO-2021063795 A1 | 4/2021 |
| WO | WO-2021156626 A1 | 8/2021 |
| WO | WO-2021168226 A1 | 8/2021 |
| WO | WO-2021172545 A1 | 9/2021 |
| WO | WO-2021177359 A1 | 9/2021 |
| WO | WO-2021221943 A1 | 11/2021 |
| WO | WO-2021225254 A1 | 11/2021 |
| WO | WO-2021228428 A1 | 11/2021 |
| WO | WO-2021241841 A1 | 12/2021 |
| WO | WO-2021260108 A1 | 12/2021 |
| WO | WO-2022010178 A1 | 1/2022 |
| WO | WO-2022055225 A1 | 3/2022 |
| WO | WO-2021257944 A9 | 4/2022 |
| WO | WO-2022070597 A1 | 4/2022 |
| WO | WO-2022076341 A1 | 4/2022 |
| WO | WO-2022079435 A1 | 4/2022 |
| WO | WO-2022106568 A1 | 5/2022 |
| WO | WO-2022119376 A1 | 6/2022 |
| WO | WO-2022129294 A1 | 6/2022 |
| WO | WO-2022153059 A1 | 7/2022 |
| WO | WO-2022153060 A1 | 7/2022 |
| WO | WO-2022153061 A1 | 7/2022 |
| WO | WO-2022153718 A1 | 7/2022 |
| WO | WO-2022153719 A1 | 7/2022 |
| WO | WO-2022153720 A1 | 7/2022 |
| WO | WO-2022241260 A1 | 11/2022 |
| WO | WO-2022261488 A1 | 12/2022 |
| WO | WO-2023022995 A1 | 2/2023 |

OTHER PUBLICATIONS

Notice of Allowance dated Feb. 27, 2023 for U.S. Appl. No. 17/886,219.
Notice of Allowance dated Mar. 1, 2023 for U.S. Appl. No. 18/065,915.
Notice of Allowance dated Apr. 6, 2023 for U.S. Appl. No. 17/886,219.
Co-pending U.S. Appl. No. 17/401,993, inventors Jo; Young Suk et al., filed Aug. 13, 2021.
Co-pending U.S. Appl. No. 17/501,090, inventor Mann; Maxwell Spencer, filed Oct. 14, 2021.
Co-pending U.S. Appl. No. 17/968,109, inventors Choi; Jongwon et al., filed Oct. 18, 2022.
Co-pending U.S. Appl. No. 17/968,125, inventors Choi; Jongwon et al., filed Oct. 18, 2022.
Co-pending U.S. Appl. No. 17/968,211, inventors Choi; Jongwon et al., filed Oct. 18, 2022.
Co-pending U.S. Appl. No. 17/974,885, inventors Jo; Young Suk et al., filed Oct. 27, 2022.
Co-pending U.S. Appl. No. 17/974,997, inventors Jo; Young Suk et al., filed Oct. 27, 2022.
Co-pending U.S. Appl. No. 17/975,184, inventors Jo; Young Suk et al., filed Oct. 27, 2022.
Co-pending U.S. Appl. No. 18/065,915, inventors Sheludko; Boris et al., filed Dec. 14, 2022.
Co-pending U.S. Appl. No. 18/081,512, inventors Jo; Young Suk et al., filed Dec. 14, 2022.
Gallucci, M. The Ammonia Solution: Ammonia engines and fuel cells in cargo ships could slash their carbon emissions. IEEE Spectrum. 58(3): 44-50. Mar. 2021. doi: 10.1109/MSPEC.2021.9370109.
Hansgen, et al. Using first principles to predict bimetallic catalysts for the ammonia decomposition reaction. Nat Chem. Jun. 2010;2(6):484-489. doi: 10.1038/nchem.626. Epub Apr. 25, 2010.
International search report with written opinion dated Sep. 21, 2022 for PCT/US2022/029264.
International search report with written opinion dated Oct. 18, 2022 for PCT/US2022/033088.
Kumar S. Heat Exchanger—Types, Working, Construction. https://marinerspoint.in/working-of-heatexchanger/2020/11/, Nov. 4, 2020, 9 pages.
Notice of Allowance dated Aug. 11, 2022 for U.S. Appl. No. 17/589,287.
Notice of Allowance dated Sep. 14, 2022 for U.S. Appl. No. 17/589,287.
Office action dated Jan. 24, 2023 for U.S. Appl. No. 17/886,219.
Office action dated Jun. 2, 2022 for U.S. Appl. No. 17/589,287.

\* cited by examiner

SYSTEMS AND METHODS FOR PROCESSING AMMONIA

CROSS-REFERENCE TO RELATED APPLICATIONS

This application claims the benefit of U.S. Provisional Application No. 63/418,249, filed Oct. 21, 2022, and U.S. Provisional Application No. 63/427,286, filed Nov. 22, 2022, each of which is incorporated herein by reference in its entirety for all purposes.

BACKGROUND

Various systems may be operated using a fuel source. The fuel source may have a specific energy corresponding to an amount of energy stored or extractable per unit mass of fuel. The fuel source may be provided to the various systems to enable such systems to generate energy and/or deliver power (e.g., for movement or transportation purposes).

Ammonia is an attractive alternative energy fuel source, especially because it does not contain carbon, and therefore does not emit carbon when used as a fuel. Ammonia can be burned in an internal combustion engine, although a supplemental fuel (e.g., hydrogen) is often necessary to provide acceptable combustion characteristics. Ammonia can also be used as a hydrogen carrier, and it can undergo catalytic oxidation to yield nitrogen and hydrogen (which may then be used to power a fuel cell). However, many alternative fuels (including ammonia) have lower energy density or conversion efficiency than conventional fossil fuels, resulting in some reluctance of the markets to move to cleaner power plants.

SUMMARY

Hydrogen can be leveraged as a clean energy source to power various systems. Hydrogen can provide a distinct advantage over other types of fuel such as diesel, gasoline, or jet fuel, which have specific energies of about 45 megajoules per kilogram (MJ/kg) (heat), or lithium-ion batteries, which have a specific energy of about 0.95 MJ/kg (electrical). In contrast, hydrogen has a specific energy of over 140 MJ/kg (heat). As such, 1 kg of hydrogen can provide the same amount of energy as about 3 kg of gasoline or kerosene. Thus, hydrogen as a fuel source can help to reduce the amount of fuel (by mass) needed to provide a comparable amount of energy as other traditional sources of fuel. Further, systems that use hydrogen as a fuel source (e.g., as a combustion reactant) generally produce benign or nontoxic byproducts such as water while producing minimal or near zero harmful emissions such as carbon dioxide or nitrous oxide emissions, thereby reducing the environmental impacts of various systems (e.g., modes of transportation) that use hydrogen as a fuel source.

Recognized herein are various limitations with conventional catalysts used to extract hydrogen from ammonia (e.g., through an ammonia decomposition process or reaction). Ammonia decomposition may also be referred to as ammonia cracking, ammonia reforming, or ammonia dissociation. Ammonia decomposition can be a highly structure-dependent reaction, and the ability to control the morphology and/or the physical or chemical properties of the active metal nanoparticles used to decompose ammonia molecules may be limited when using conventional catalyst fabrication methods. As such, more efficient use of active metal nanoparticles is difficult, and conventional catalysts often comprise an increased active metal nanoparticle content. Further, the nanoparticles may not be highly dispersed, which can reduce the efficiency of the catalyst. Conventional catalysts may also exhibit low heat transfer rates, which is undesirable for endothermic ammonia decomposition reactions. Conventional catalysts may also lack stability at high temperatures, in the presence of impurities in industrial grade ammonia, or under mechanical perturbations, and may not be able to withstand harsh reaction conditions or maintain the necessary physical and chemical properties needed to crack ammonia more efficiently. Some conventional catalysts may comprise bead, extrudate or pellet type catalyst supports, but when catalyst materials are compressed into these form factors, the inside materials of the pellet may not be fully utilized, which can be wasteful and inefficient. As used herein, the morphology of the active metal nanoparticle support may correspond to a size, shape, aspect ratio, pore structure, pore size, pore shape, pore volume, pore density, pore size distribution, grain structure, grain size, grain shape, crystal structure, flake size, or layered structure of the one or more active metal nanoparticles. As used herein, the physical or chemical property of the active metal nanoparticles may comprise a size, a size distribution, an aspect ratio, a facet distribution, an Arrhenius acidity or basicity, a Lewis acidity or basicity, or a hydrophilicity or hydrophobicity of the one or more active metal nanoparticles.

The present disclosure provides systems and methods for addressing at least the abovementioned shortcomings noted for conventional catalysts. Some aspects of the present disclosure are directed to improved catalyst materials, related systems and methods for fabricating such improved catalyst materials, and methods of using such improved catalyst materials. The improved catalyst materials may exhibit an improved morphology and/or physical or chemical property for the active metal nanoparticles used to facilitate ammonia decomposition. The physical or chemical property may comprise a surface chemistry or property of the one or more active metal nanoparticles. The improved catalyst materials may also exhibit an improved level of dispersion of the active metal nanoparticles. The improved catalyst materials may further maintain favorable physical and chemical properties under harsh reaction conditions, and may exhibit high thermal stability and improved heat transfer rates to enable efficient endothermic ammonia decomposition reactions.

The present disclosure further provides methods for fabricating catalysts comprising an improved material composition, active metal nanoparticle morphology, surface chemistry or property, and/or support-metal interactions. The fabrication methods disclosed herein may be implemented to produce catalyst materials with high thermal stability and improved heat transfer characteristics. The catalyst materials produced using the methods of the present disclosure can be used to decompose ammonia efficiently at lower reaction temperatures for a longer duration, compared to conventional catalysts, and may extract a greater amount of hydrogen per unit weight or volume of ammonia while using a lower concentration of active metals (e.g., lower ruthenium contents).

The present disclosure further provides one or more catalysts for processing ammonia. The one or more catalysts may comprise, for example, an improved pore structure and active metal nanoparticle morphology and/or surface chemistry or property. The catalyst materials of the present disclosure may have high thermal stability and improved heat transfer characteristics. The catalyst materials may be used to decompose ammonia efficiently at lower reaction temperatures, and may extract a greater amount of hydrogen per unit weight or volume of ammonia while using a lower concentration of active metals. In some cases, for the same amount of catalyst material used, more hydrogen may be produced. In some cases, the hydrogen may be produced at lower reaction temperatures.

In some aspects, the present disclosure relates to a method of ammonia decomposition comprising: (a) providing a catalyst, comprising: a support comprising alumina and a layer adjacent to the support, wherein the layer comprises the support material doped with an oxide of at least one of an alkali metal and a rare earth metal; wherein the layer comprises aluminum, cerium, and lanthanum; and one or more active metal adjacent to the layer, wherein the one or more active metal comprises Ru, Pt, or Pd; and wherein the concentration of the active metal is at least about 0.1, and not more than about 15 wt %; and (b) bringing the catalyst in contact with ammonia at a temperature of at least about 400° C. and not more than about 700° C. to generate a reformate stream comprising hydrogen and nitrogen at an ammonia conversion efficiency of at least about 70% and at most about 99.9%.

In some instances, the catalyst comprises a layer comprising theta alumina ($\theta$-alumina) or gamma alumina ($\gamma$-alumina).

In some instances, the catalyst comprises a layer comprising La at a concentration of at least about 1 and not more than about 20 mol % with respect to the layer and support.

In some cases, the catalyst comprises a molar ratio of La and Ce comprising at least about 50:50 and not more than about 90:10.

In some cases, the alkali metal comprises K or Cs, and the catalyst comprises a layer comprising a molar ratio of K or Cs to the one or more active metal comprising at least about 1:2 and not more than about 6:1.

In some instances, the active metal comprises Ru, the catalyst comprises a concentration of Ru comprising at least about 0.5 wt % and not more than about 5 wt %, with respect to the weight of the catalyst.

In some cases, the method comprises bringing ammonia in contact with the catalyst of the present disclosure at a space velocity of at least about 1 and not more than about 100 liters of ammonia per hour per gram of catalyst.

In some instances, the method comprises generating electricity by providing hydrogen produced by the catalyst of the present disclosure to at least one fuel cell, wherein the at least one fuel cell comprises a Proton Exchange Membrane Fuel Cell (PEMFC), a Solid Oxide Fuel Cell (SOFC), a Molten Carbonate Fuel Cell (MCFC), an Alkaline Fuel Cell (AFC), an Alkaline Membrane Fuel Cell (AMFC), or a Phosphoric Acid Fuel Cell (PAFC).

In some instances, the method comprises contacting the catalyst of the present disclosure with ammonia to generate the reformate stream is an auto-thermal reforming process so that at least part of the reformate stream provides heat for the auto-thermal reforming process.

In some cases, the at least part of the reformate stream is at least one of: (1) combusted to generate the heat, or (2) converted by hydrogen-to-electricity conversion to generate the heat, thereby providing the heat for the auto-thermal reforming process.

In some instances, undecomposed ammonia in the reformate stream is removed by an ammonia filter, wherein the ammonia filter comprises an adsorbent, a membrane separation module, or an ammonia scrubber.

In some instances, a pressure swing adsorption (PSA) module is used to remove nitrogen from the reformate stream.

In some cases, (b) comprises directing the ammonia to a first reformer to generate the reformate stream; wherein the method comprises combusting the reformate stream in a combustion heater to heat a second reformer; and directing additional ammonia to the second reformer to generate additional hydrogen for the reformate stream, wherein a first portion of the reformate stream is combusted to heat the second reformer.

In some instances, the first reformer is heated using at least one of an electrical heater or combustion of the reformate stream.

In some cases, (b) comprises directing the ammonia to a reformer at an ammonia flow rate to generate the reformate stream, wherein the method further comprises: combusting a first portion of the reformate stream with oxygen at an oxygen flow rate in a combustion heater to heat the reformer; and processing a second portion of the reformate stream in a hydrogen processing module; and based at least in part on a stimulus, performing one or more of: (i) changing the ammonia flow rate; (ii) changing a percentage of the reformate stream that is the first portion of the reformate stream; (iii) changing a percentage of the reformate stream that is the second portion of the reformate stream; or (iv) changing the oxygen flow rate.

In some instances, the stimulus comprises: (x) a change in an amount of the hydrogen used by the hydrogen processing module; (y) a temperature of the reformer being outside of a target temperature range; or (z) a change in an amount or concentration of ammonia in the reformate stream.

In some cases, the change in an amount of the hydrogen used by the hydrogen processing module is a projected change in the amount of the hydrogen used by the hydrogen processing module.

In some instances, the hydrogen processing module comprises a fuel cell and the fuel cell provides an anode off-gas comprising hydrogen to the combustion heater.

In some cases, (b) comprises directing the ammonia to a reformer at an ammonia flow rate to generate the reformate stream, wherein the method further comprises: combusting a first portion of the reformate stream with oxygen at an oxygen flow rate in a combustion heater to heat the reformer; processing a second portion of the reformate stream in a hydrogen processing module; measuring a temperature in the reformer or the combustion heater; and based at least in part on the measured temperature being outside of a target temperature range of the reformer or the combustion heater, performing one or more of: (i) changing the ammonia flow rate; (ii) changing the oxygen flow rate; (iii) changing a percentage of the reformate stream that is the second portion of the reformate stream; (iv) changing a percentage of the reformate stream that is the first portion of the reformate stream; or (v) changing a percentage of the reformate stream that is directed out of the combustion heater.

In some instances, the hydrogen processing module comprises a fuel cell and the fuel cell provides an anode off-gas comprising hydrogen to the combustion heater.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and descriptions are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
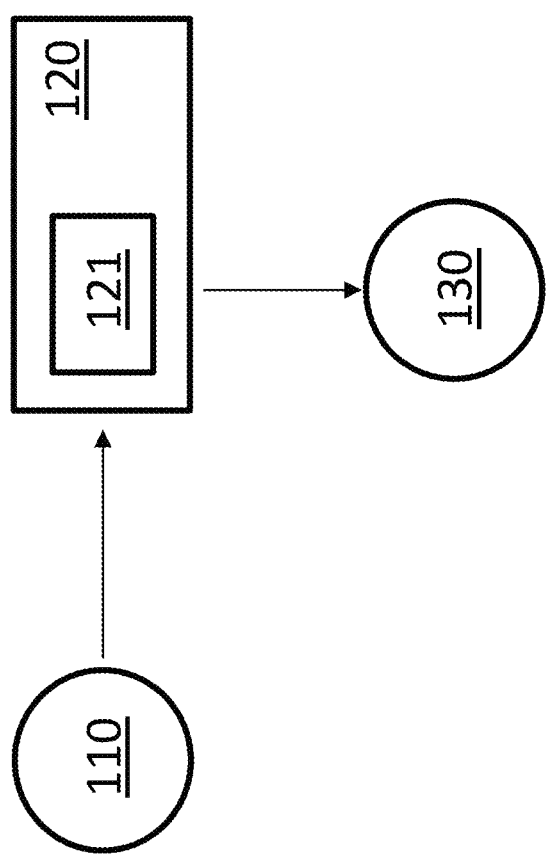
FIG. 1 schematically illustrates an example system for processing ammonia to generate hydrogen fuel, in accordance with some embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It should be understood that any of the embodiments, configurations and/or components described with respect to a particular figure may be combined with other embodiments, configurations, and/or components described with respect to other figures.

The terminology used herein is for the purpose of describing particular embodiments only and is not intended to be limiting of example embodiments. As used herein, the singular forms "a," "an" and "the" are intended to include the plural forms as well (and vice versa), unless the context clearly indicates otherwise. For example, "a," "an," and "the" may be construed as "one or more."

The present disclosure may be divided into sections using headings. The headings should not be construed to limit the present disclosure, and are merely present for organization and clarity purposes.

Whenever the term "at least", "at least about", "greater than", "greater than about", "greater than or equal to", or "greater than or equal to about" precedes the first numerical value in a series of two or more numerical values, the term "at least", "at least about", "greater than", "greater than about", "greater than or equal to", or "greater than or equal to about" applies to each of the numerical values in that series of numerical values. For example, greater than or equal to about 1, 2, or 3 is equivalent to greater than or equal to about 1, greater than or equal to about 2, or greater than or equal to about 3.

Whenever the term "no more than", "no more than about", "not more than", "not more than about", "less than", "less than about", "less than or equal to", or "less than or equal to about" precedes the first numerical value in a series of two or more numerical values, the term "no more than", "no more than about", "not more than", "not more than about", "less than", "less than about", "less than or equal to", or "less than or equal to about" applies to each of the numerical values in that series of numerical values. For example, less than or equal to about 3, 2, or 1 is equivalent to less than or equal to about 3, less than or equal to about 2, or less than or equal to about 1.

The terms "at least one of" and "one or more of" may be used interchangeably. The expressions "at least one of A and B" and "at least one of A or B" may be construed to mean at least A, at least B, or at least A and B (i.e., a set comprising A and B, which set may include one or more additional elements). The term "A and/or B" may be construed to mean only A, only B, or both A and B.

The expressions "at least about A, B, and C" and "at least about A, B, or C" may be construed to mean at least about A, at least about B, or at least about C. The expressions "at most about A, B, and C" and "at most about A, B, or C" may be construed to mean at most about A, at most about B, or at most about C.

The expression "between about A and B, C and D, and E and F" may be construed to mean between about A and about B, between about C and about D, and between about E and about F. The expression "between about A and B, C and D, or E and F" may be construed to mean between about A and about B, between about C and about D, or between about E and about F.

The expression "about A to B and C to D" may be construed to mean between about A and about B and between about C and about D. The expression "about A to B or C to D" may be construed to mean between about A and about B or between about C and about D.

The terms "decompose", "dissociate", "reform", "crack", "react", "convert", "dehydrogenate", "extract", "strip", and "break down," and their grammatical variations, may be construed interchangeably. For example, the expression "decomposition of ammonia" may be interchangeable with "dissociation of ammonia," "reforming of ammonia," "cracking of ammonia," "conversion of ammonia," etc.

The terms "reformer", "reactor", "cracker", "breaker", "decomposer", "dissociator", "converter", "dehydrogenator", "extractor" and "stripper" may be construed interchangeably. For example, the expression "the catalyst in the reformer" may be interchangeable with "the catalyst in the reactor", "the catalyst in the cracker", "the catalyst in the dehydrogenator", etc.

The terms "ammonia conversion" and "ammonia conversion efficiency," and their grammatical variations, may be construed as a fraction of ammonia that is converted to hydrogen and nitrogen, and may be construed interchangeably. For example, "ammonia conversion" or "ammonia conversion efficiency" of 90% may represent 90% of ammonia being converted to hydrogen and nitrogen.

The term "turnover frequency" may be construed as the forward reaction rate of ammonia decomposition, measured either as ammonia consumption or hydrogen production normalized per unit catalyst per unit time (Amount$_{ammonia\ or\ hydrogen}$ Amount$_{cat}^{-1}$ time$^{-1}$). Amount$_{ammonia\ or\ hydrogen}$ may be measured as mmol$_{ammonia\ or\ hydrogen}$, mol$_{ammonia\ or\ hydrogen}$, g$_{ammonia\ or\ hydrogen}$, or mL$_{ammonia\ or\ hydrogen}$. Amount$_{cat}$ may be measured as g$_{cat}$, g$_{active\ metal}$, g$_{surface\ active\ metal}$, g$_{active\ sites}$, mol$_{cat}$, mol$_{active\ metal}$, mol$_{surface\ active\ metal}$, or mol$_{active\ sites}$. Time may be measured as seconds, minutes, hours or days.

In some cases, the term "turnover frequency" may be construed as the net reaction rate of ammonia decomposition (i.e., forward reaction minus reverse reaction), measured either as ammonia consumption or hydrogen production normalized per unit catalyst per unit time (Amount$_{ammonia\ or\ hydrogen}$ Amount$_{cat}^{-1}$ time$^{-1}$). Amount$_{ammonia\ or\ hydrogen}$ may be measured as mmol$_{ammonia\ or\ hydrogen}$, mol$_{ammonia\ or\ hydrogen}$, g$_{ammonia\ or\ hydrogen}$, or mL$_{ammonia\ or\ hydrogen}$. Amount$_{cat}$ may be measured as g$_{cat}$, g$_{active\ metal}$, g$_{surface\ active\ metal}$, g$_{active\ sites}$, mol$_{cat}$, mol$_{active\ metal}$, mol$_{surface\ active\ metal}$, or mol$_{active\ sites}$. Time may be measured as seconds, minutes, hours or days.

The terms "production rate" and "consumption rate" may be construed as the production or consumption of a compound involved in the reaction, measured as a net rate=forward reaction−reverse reaction. The unit for "production rate" and "consumption rate" may be Amount$_{ammonia\ or\ hydrogen}$ Amount$_{cat}^{-1}$ time$^{-1}$. Amount$_{ammonia\ or\ hydrogen}$ may be measured as mmol$_{ammonia\ or\ hydrogen}$, mol$_{ammonia\ or\ hydrogen}$, g$_{ammonia\ or\ hydrogen}$, or mL$_{ammonia\ or\ hydrogen}$. Amount$_{cat}$ may be measured as g$_{cat}$, g$_{active\ metal}$, g$_{surface\ active\ metal}$, g$_{active\ sites}$, mol$_{cat}$, mol$_{active\ metal}$, mol$_{surface\ active\ metal}$, or mol$_{active\ sites}$. Time may be measured as seconds, minutes, hours or days.

The term "space velocity" may be defined as the volumetric flow rate of the feed gas (e.g. ammonia) relative to the mass of the catalyst material, and may be expressed in units of liters (or milliliters) per hour of gas per gram of catalyst, e.g., L hr$^{-1}$ g$^{-1}$, L$_{gas}$ hr$^{-1}$ g$_{cat}^{-1}$, L$_{NH3}$ hr$^{-1}$ g$_{cat}^{-1}$, L$_{ammonia}$ hr$^{-1}$ g$_{cat}^{-1}$, mL hr$^{-1}$ g$^{-1}$, mL$_{gas}$ hr$^{-1}$ g$_{cat}^{-1}$, mL$_{NH3}$ hr$^{-1}$ g$_{cat}^{-1}$, or mL$_{ammonia}$ hr$^{-1}$ g$_{cat}^{-1}$.

The term "auto-thermal reforming" may be construed as a condition where an ammonia decomposition reaction (2NH$_3$→N$_2$+3H$_2$; an endothermic reaction) is heated by a hydrogen combustion reaction (2H$_2$+O$_2$→2H$_2$O; an exothermic reaction) using at least part of the hydrogen produced by the ammonia decomposition reaction itself.

In some cases, the term "auto-thermal reforming" may be construed as a condition where an ammonia decomposition reaction is heated by a hydrogen combustion reaction using at least part of hydrogen produced by the ammonia decomposition reaction itself, electrical heating, or a combination of both (which may result in an overall positive electrical and/or chemical energy output). For example, if "auto-thermal reforming" is performed using a hydrogen combustion reaction and/or electrical heating, the hydrogen produced from the ammonia decomposition reaction may be enough to provide the hydrogen combustion reaction with combustion fuel, and/or to provide electrical energy for the electrical heating via hydrogen-to-electricity conversion devices (e.g., fuel cell, combustion engine, etc.).

In some cases, the hydrogen provided for the hydrogen combustion reaction and/or the electrical heating may or may not use the hydrogen from the ammonia decomposition reaction (for example, the hydrogen may be provided by a separate hydrogen source, the electricity may be provided from batteries or a grid, etc.).

In some cases, "auto-thermal reforming" may be construed as a condition where an ammonia decomposition reaction is heated by a combustion reaction (e.g., ammonia combustion, hydrocarbon combustion, etc.), electrical heating, or a combination of both, which may result in an overall positive electrical and/or chemical energy output. For example, if "auto-thermal reforming" is performed using a combustion reaction and/or electrical heating, the chemical energy (e.g., lower heating value) from the hydrogen produced from the ammonia decomposition reaction may be higher than the combustion fuel chemical energy (e.g., lower heating value), and/or may be enough to provide electrical energy for the electrical heating via hydrogen-to-electricity conversion devices (e.g., fuel cell, combustion engine, etc.).

The examples described herein are provided as embodiments to demonstrate the effectiveness of the disclosed catalyst compositions and methods of fabrication. Each of these catalysts were prepared according to the detailed preparation methods described herein.

In one aspect, the present disclosure provides a method of fabricating a catalyst for ammonia processing or decomposition, comprising: (a) providing a catalyst support; (b) thermally, chemically, physically, or electrochemically processing the catalyst support to alter a pore characteristic of the catalyst support; (c) depositing a composite support material on the catalyst support, wherein the composite support material comprises a morphology or a surface chemistry or property; and (d) depositing one or more active metals on at least one of the composite support material and the catalyst support, wherein the one or more active metals comprise one or more nanoparticles configured to conform to the morphology or the surface chemistry or property of the composite support material when subjected to a thermal or chemical treatment, thereby improving one or more active sites on the nanoparticles for ammonia processing or decomposition.

In some cases, the morphology comprises a pore structure, a pore size, a pore shape, a pore volume, a pore density, a pore size distribution, a grain structure, a grain size, a grain shape, a crystal structure, a flake size, or a layered structure. In some instances, the surface chemistry or property comprises an elemental composition, an Arrhenius acidity or basicity, a Lewis acidity or basicity, a surface hydroxyl group density, or a hydrophilicity or hydrophobicity. In some cases, thermally, chemically, physically, or electrochemically processing the catalyst support comprises subjecting the catalyst support to one or more thermal, chemical, physical, or electrochemical processes or treatments to improve one or more pores or a surface chemistry or property of the catalyst support. In some instances, improving the one or more pores comprises (i) modifying a size of the one or more pores, (ii) modifying a pore volume of the catalyst support, (iii) modifying the pore size distribution or (iv) modifying a pore density of the catalyst support. In some cases, improving the surface chemistry or property comprises modifying (i) an Arrhenius acidity or basicity, (ii) a Lewis acidity or basicity, (iii) a surface hydroxyl group density, or (iv) a surface hydrophilicity or hydrophobicity.

In some cases, the composite support material is deposited using physical vapor deposition or chemical vapor deposition. In some instances, the morphology or the surface chemistry or property of the composite support material conforms to a morphology or a surface chemistry or property of the catalyst support. In some cases, the one or more active metals are deposited using physical vapor deposition or chemical vapor deposition. In some instances, the method may further comprise thermally or chemically activating the one or more active metals. In some cases, thermally, physically, chemically, or electrochemically activating the one or more active metals induces a growth of one or more nanoparticles of the active metals. In some instances, the one or more nanoparticles are configured to grow while conforming to the morphology or the surface chemistry or property of the composite support material when thermally, physically, electrochemically, or chemically activated. In some cases, the method may further comprise combining the catalyst with one or more promoters to modify or improve a morphology, an active site, an electron density, an Arrhenius acidity or basicity, a Lewis acidity or basicity, or an electron state of the catalyst.

In some embodiments, the one or more promoters comprise sodium (Na), potassium (K), rubidium (Rb), cesium (Cs), magnesium (Mg), calcium (Ca), strontium (Sr), or barium (Ba). In some embodiments, the one or more active metals comprise ruthenium (Ru), nickel (Ni), rhodium (Rh), iridium (Ir), cobalt (Co), molybdenum (Mo), iron (Fe), platinum (Pt), chromium (Cr), palladium (Pd), or copper (Cu). In some embodiments, the catalyst support comprises aluminum oxide ($Al_2O_3$), magnesium oxide (MgO), cerium dioxide ($CeO_2$), silicon dioxide ($SiO_2$), yttrium oxide ($Y_2O_3$), zirconium oxide ($ZrO_2$), one or more zeolites, titanium dioxide ($TiO_2$), lanthanum oxide ($La_2O_3$), chromium oxide ($Cr_2O_3$), or calcium oxide (CaO). In some cases, the composite support material comprises a carbon-based material, a boron-based material, or a metal oxide. In some instances, the carbon-based material comprises graphite, activated carbon (AC), one or more carbon nanotubes (CNT), one or more carbon nanofibers (CNF), graphene oxide (GO), one or more carbon nanoribbons, or reduced graphene oxide (rGO). In some cases, the boron-based material comprises hexagonal boron nitride (hBN), boron nitride nanotubes (BNNT), or boron nitride nanosheets (BNNS). In some instances, the metal oxide comprises aluminum oxide ($Al_2O_3$), titanium dioxide ($TiO_2$), magnesium oxide (MgO), lanthanum oxide ($La_2O_3$), cerium dioxide ($CeO_2$), yttrium oxide ($Y_2O_3$), one or more $CeO_2$ nanotubes, nanorods or nanocubes, mesoporous silica, zirconium dioxide ($ZrO_2$), chromium oxide ($Cr_2O_3$), or calcium oxide (CaO). In some cases, the composite support material may include yttria-stabilized zirconia (YSZ), hydrotalcite ($Mg_2Al$-LDO), a metal organic framework (MOF) (e.g., MIL-101), a zeolitic imidazolate framework (ZIF), an alkaline amide ($NaNH_2$, $Ca(NH_2)_2$, $Mg(NH_2)_2$), an inorganic electride (e.g., $Cl_2A7$:e-), Halloysite nanotubes (HNT), ABO3 Perovskite, AB2O4 Spinel, a mesoporous silicate (e.g., MCM-41), or any combination thereof.

In some embodiments, the method may further comprise thermally, physically, chemically or electrochemically treating a surface of the catalyst support material to improve a pore structure or a surface chemistry or property of the catalyst support material. In some cases, the one or more ammonia molecules are configured to bind or attach to the one or more active sites on the active metals for decomposition of the one or more ammonia molecules. In some instances, the positions, orientations, and/or density of the one or more active sites are determined based at least in part on the morphology and/or surface chemistry or property. In some cases, the catalyst support comprises a bead, a pellet, a powder, a thin film, a monolith, a foam, a reformer wall, a heating element, one or more wires, a mesh, engineered or corrugated sheet, or a porous solid material form factor. In some instances, the pore characteristic comprises a pore structure, a pore size, a pore size distribution, a pore shape, a pore volume, or a pore density. In some cases, the method may comprise altering a pore density of the catalyst support. In some instances, the method may comprise increasing the pore density of the catalyst support.

In another embodiment, the present disclosure provides a catalyst for ammonia processing, comprising: a catalyst support comprising one or more modified pore characteristics generated by thermal, physical, chemical, or electrochemical processing of the catalyst support; a composite support material provided on the catalyst support, wherein the composite support material comprises a morphology or a surface chemistry or property; and one or more active metals provided on or embedded in at least one of the composite support material and the catalyst support, wherein the one or more active metals comprise one or more nanoparticles configured to conform to the morphology or the surface chemistry or property of the composite support material when thermally, physically, chemically or electrochemically activated, thereby improving one or more active sites on the nanoparticles for ammonia processing or decomposition.

In some cases, the composite support material is deposited using physical vapor deposition or chemical vapor deposition. In some instances, the morphology or the surface chemistry or property of the composite support material conforms to a morphology or a surface chemistry or property of the catalyst support. In some cases, the one or more active metals are deposited using physical vapor deposition or chemical vapor deposition. In some instances, the one or more active metals are configured to conform to the morphology or the surface chemistry or property of the composite support material when thermally or chemically activated. In some cases, the one or more active metals are configured to grow when thermally, physically, chemically, or electrochemically activated. In some instances, the one or more nanoparticles are configured to grow while conforming to the morphology or the surface chemistry or property of the composite support material.

In some instances, the morphology or the surface chemistry or property is generated or improved by thermally, physically, chemically, or electrochemically treating a surface of the catalyst support material. In some cases, the one or more active metal nanoparticles comprise one or more active sites to which one or more ammonia molecules are configured to attach or bind for decomposition of the one or more ammonia molecules. In some instances, the positions, orientations, or density of the one or more active sites are determined based at least in part on the morphology or surface chemistry or property. In some instances, the catalyst support comprises a bead, a pellet, a powder, a thin film, a monolith, a foam, reformer wall, heating element, wires, mesh, engineered or corrugated sheet, or a porous solid material form factor.

Reformer

In an aspect, the present disclosure provides a system for processing a source material. The system may comprise one or more reformers. The one or more reformers may comprise one or more catalysts. The one or more catalysts may be used to process a source material. The one or more catalysts may be improved to enhance the processing of the source material. The source material may comprise, for example, ammonia ($NH_3$). The source material may be processed to generate a fuel source. The fuel source may comprise, for example, hydrogen and/or nitrogen. The fuel source may be provided to one or more hydrogen fuel cells, which may be configured to use the fuel source to generate electrical energy. Such electrical energy may be used to power various systems, vehicles, and/or devices.

FIG. 1 schematically illustrates a block diagram of an example method for processing a source material to produce electrical energy. A source material 110 may be provided to a reformer 120. The source material 110 may comprise a compound comprising one or more hydrogen molecules. The compound may be, for example, ammonia or $NH_3$. In some cases, the compound may comprise a hydrocarbon $C_xH_y$. The source material 110 may be provided to a reformer 120. The source material 110 may be in a gaseous state and/or a liquid state. The reformer 120 may be designed or configured to process the source material 110 using one or more catalysts 121 to extract, produce, or release a fuel source 130 from the source material 110. In some cases, processing the source material 110 may comprise heating the one or more catalysts 121 to extract, produce, or release the fuel source 130 from the source material 110. The fuel source 130 may comprise, but may not be limited to, hydrogen and/or nitrogen. The fuel source 130 may be provided to one or more fuel cells or one or more combustion engines for the generation of electrical energy or mechanical work. Such electrical energy may be used to power various system, vehicles, and/or devices, including, for example, terrestrial, aerial, or aquatic vehicles.

In some cases, the fuel source 130 may be provided to various chemical or industrial processes, including, but not limited to, steel or iron processing, combustion engines, combustion turbines, hydrogen storage, hydrogen for chemical processes, hydrogen fueling stations, etc. In some cases, the fuel source 130 can be supplied as a pilot, auxiliary, or main fuel to the combustion engines or combustion turbines.

As described above, one or more fuel cells may be used to generate electrical energy from the fuel source 130, which may comprise, but may not be limited to, hydrogen and/or nitrogen. In some cases, the one or more fuel cells may generate electricity through an electrochemical reaction between fuels. The fuels may comprise the hydrogen and/or the nitrogen in the fuel source 130. The electricity generated by the fuel cells may be used to power one or more systems, vehicles, or devices. In some cases, excess electricity generated by the fuel cells may be stored in one or more energy storage units (e.g., batteries) for future use. In some instances, the fuel cells may be provided as part of a larger fuel cell system. The fuel cell system may comprise an electrolysis module. Electrolysis of a byproduct of the one or more fuel cells (e.g., water) may allow the byproduct to be removed, through decomposition of the byproduct into one or more constituent elements (e.g., oxygen and/or hydrogen). Electrolysis of the byproduct can also generate additional fuel (e.g., hydrogen) for the fuel cell.

As described above, one or more combustion engines may be used to generate electrical energy or mechanical work from the fuel source 130, which may comprise, but may not be limited to, hydrogen and/or nitrogen. In some cases, the one or more combustion engines may generate mechanical work through combustion of one or more fuels. The mechanical work can be converted to electrical energy by one or more electrical generators. The fuels may comprise the hydrogen and/or the nitrogen in the fuel source 130. The electricity or mechanical work generated by the combustion engines may be used to power one or more systems, vehicles, or devices. In some cases, excess electricity or mechanical work generated by the combustion engines may be stored in one or more energy storage units (e.g., batteries) for future use. In some instances, the combustion engine may be provided as part of a larger engine or power generation system. The combustion engine system may comprise a combustion chamber. Electrolysis of a byproduct of the one or more combustion engines (e.g., water) may allow the byproduct to be removed, for example, through decomposition of the byproduct into one or more constituent elements (e.g., oxygen and/or hydrogen). Electrolysis of the byproduct can also generate additional fuel (e.g., hydrogen) for the combustion engine.

Figure 2:
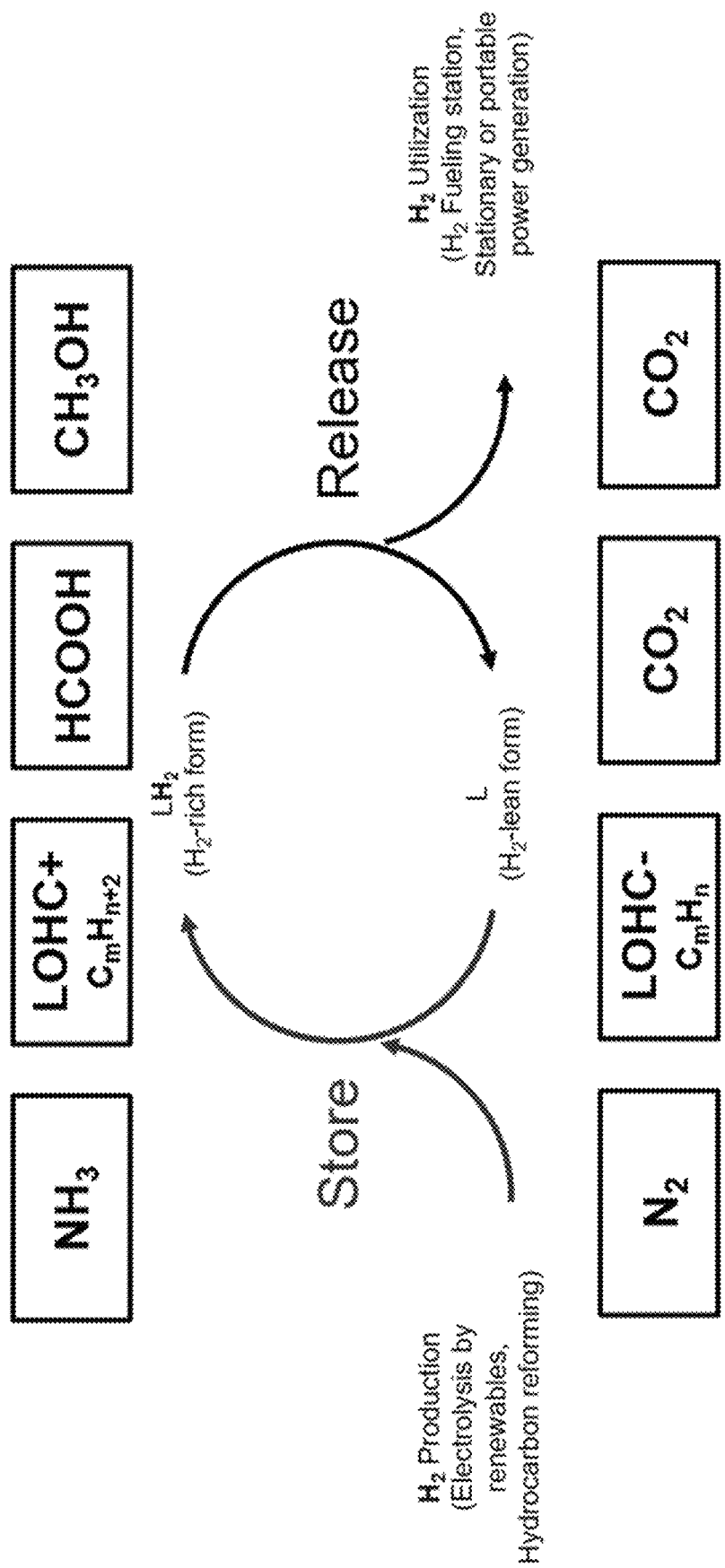
FIG. 2 schematically illustrates an example method of hydrogen storage using liquid chemicals, in accordance with some embodiments.

FIG. 2 schematically illustrates an example method of hydrogen storage using liquid chemicals, in accordance with some embodiments. Hydrogen, whether produced by electrolysis of renewables or through hydrocarbon reforming, may be stored using one or more liquid chemicals. In some cases, the one or more liquid chemicals may comprise, for example, ammonia, a liquid organic hydrogen carrier (LOHC), formic acid (HCOOH), or methanol ($CH_3OH$). The hydrogen may be stored in a hydrogen-rich form or a hydrogen-lean form. The one or more liquid chemicals comprising the hydrogen may be processed as described herein to release the hydrogen stored in the liquid chemicals. Once released, the hydrogen may be used for power generation (e.g., stationary or portable power generation), or may be provided to a hydrogen storage, hydrogen fueling station, or hydrogen fueling site.

In some cases, ammonia may be used as a hydrogen carrier. A hydrogen carrier may comprise a fluid or liquid chemical that can be used to store hydrogen. The use of ammonia as an energy carrier provides the benefits of hydrogen fuel (e.g., carbon-free and high volumetric energy density) once the ammonia is broken down into hydrogen, while taking advantage of (a) ammonia's greater volumetric density compared to both gaseous and liquid hydrogen and (b) the ability to transport ammonia at standard temperatures and pressures without requiring complex and highly pressurized storage vessels like those typically used for storing and transporting hydrogen.

In some cases, hydrogenation may be used to store the hydrogen in one or more fluids or liquid chemicals (e.g., ammonia). Hydrogenation may refer to the treatment of materials or substances with molecular hydrogen ($H_2$) to add one or more pairs of hydrogen atoms to various constituent compounds (e.g., one or more unsaturated compounds) making up the materials or substances. Hydrogenation may be performed using a catalyst, which can allow the reaction to occur under normal conditions of temperature and/or pressure. In some cases, the Haber-Bosch process (an artificial nitrogen fixation process) may be used to produce ammonia. The process may be used to convert atmospheric nitrogen ($N_2$) to ammonia ($NH_3$) by a reaction with hydrogen (e.g., $H_2$ produced or obtained by electrolysis) using a metal catalyst under various reaction temperatures and pressures:

As described above, the Haber-Bosch process may be used to produce ammonia, which can be used as a hydrogen carrier. Using ammonia as a hydrogen carrier may provide several benefits, including easy storage at relatively standard conditions (0.8 MPa, 20° C. in liquid form), and convenient transportation. Ammonia also has a relatively high hydrogen content (17.7 wt %, 120 grams of $H_2$ per liter of liquid ammonia). Further, the production of ammonia using the Haber-Bosch process can be powered by renewable energy sources (e.g., solar photovoltaic or solar-thermal), which makes the production process environmentally safe and friendly, as $N_2$ is the only byproduct and there is no further emission of $CO_2$. Once the ammonia is produced, it may be processed (e.g., decomposed using a catalyst) to release the hydrogen through a dehydrogenation process. The released hydrogen may then be provided to one or more fuel cells, such as a proton-exchange membrane fuel cell (PEMFC) having a proton-conducting polymer electrolyte membrane, a polymer electrolyte membrane (PEM) fuel cell, a solid-oxide fuel cell (SOFC), or one or more combustion engines having one or more combustion chambers. PEMFCs may have relatively low operating temperatures and/or pressure ranges (e.g., from about 50 to 100° C.). A proton exchange membrane fuel cell can be used to transform the chemical energy liberated during the electrochemical reaction of hydrogen and oxygen into electrical energy, as opposed to the direct combustion of hydrogen and oxygen gases to produce thermal energy. PEMFCs can generate electricity and operate on the opposite principle to PEM electrolysis, which consumes electricity. Combustion engines can generate mechanical work or electricity via combustion of (i) hydrogen and oxygen gases or (ii) hydrogen, ammonia, and oxygen gases. The methods and systems disclosed herein may be implemented to achieve thermally efficient hydrogen production, and may be scaled for application to high energy density power systems.

Figure 3:
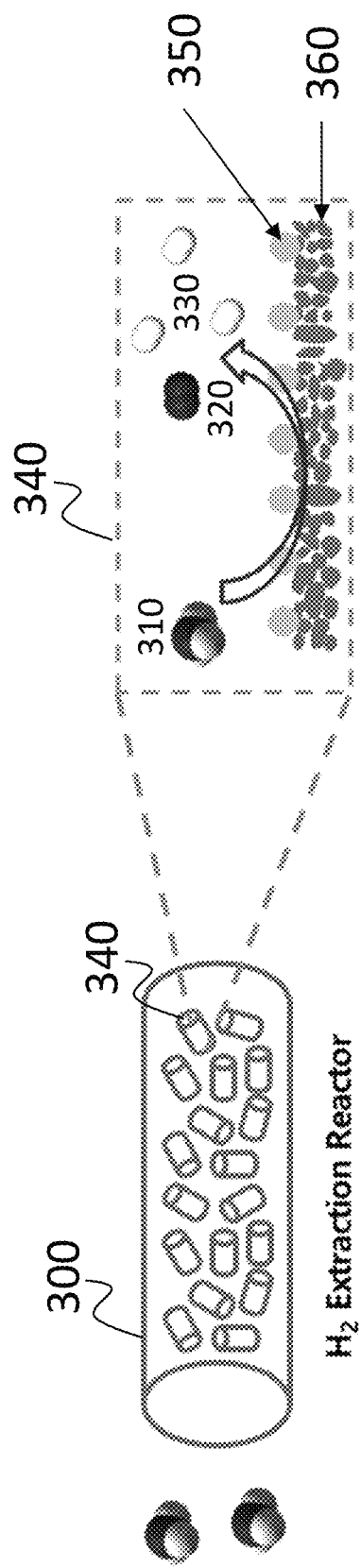
FIG. 3 schematically illustrates an example hydrogen extraction reformer comprising a heterogeneous catalyst, in accordance with some embodiments.

FIG. 3 schematically illustrates a hydrogen extraction reformer 300 for extracting hydrogen from ammonia. The extraction of hydrogen from ammonia may be accomplished using one or more catalysts 340. The one or more catalysts 340 may comprise a heterogenous catalyst. A heterogenous catalyst may comprise a catalyst having a different phase than that of the reactants 310 (e.g., $NH_3$) or products 320 and/or 330 ($N_2$ and/or $H_2$). The one or more catalysts 340 may comprise a plurality of metal nanoparticles 350 embedded in, on, or within a support material 360 (e.g., a composite support and/or a catalyst support as described herein). The impregnation of the metal nanoparticles 350 into, onto, or within the support materials 360 may lower an activation energy barrier of the ammonia decomposition reaction, thereby allowing the one or more catalysts 340 to efficiently crack or decompose ammonia at lower reaction temperatures.

Metal Foam Catalysts

In some embodiments, the catalysts may comprise one or more metal foam catalysts. The one or more catalysts may comprise, for example, a modified metal foam catalyst. The catalyst materials may be subjected to or may undergo one or more enhancements and/or treatments as shown and described herein. In some cases, the catalyst may comprise a nickel chromium aluminum (NiCrAl) foam.

In some cases, at least one of the first catalyst and the second catalyst may comprise a metal foam catalyst. The metal foam catalyst may comprise nickel, iron, chromium, and/or aluminum. In some cases, the metal foam catalyst may comprise one or more alloys comprising nickel, iron, chromium, and/or aluminum.

In some cases, the metal foam catalysts may comprise a catalytic coating of one or more powder or pellet catalysts. The catalytic coating may comprise a metal material, a promoter material, and/or a support material. The metal material may comprise, for example, ruthenium, nickel, rhodium, iridium, cobalt, molybdenum, iron, platinum, chromium, palladium, and/or copper. The promoter material may comprise, for example, sodium, potassium, rubidium, and/or cesium. In some cases, the support material may comprise, for example, at least one of $Al_2O_3$, MgO, $CeO_2$, $SiO_2$, $TiO_2$, $Y_2O_3$, $ZrO_2$, SiC, silicon nitride (SiN), $MgAl_2O_4$, $CaAl_2O_4$, $CoAl_2O_4$, hexagonal boron nitride, one or more boron nitride nanotubes, and/or one or more carbon nanotubes. In some cases, the support material may comprise at least one of $Al_xO_y$, $Mg_xO_y$, $Ce_xO_y$, $Si_xO_y$, $Ti_xO_y$, $Y_xO_y$, $Zr_xO_y$, $B_xN_y$, $Si_xC_y$, $Si_xN_y$, and/or C. In some embodiments, the catalytic coating may comprise one or more ruthenium-based precursors. The one or more ruthenium-based precursors may comprise, for example, $RuCl_3$, $Ru(NO)(NO_3)_3$, or $Ru_3(CO)_{12}$. In any of the cases described herein, the metal foam catalyst may have an apparent electrical resistivity of at least about 8 micro ohm-meters ($\mu\Omega m$).

In some cases, the metal foam catalyst may be processed using one or more etching, alloying, leaching, or acidic treatments to enhance a surface area of the metal foam catalyst. In some cases, the metal foam catalyst may be heat treated. In some cases, the metal foam catalyst may be coated using a physical vapor deposition (PVD) treatment and/or a chemical vapor deposition (CVD) treatment.

Catalysts Based on a Modified Support

In some embodiments, the one or more ammonia decomposition catalysts may comprise a metal material, a promoter material, and/or a support material. In some cases, the metal material may comprise, for example, at least one of ruthenium, nickel, rhodium, iridium, cobalt, molybdenum, iron, platinum, chromium, palladium, and/or copper. In some cases, the promoter material may comprise, for example, at least one of sodium, potassium, rubidium, cesium, magnesium, calcium, strontium, and/or barium. In some cases, the support material may comprise at least one of $Al_xO_y$, $Mg_xO_y$, $Ce_xO_y$, $Si_xO_y$, $Ti_xO_y$, $Y_xO_y$, $Zr_xO_y$, $B_xN_y$, $Si_xC_y$, $Si_xN_y$, and/or C. In some cases, the support material may comprise, for example, at least one of $Al_2O_3$, MgO, $CeO_2$, $SiO_2$, SiC, $TiO_2$, $Y_2O_3$, $ZrO_2$, SiN, $MgAl_2O_4$, $CaAl_2O_4$, $CoAl_2O_4$, hexagonal boron nitride, one or more boron nitride nanotubes, and/or one or more carbon nanotubes.

Active Metal Nanoparticles

One or more nanoparticles may be used to decompose the ammonia. The one or more nanoparticles may comprise an active metal configured to decompose or facilitate the decomposition of the ammonia. In some cases, the active metal nanoparticles may comprise, for example, ruthenium (Ru). The nanoparticles may comprise one or more binding sites (also referred to herein as active sites) for ammonia to attach to. The binding sites may be determined based on a shape, a morphology, and/or a surface chemistry or property of the active metal nanoparticles. As described herein, the morphology of the active metal nanoparticles may correspond to a size, shape, pore structure, pore size, pore shape, pore volume, pore density, pore size distribution, grain structure, grain size, grain shape, crystal structure, flake size, or layered structure of the one or more active metal nanoparticles. As described herein, the physical or chemical property of the active metal nanoparticles may comprise an Arrhenius acidity or basicity, a Lewis acidity or basicity, an electron density, an electronic state, or a hydrophilicity or hydrophobicity of the one or more active metal nanoparticles. One or more ammonia particles may attach to the binding sites of the active metal nanoparticles. The active metal nanoparticles may be configured to break the nitrogen-hydrogen (N—H) bonds of ammonia. The morphology and/or surface chemistry or property of the active metal nanoparticles may enhance ammonia adsorption, the breakdown (or scission) of N—H bonds, and hydrogen and/or nitrogen desorption.

Morphology

The morphology of the nanoparticles may be improved. The morphology may comprise a structure, a size, an aspect ratio, a facet distribution, and/or a shape of the nanoparticles. In some cases, the morphology may comprise a grain structure, grain sizes, and/or grain boundaries. In some cases, the morphology may correspond to a size, shape, pore structure, pore size, pore shape, pore volume, pore density, pore size distribution, grain structure, grain size, grain shape, crystal structure, flake size, or layered structure of the one or more active metal nanoparticles. The morphology of the nanoparticles may be customized or changed to improve the locations and/or the availability of the active sites on a molecular level. The binding sites or the active sites of the nanoparticles may be defined or determined in part based on the morphology of the nanoparticles.

Surface Chemistry

The chemical and/or physical properties of the nanoparticles may be improved. The chemical and/or physical properties may comprise, for example, a surface chemistry or property of the one or more active metal nanoparticles. The physical and/or chemical property of the active metal nanoparticles may comprise, for example, an Arrhenius acidity or basicity, a Lewis acidity or basicity, an electron density, an electronic state, or a hydrophilicity or hydrophobicity of the one or more active metal nanoparticles. The surface chemistry or property of the nanoparticles may be customized or changed to improve the locations and/or the availability of the active sites on a molecular level. The binding sites or the active sites of the nanoparticles may be defined or determined in part based on the surface chemistry or properties of the nanoparticles.

Form Factor

In some embodiments, the catalyst support material may comprise a porous material. In some instances, the catalyst support material may comprise a two-dimensional material. In some embodiments, the catalyst may be provided as a coating on a bead or a pellet. This may solve the issue of compressing powdered catalysts into a bead or a pellet form but not being able to use all of the catalyst material in the body of the bead or pellet. In some cases, the catalyst may be provided as a coating on a powder. In some cases, the catalyst may be provided as a coating on a porous monolith or a solid foam material. The coating may be improved with a predetermined amount of catalyst material to ensure that at least a threshold amount of the catalyst material is used. The threshold amount may be, for example, at least about 75, 80, 85, 90, 95, or 99% by weight or volume. A plurality of beads or pellets comprising a catalyst material coating may be used in combination with a reformer to decompose or crack ammonia to generate hydrogen.

Process and Pore Modification

Figure 4:
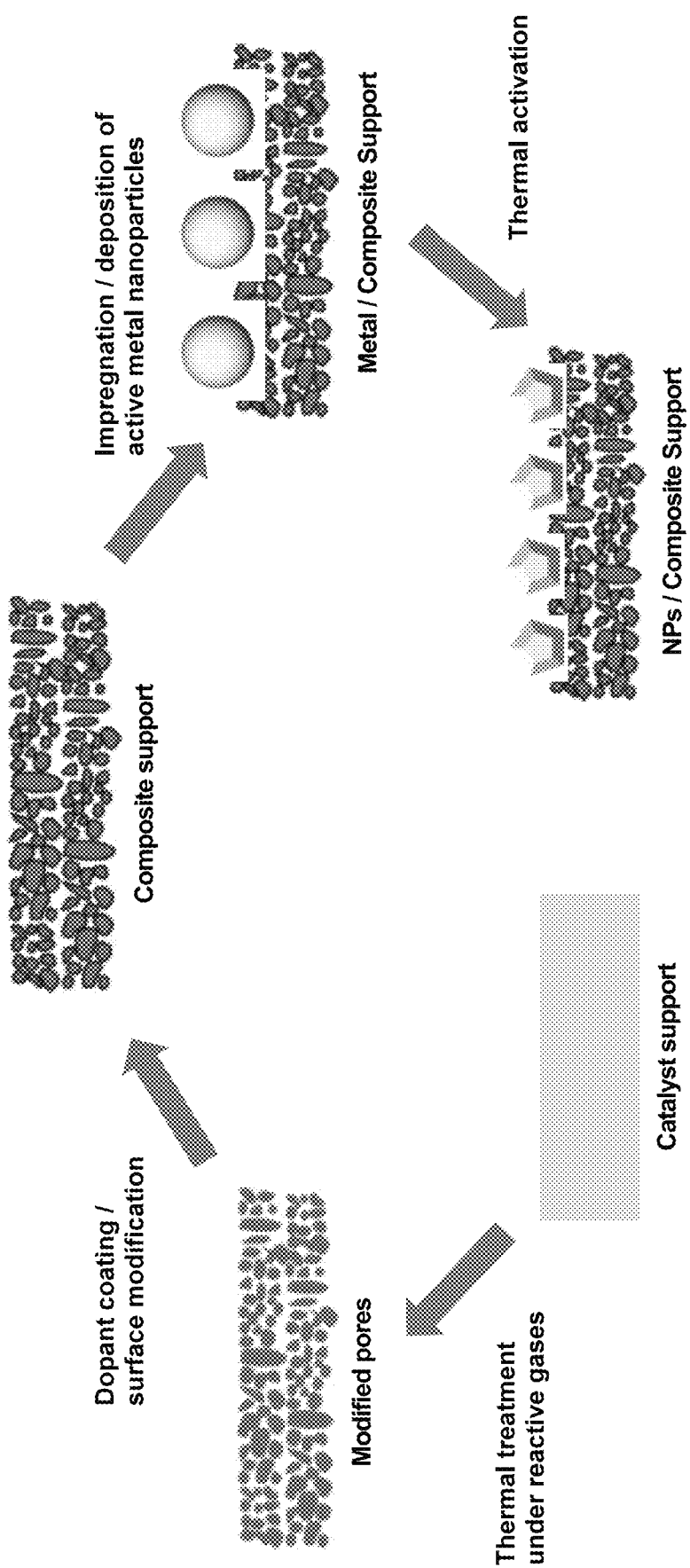
FIG. 4 schematically illustrates an example process for modifying and enhancing a catalyst support, in accordance with some embodiments.

FIG. 4 schematically illustrates an example process for modifying and enhancing a catalyst support. A catalyst support may be provided. The catalyst support may comprise any one or more metals (e.g., aluminum), nonmetals, and/or metalloids. In some cases, the pores of the catalyst support material may be modified. Modifying the pores may comprise, for example, modifying a pore size, a pore density, a pore volume, or a location or distribution of the pores through an area or a volume of the catalyst support material. The pores may be modified chemically (e.g., using corrosive gases or liquid chemicals to selectively etch out pores) or physically (e.g., using one or more thermal treatments under various gases). In some cases, the thermal treatments may change a phase or a state of the catalyst support material, which may also change the pore size of the catalyst support material. In some cases, the pore sizes may be modified differently for different types of reactions or for different types of performance characteristics. In some cases, the thermal treatments may be accompanied by an exposure of the catalyst support material to one or more reactive gases. In some cases, the reactive gases may comprise gases containing one or more of nitrogen (e.g. NO, $NO_2$, $NH_3$, HCN), sulfur ($H_2S$, $SO_2$), chlorine ($Cl_2$, HCl), carbon (CO, $CO_2$), fluorine, or gases generated from plasma such as ozone.

Fabrication of a Composite Support

In some embodiments, the surface of the catalyst support may be modified or coated. In some cases, the catalyst support material comprising the modified pore characteristics may be coated with an intermediate layer that can act as a platform for one or more active metals or active metal particles to grow. The intermediate layer can be used to change or influence a morphology of the active metal nanoparticles once the active metal nanoparticles are provided on the intermediate layer. In some cases, the intermediate layer may comprise a composite support material. The composite support material may be deposited on the catalyst support material using vapor deposition (e.g., chemical vapor deposition or physical vapor deposition). In some cases, the composite support material may be deposited on the catalyst support material by sputtering.

The composite support material may comprise a morphology and a physical or chemical property (e.g., a surface chemistry). The morphology and/or the physical or chemical properties of the composite support material layer may be used to change or influence the morphology and the physical or chemical properties of the active metal nanoparticles deposited on top of the composite support material. In some cases, the active metal nanoparticles may grow while conforming to the morphology and the physical or chemical properties of the composite support material layer.

In some cases, the catalyst support material may comprise a morphology and a physical or chemical property (e.g., a surface chemistry). The morphology and/or the physical or chemical properties of the catalyst support material layer may be used to change or influence the morphology and the physical or chemical properties of the active metal nanoparticles deposited on top of the catalyst support material or the composite support material. In some cases, the active metal nanoparticles may grow while conforming to the morphology and the physical or chemical properties of the catalyst support material and/or the composite support material layer.

In some cases, the catalyst support may comprise one or more properties or characteristics that may be improved using one or more physical or chemical processes. The one or more properties or characteristics may comprise, for example, a morphology or a surface chemistry or property of the catalyst support. The morphology may comprise a pore structure, a pore size, a pore shape, a pore volume, a pore density, a pore size distribution, a grain structure, a grain size, a grain shape, a crystal structure, a flake size, or a layered structure. The surface chemistry or property may comprise an Arrhenius acidity or basicity, a Lewis acidity or basicity, a surface hydroxyl group density, or a hydrophilicity or hydrophobicity. In some cases, the morphology or the surface chemistry or property of the composite support material may conform to a morphology or a surface chemistry or property of the catalyst support. In some cases, the morphology or the surface chemistry or property of the active metal nanoparticles may conform to the morphology or the surface chemistry or property of the catalyst support material and/or the composite support material. In some cases, the morphology or the surface chemistry or property of the composite support material may conform to the morphology or the surface chemistry or property of the catalyst support material.

In some cases, CVD may be used to deposit a composite support material comprising boron nitride on the catalyst support. A thin layer of the composite support material may be deposited on a surface layer of the catalyst support. CVD may be used to create a network of the composite support material on the existing catalyst support and/or within one or more pores of the catalyst support material. In some cases, the composite support material may comprise various metal oxides (e.g., titanium oxide or one or more other two-dimensional (2D) or three-dimensional (3D) materials).

Depositing the composite support material as an additional layer on top of the catalyst support may be advantageous over the use of a powder form of the composite support material, since a powder form may be difficult to use in a reformer due to the resulting pressure drop. Although compressing the powder into a pellet form can solve pressure drop issues, the composite support materials within the body of the pellet may not be fully utilized, which is wasteful and inefficient. In some cases, a powder may refer to a granular substance comprising a significant portion of particles that comprise sizes less than 1 mm in a characteristic dimension (length or diameter) or aspect ratio. In some cases, the aspect ratio may be at least about 1:5, 1:4, 1:3, 1:2, 1:1, 2:1, 3:1, 4:1, 5:1, 10:1, 15:1, 20:1, 25:1, 30:1, 35:1, 40:1, or 45:1. In some cases, the aspect ratio may be not more than about 1:4, 1:3, 1:2, 1:1, 2:1, 3:1, 4:1, 5:1, 10:1, 15:1, 20:1, 25:1, 30:1, 35:1, 40:1, 45:1 or 50:1. In some cases, the significant portion may be at least about 5, 10, 20, 30, 40, 50, 60, 70, 80, 90, 95, 99 by wt %, vol %, or % by count. In some embodiments, the significant portion may be not more than about 10, 20, 30, 40, 50, 60, 70, 80, 90, 95, or 99 by wt %, vol %, or % by count.

Addition of Active Metal

After the composite support material is deposited on the catalyst support material, the one or more active metals may be deposited on the catalyst support material and/or the composite support material. The active metals may be deposited using CVD. The active metals may be deposited on top of the composite support and also within the one or more modified pores of the catalyst support material as active metal nanoparticles. This may facilitate decomposition of any ammonia molecules that penetrate through the pores of the catalyst support. The deposition of the active metal nanoparticles on the composite support may also be referred to herein as an impregnation of the composite support with one or more active metal nanoparticles.

Once deposited on or within the catalyst support material and/or the composite support material, the active metal nanoparticles may grow according to a morphology and/or a physical or chemical property of the composite support material. In some cases, the composite support material may comprise a hexagonal shaped grain. The active metal nanoparticles may grow while maintaining a grain shape corresponding to the grain shape of the composite support material. In some cases, the active metal nanoparticles may grow while maintaining a hexagonal grain shape. The composite support material may provide a 2D structure or platform for ruthenium growth. The ruthenium may grow while conforming to a structure of the composite support material. In some instances, the composite support material may comprise boron nitride. The Ruthenium may grow while maintaining the hexagonal morphology of the composite support material. In some cases, the catalyst may undergo one or more thermal treatments in a vacuum state (i.e., below atmospheric pressure) and/or in the presence of various gases such as hydrogen gas or ambient air. Such thermal treatments may be used to thermally activate the active metal nanoparticles embedded in the composite support structure to facilitate the change in the morphology and/or the physical or chemical properties of the active metal nanoparticles to conform to the morphology and/or the physical or chemical properties of the materials or particles (e.g., atoms or molecules) constituting the composite support.

Use of Promoters with Active Metals

In some cases, the composite material and/or the one or more active metal nanoparticles embedded in the composite material may be promoted (e.g., with cesium) to change an electron state or an electron density of the active metal nanoparticles. As described above, the active metal nanoparticles may comprise, for example, ruthenium. In some cases, the modified electron state or electron density may facilitate recombinative nitrogen desorption and/or N—H bond cleavage during an ammonia decomposition reaction The methods and processes disclosed herein for fabricating composite catalysts may be implemented to produce catalysts with one or more desirable properties or performance characteristics (e.g., efficient hydrogen production). The catalysts may lower the activation energy barrier for the ammonia decomposition reactions, and can facilitate reactions at lower temperatures while increasing throughput and enhancing the efficient utilization of precious metals. The presently disclosed methods and processes may be adapted and scaled for economical mass fabrication of high performance, highly efficient catalysts.

Figure 5:
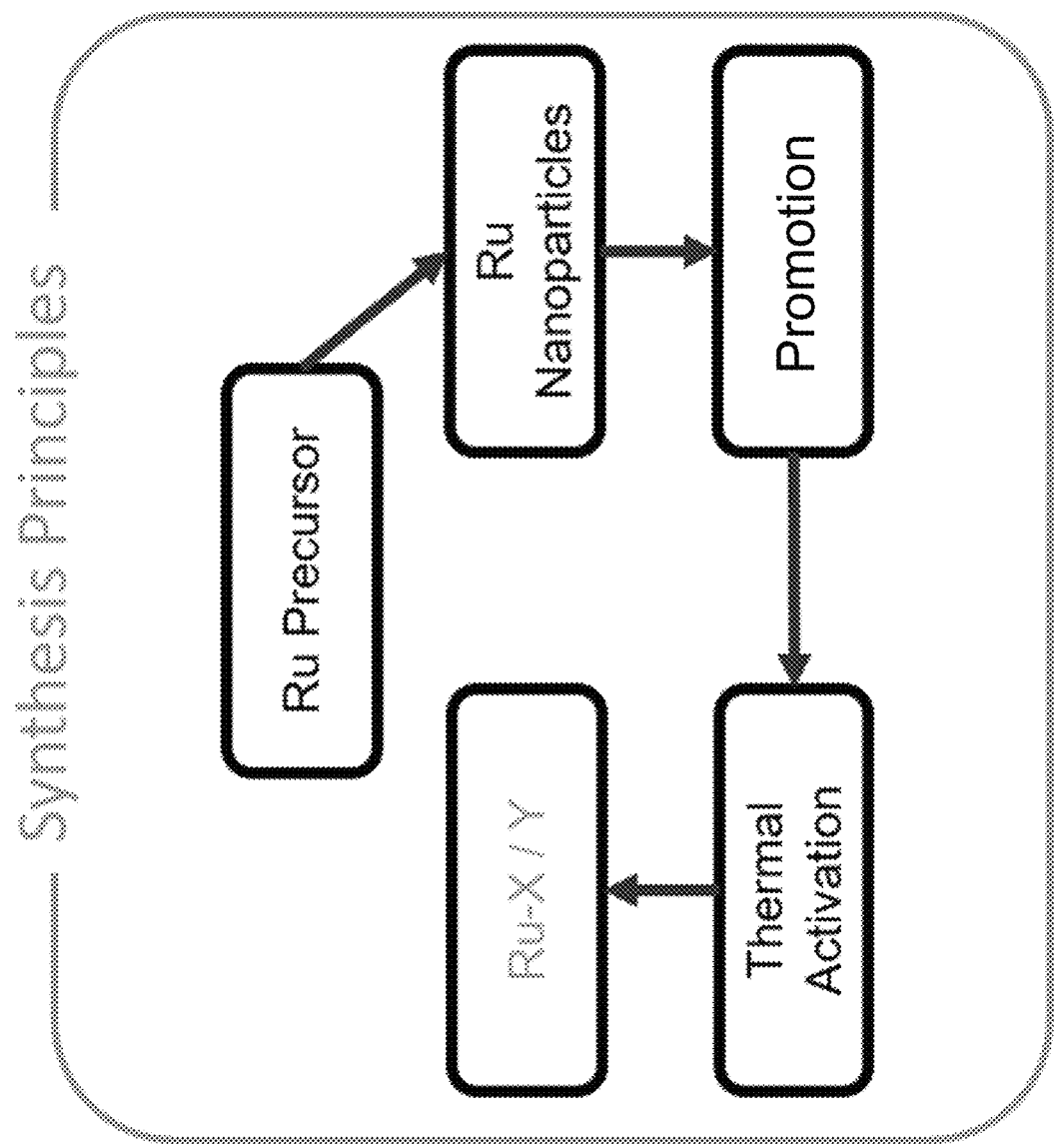
FIG. 5 schematically illustrates an example process for processing a precursor material, in accordance with some embodiments.

FIG. 5 shows an example method for synthesizing the one or more active metal nanoparticles. In some cases, the active metal nanoparticles may be fabricated from a precursor material (e.g., a precursor material comprising ruthenium). The active metal nanoparticles may be promoted with one or more alkali metals. The promoters may comprise one or more substances (e.g., co-catalysts) that can be added to increase ammonia conversion efficiency or selectivity. The one or more active metal nanoparticles may undergo one or more thermal treatments that thermally activate the active metal nanoparticles so that the active metal nanoparticles undergo growth and a change in morphology or physical/chemical property to mirror the morphology and/or the physical or chemical properties of the composite support material in which or on which the active metal nanoparticles are deposited. The systems and methods described herein may be used to control the morphology, surface chemistry, and/or the dispersion of the active metal nanoparticles, and to control interactions between the active metal nanoparticles and the composite support or catalyst support. The systems and methods of the present disclosure may also be used to improve one or more active sites on the active metal nanoparticles for breaking down and decomposing or cracking one or more ammonia molecules.

The improved catalysts described herein may exhibit enhanced ammonia decomposition performance and increased ammonia conversion efficiencies. The ammonia conversion efficiency for the improved catalysts may be a function of reaction temperature. In some cases, the ammonia conversion efficiency may reach up to at least about 90% at reaction temperatures of about 500° C. In some cases, the ammonia conversion efficiency may range from about 70% to about 99% at reaction temperature ranging from about 300° C. to about 600° C.

Thermal and Chemical Treatment of Supports

In some instances, the catalyst fabrication methods may comprise a thermal treatment under reactive gases. Such thermal treatment may be used to modify the porosity of the support for improved mass transfer. Such thermal treatment may also be used to modify one or more properties of the support (e.g., the basicity or acidity of the support) for better surface modification results.

In some embodiments, the catalyst fabrication methods may comprise a surface modification and coating step. The surface modification and coating step may comprise an intermediate layer deposition by PVD or CVD. PVD or CVD may be used to coat a support geometry with a thin, uniform layer of functional materials. The coating layer may have a thickness that ranges from about at least about 1 nm to about 20 nm or more. The functional materials may serve as a platform for nanoparticle growth. In some cases, the morphology and/or the physical or chemical properties of the functional materials may influence a growth and/or a morphology or a surface chemistry of the nanoparticles.

In some instances, the catalyst fabrication methods may comprise impregnation of active metal nanoparticles. The impregnation may comprise precursor impregnation with vacuum vapor deposition or incipient wet impregnation. This can allow for control of the precursor anchoring on the functional materials.

In some embodiments, the catalyst fabrication methods may comprise promoting and thermal, physical, chemical or electrochemical activation. Promoting may comprise impregnation of promoter materials (e.g., alkali metals and or alkaline-earth metals) into the active metal and/or composite support material to facilitate electron density modification and modification or improvement of a morphology or an active site of the catalyst. Thermal and/or chemical activation may also be used to modify the morphology of the active metal nanoparticles under a reducing environment (e.g., an environment comprising hydrogen gas) or in the presence of one or more noble gases.

Figure 6A:
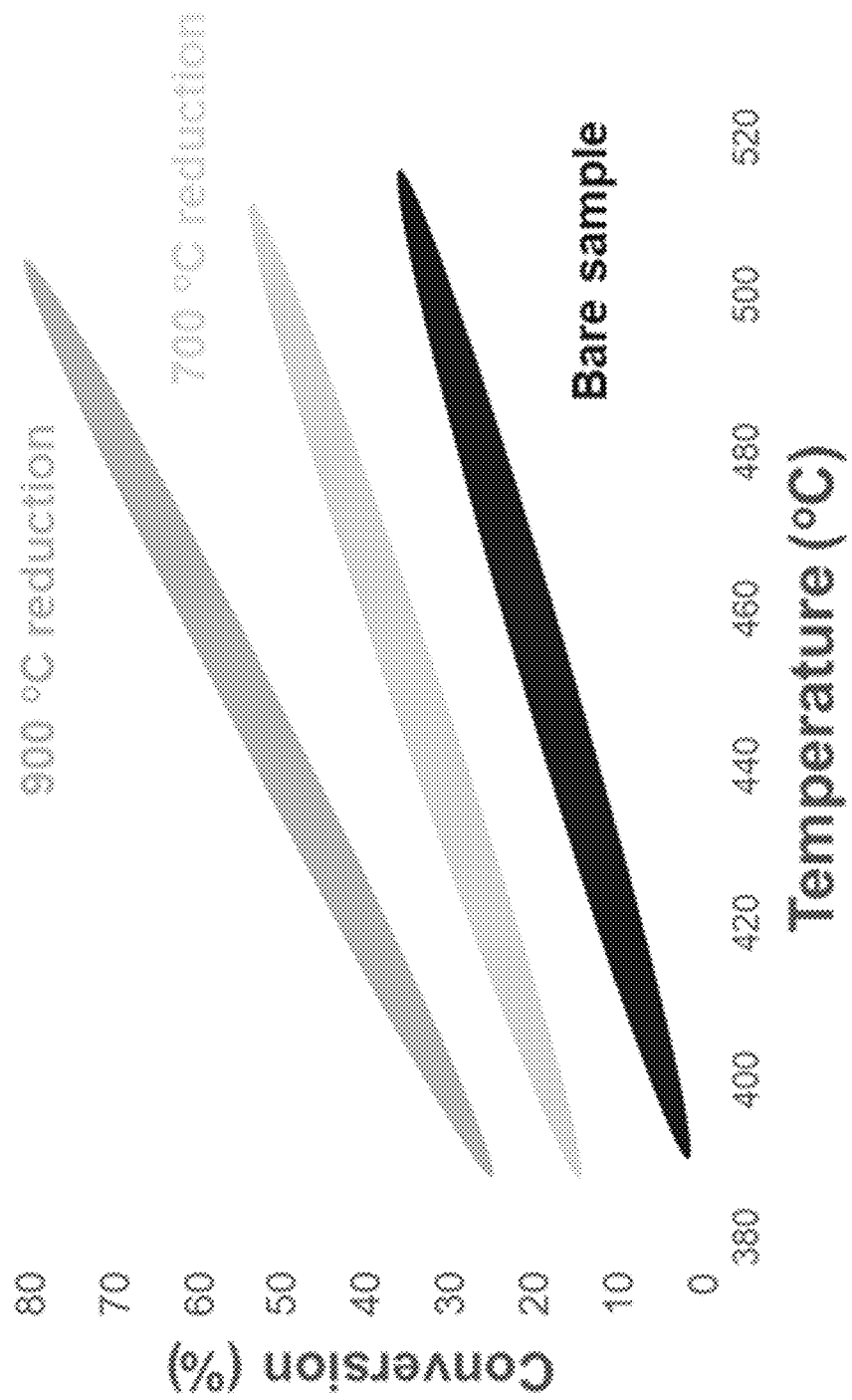
FIG. 6A schematically illustrates the effects of reducing a catalyst on ammonia conversion efficiency, in accordance with some embodiments.

FIG. 6A schematically illustrates the effects of reducing Ru-alumina catalysts on ammonia conversion efficiency, in accordance with some instances of the present disclosure. The catalysts of the present disclosure may be doped, promoted and/or thermally treated in an appropriate manner to improve catalyst performance and ammonia conversion efficiency. Compared to a bare sample catalyst (i.e., a catalyst that has not undergone doping, promotion and/or thermal treatment), a catalyst that has been doped, promoted and thermally treated may exhibit a higher ammonia conversion efficiency. A higher temperature or treatment time may result in better performance of the catalyst. For example, a bare sample catalyst may exhibit up to about a 30% ammonia conversion efficiency at temperatures of about 500° C. Surprisingly, a catalyst that has been doped, promoted and thermally treated at 700° C. may exhibit at least about a 60% ammonia conversion efficiency or more at temperatures of about 500° C. Unexpectedly, a catalyst that has been doped, promoted and thermally treated at 900° C. may exhibit at least about an 80% ammonia conversion efficiency or more at temperatures of about 500° C.

Figure 6B:
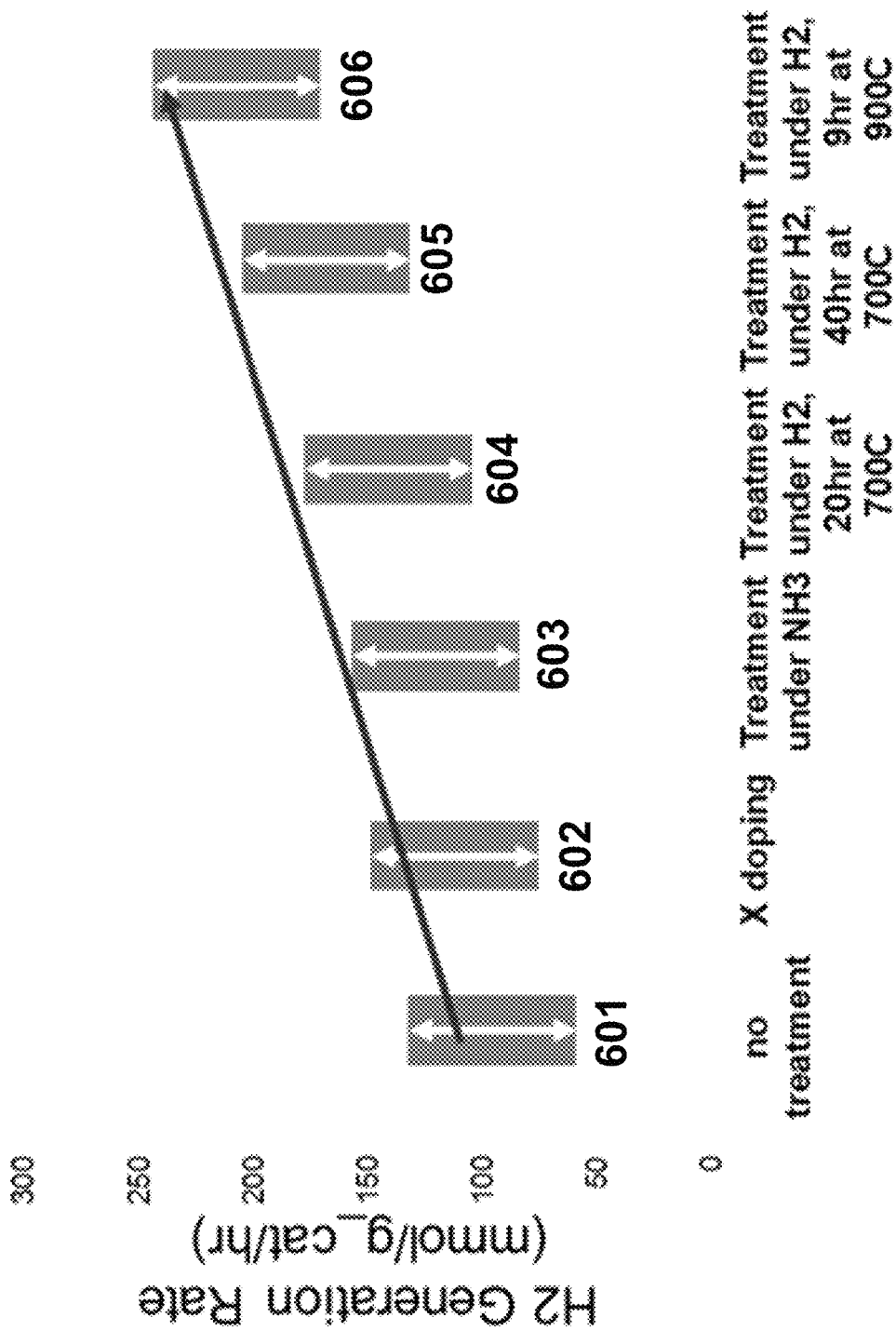
FIG. 6B schematically illustrates the effects of thermally treating a catalyst on hydrogen generation or production rates, in accordance with some embodiments.

Described herein is an example of the effect of reduction temperature and duration on hydrogen generation or production rates, in accordance with some embodiments. In some cases, catalyst performance may be improved by a factor of about 2 or more, by higher temperature and/or longer duration thermal treatment under $H_2$. With reference to FIG. 6B, shown here is a base Ru-alumina catalyst 601, with no dopant or thermal treatment that may have a hydrogen generation rate that may be not more than about 125 $mmol_{H2}$ $g_{cat}^{-1}$ $h^{-1}$ (mmol of hydrogen per gram of catalyst material per hour). The base catalyst can be treated with a dopant ("X") before the Ru is deposited 602, and this may have a hydrogen generation rate that is about 150 $mmol_{H2}$ $g_{cat}^{-1}$ $h^{-1}$. Treatment in a $NH_3$ atmosphere may improve the base catalyst may hydrogen generation rate that is about 150 $mmol_{H2}$ $g_{cat}^{-1}$ $h^{-1}$ 604. Alternatively, the base catalyst may be thermally treated in a $H_2$ atmosphere at 700° C. for 20 hours 606 or for 40 hours 608, or for 9 hours at 900° C. 610, increasing the hydrogen generation rates up to about 175, 200 and 250 $mmol_{H2}$ $g_{cat}^{-1}$ $h^{-1}$, respectively.

Figure 6C:
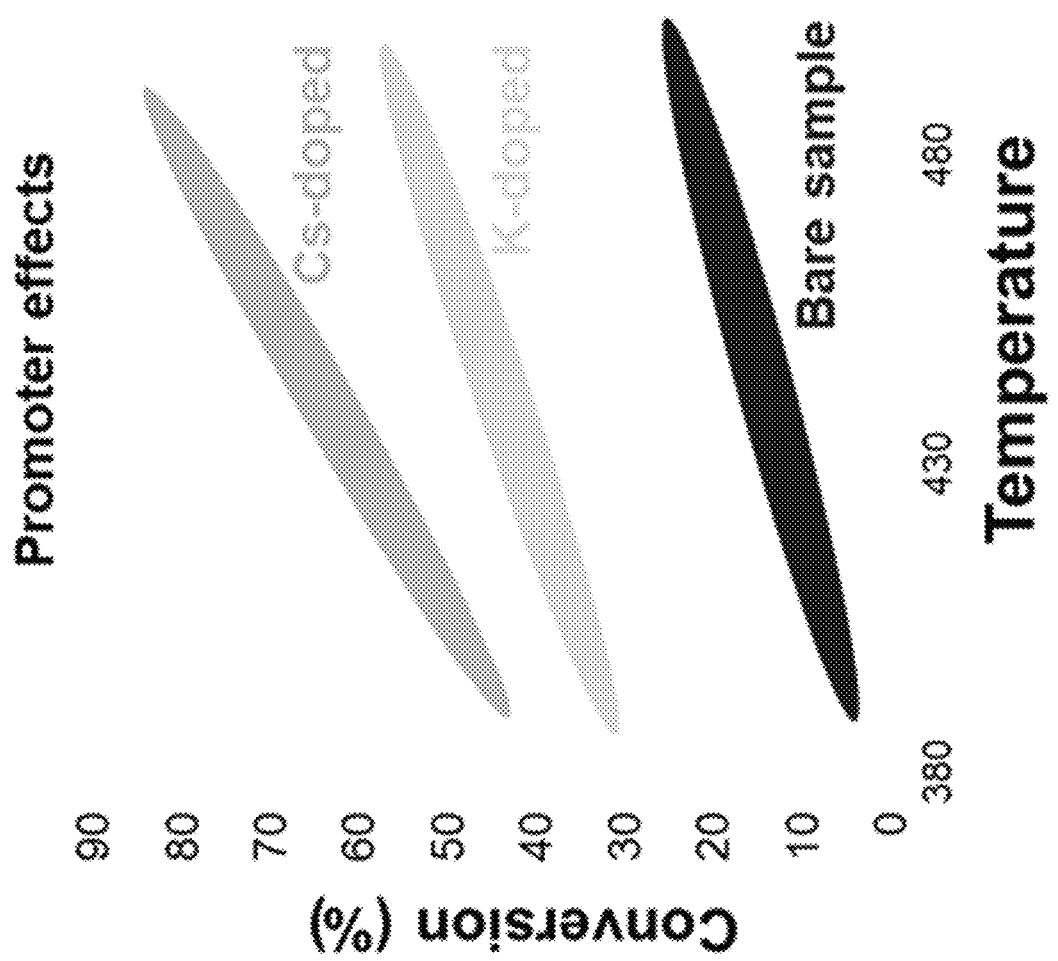
FIG. 6C schematically illustrates the effects of active metal promotion of a catalyst on ammonia conversion efficiency, in accordance with some embodiments.

FIG. 6C schematically illustrates the effects of active metal promotion of catalysts on ammonia conversion efficiency, in accordance with some embodiments of the present disclosure. The catalysts of the present disclosure may be promoted with one or more alkaline metals. In some cases, cesium may be one of the most effective promoters for X-Al$_2$O$_3$ catalysts. However, in some cases, excessive promotor incorporation may deteriorate catalyst performance and hydrogen generation or production rates. As such, an improved promoter amount exists for catalyst materials. The catalysts of the present disclosure may be doped, promoted and/or thermally treated in an appropriate manner to improve catalyst performance and hydrogen generation or production rates.

In some cases, a bare sample catalyst may exhibit an ammonia conversion efficiency of at most about 20% at temperatures of about 500° C. A catalyst that has been promoted with potassium may exhibit an ammonia conversion efficiency that is at least about 60% or more at temperatures of about 500° C. A catalyst that has been promoted with cesium may exhibit an ammonia conversion efficiency that is at least about 85% or more at temperatures of about 500° C.

Figure 6D:
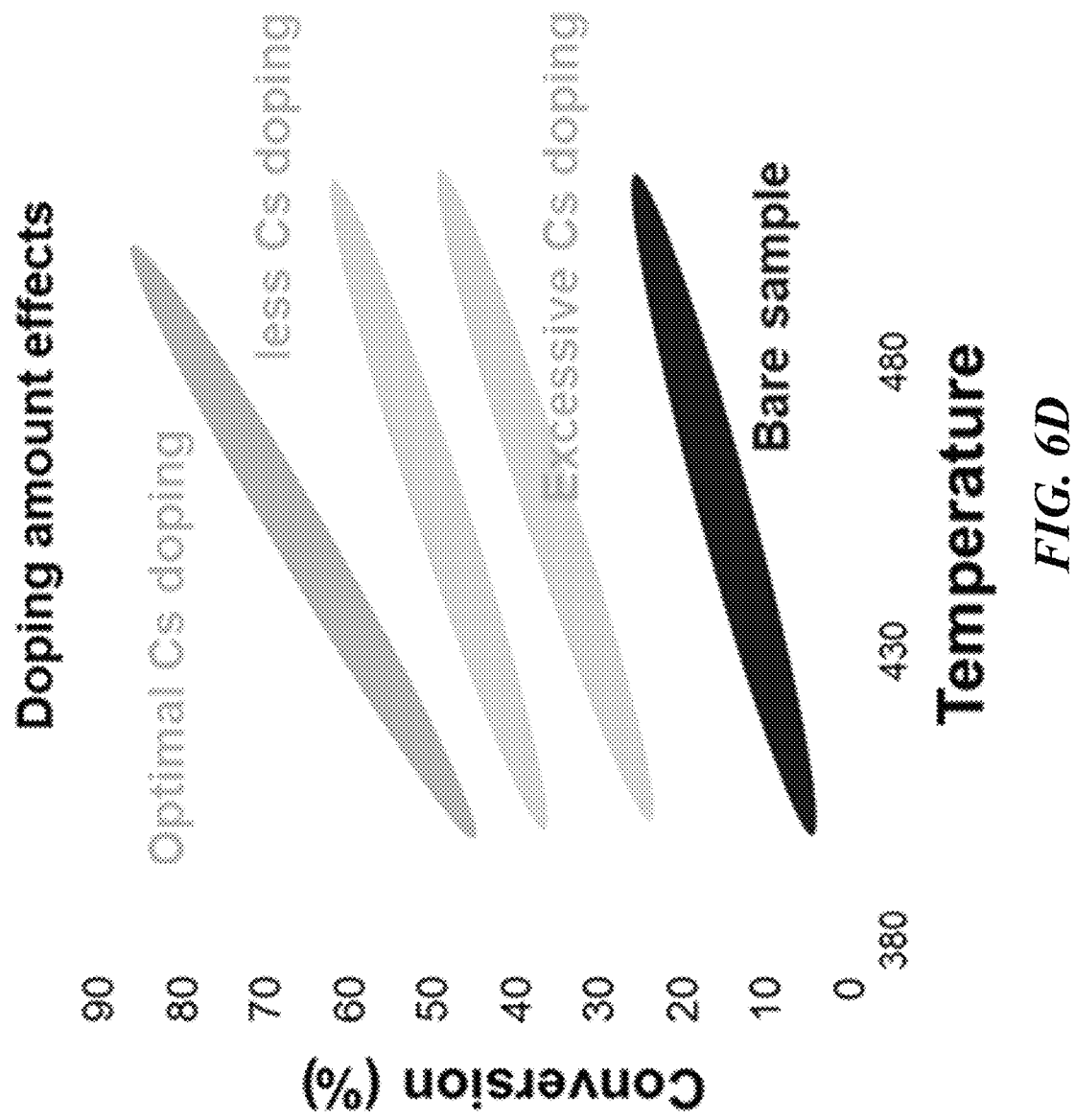
FIG. 6D schematically illustrates the effects of doping catalysts on ammonia conversion efficiency, in accordance with some embodiments.

FIG. 6D schematically illustrates the effects of doping base Ru-ammonia catalysts on ammonia conversion efficiency and hydrogen generation or production rate, in accordance with some embodiments. Surprisingly, a catalyst with more effective levels of promoter for the active metal content may exhibit an ammonia conversion efficiency that is at least about 85% or more at temperatures of about 500° C. On the other hand, catalysts with lower or higher promoter levels may have a reduced ammonia conversion efficiency (e.g., from about 20% to about 60% or less).

Described herein is an example of the effect of promoter concentration and molar ratio of active metal to the promoter, for some Ru-alumina catalysts. Compared to the base Ru-alumina catalyst, inclusion of promoter at a 1:1 molar ratio of active metal and promoter improved catalyst performance, compared to the same catalyst without promoter. As promoter concentration increases to a more effective molar ratio of active metal to promoter (e.g., 1:3), catalyst performance continues to improve. However, increasing the promoter concentration still further, catalyst performance unexpectedly reduces to below the base level. Surprisingly, additional thermal treatment may further improve catalyst performance when the more effective molar ratio of active metal and promoter is used.

Figure 6E:
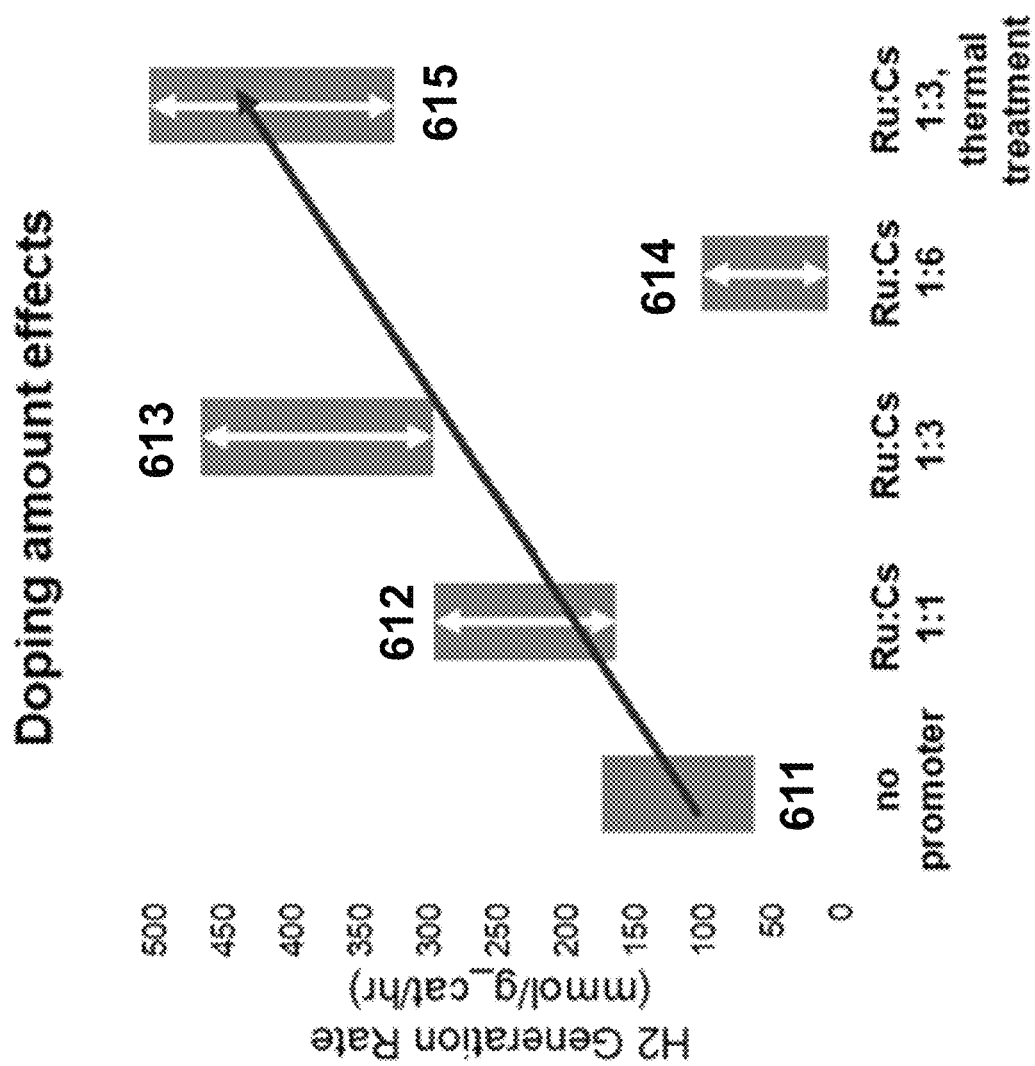
FIG. 6E schematically illustrates the effects of doping catalysts on ammonia conversion efficiency, in accordance with some embodiments.

With reference to FIG. 6E shown here is the base Ru-alumina catalyst 611, with no promoter or thermal treatment, that exhibits a hydrogen generation rate of not more than about 175 mmol$_{H2}$ g$_{cat}^{-1}$ h$^{-1}$, 612. The base catalyst may be doped with a promoter (Cs) to achieve a molar ratio of Ru and Cs of 1:1, increasing the hydrogen generation rate up to about 300 mmol$_{H2}$ g$_{cat}^{-1}$ h$^{-1}$, 612. The base catalyst may be doped with a higher concentration of promoter, to achieve a molar ratio of Ru and Cs of 1:3, 613, and may be further subjected to additional thermal treatment 615, resulting in hydrogen generation rates of up to about 460 and 500 mmol$_{H2}$ g$_{cat}^{-1}$ h$^{-1}$, respectively. Increasing the concentration of promoter still further, to a molar ratio of Ru and Cs of 1:6, significantly reduces hydrogen rate to not more than about 100 mmol$_{H2}$ g$_{cat}^{-1}$ h$^{-1}$, 614.

Materials

In any of the embodiments described herein, the catalyst support materials may comprise, for example, a metal oxide-based support having one or more micropores or mesopores. In some cases, the support materials may comprise, for example, aluminum oxide (Al$_2$O$_3$) or nickel (Ni) based metal foams. In some instances, the catalyst support material may comprise one or more of aluminum oxide (Al$_2$O$_3$), magnesium oxide (MgO), cerium dioxide (CeO$_2$), silicon dioxide (SiO$_2$), silicon carbide (SiC), yttrium oxide (Y$_2$O$_3$), one or more zeolites (e.g., MFI zeolite, MCM-41 zeolite, Y type zeolite, X type zeolite), titanium dioxide (TiO$_2$), zirconium dioxide (ZrO$_2$), lanthanum oxide (La$_2$O$_3$), or chromium oxide (Cr$_2$O$_3$). In some embodiments, the catalyst support material may comprise one or more of Al$_x$O$_y$, Mg$_x$O$_y$, Ce$_x$O$_y$, Si$_x$O$_y$, Y$_x$O$_y$, Ti$_x$O$_y$, Zr$_x$O$_y$, La$_x$O$_y$, or Cr$_x$O$_y$.

In any of the embodiments described herein, the composite coating materials may comprise a carbon-based material, a boron-based material, or a metal oxide. The carbon-based material may comprise, for example, activated carbon (AC), one or more carbon nanotubes (CNT), carbon nanofibers (CNF), graphene oxide (GO), graphite, one or more carbon nanoribbons, or reduced graphene oxide (rGO). The boron-based material may comprise, for example, hexagonal boron nitride (hBN), boron nitride nanotubes (BNNT), or boron nitride nanosheets (BNNS). The metal oxide may comprise, for example, TiO$_2$, MgO, La$_2$O$_3$, CeO$_2$, Y$_2$O$_3$, one or more CeO$_2$ nanotubes, nanorods or nanocubes, mesoporous silica (e.g., KIT-6), or ZrO$_2$.

In any of the embodiments described herein, the active metals or the active metal nanoparticles may comprise, for example, ruthenium (Ru), nickel (Ni), cobalt (Co), iron (Fe), copper (Cu), molybdenum (Mo), iridium (Ir), rhenium (Re), platinum (Pt), or palladium (Pd). The one or more active metals may be fabricated from one or more precursor materials. The precursor materials may comprise, for example, Ruthenium Chloride (RuCl$_3$), Ruthenium Nitrosylnitrate (Ru(NO)(NO$_3$)$_3$), Triruthenium dodecacarbonyl (Ru$_3$(CO)$_{12}$), Ruthenium acetylacetonate (Ru(acac)$_3$), Ruthenium nitrate (Ru(NO$_3$)$_3$), Ruthenium hexaammine chloride (Ru(NH$_3$)$_6$Cl$_3$), Cyclohexadiene ruthenium tricarbonyl ((CHD)Ru(CO)$_3$), Butadiene ruthenium tricarbonyl ((BD)Ru(CO)$_3$), or Dimethyl butadiene ruthenium tricarbonyl ((DMBD)Ru(CO)$_3$).

As described above, in some cases one or more promoter(s) or promoting materials may be used to modify or enhance an electron density of the active metal nanoparticles and/or the composite support material. In any of the embodiments described herein, the one or more promoters or promoting materials may comprise, for example, cesium (Cs), rubidium (Rb), potassium (K), sodium (Na), barium (Ba), strontium (Sr), calcium (Ca), or magnesium (Mg). In some cases, excessive concentrations of promoter materials may deteriorate the catalyst performance and ammonia conversion efficiency (i.e., improved amount of doping material exists). As discussed above, the catalysts of the present disclosure may have one or more promoters added therein in appropriate amounts or relative concentrations to improve catalyst performance and ammonia conversion efficiency.

In some instances, one or more layers of a composite material may be coated on the catalyst support material. The composite material may comprise one or more layers of boron nitride. The one or more layers may have a thickness of at most about 10 nm.

In some embodiments, the catalyst support with the layer of composite material deposited on the catalyst support may be impregnated with one or more active metal nanoparticles. In some cases, the active metal nanoparticles may be deposited on the composite layer, and the morphology of the active metal nanoparticles may be modified by subjecting the nanoparticles to one or more thermal treatment methods. In some cases, the nanoparticles may have a size ranging from about 1 nm to about 50 nm. In some cases, the dispersion of the nanoparticles may range from about 10% to about 60%. As used herein, dispersion may refer to the number of active metal atoms that are exposed on a surface of the active metal nanoparticles relative to the total number of atoms constituting the catalyst or a surface area or volume of the catalyst. The active metal atoms that are exposed on a surface of the catalyst may be capable of binding with one or more ammonia molecules using one or more active sites (also referred to herein as binding sites) of the active metal nanoparticles. As described herein, the active sites or binding sites of the active metal nanoparticles may be improved by subjecting the active metal nanoparticles to one or more thermal treatments that allow the active metal nanoparticles to adopt a morphology of the particles constituting the composite material layer.

In some cases, the improved catalysts disclosed herein may have a hydrogen production rate that is greater than that of conventional ruthenium catalysts. The hydrogen production rate based on the active metal content of the improved catalysts may be greater than that of conventional catalysts by a factor of at least about 1, 2, 3, 4, 5, 6, 7, 8, 9, 10, or more. In some cases, the improved catalysts may exhibit at least about a 90% conversion efficiency of ammonia to hydrogen at 450° C. and a space velocity of under 10 liters per hour per gram of catalyst. In some cases, the improved catalysts may exhibit at least about a 90% conversion efficiency of ammonia to hydrogen at 450° C. and a space velocity of at least about 1, 2, 4, 6, 8, 10, 12, 14, 15, 16, 18, 20, 22, 24, 26, 28, 30, 35, 40, 45, 50, 55, 60, 65, 70, 75, 80, 85, 90, or 95 liters per hour per gram of catalyst. In some cases, the improved catalysts may exhibit at least about a 90% conversion efficiency of ammonia to hydrogen at 450° C. and a space velocity of at most about 2, 4, 6, 8, 10, 15, 20, 25, 30, 35, 40, 45, 50, 55, 60, 65, 70, 75, 80, 85, 90, 95, or 100 liters per hour per gram of catalyst. In some cases, the improved catalysts may produce hydrogen and nitrogen with an ammonia conversion efficiency of from about 70 to about 99.9, 70 to 99, 70 to 98, 70 to 97, 70 to 96, 70 to 95, 70 to 90, 75 to 99.9, 75 to 99, 75 to 98, 75 to 97, 75 to 96, 75 to 95, 75 to 90, 80 to 99.9, 80 to 99, 80 to 98, 80 to 97, 80 to 96, 80 to 95, 80 to 90, 85 to 99.9, 85 to 99, 85 to 98, 85 to 97, 85 to 96, 85 to 95, 85 to 90, 90 to 99.9, 90 to 99, 90 to 98, 90 to 97, 90 to 96, 90 to 95, 95 to 99.9, 95 to 99, 95 to 98, 95 to 97, or 95 to 96%, at a temperature of at least about 450° C. and not more than about 700° C., and a space velocity of from about 1 to about 100 $L_{gas}$ $hr^{-1}$ $g_{cat}^{-1}$. In some cases, the improved catalysts may exhibit a nitrogen desorption activation energy that is less than that of conventional ruthenium catalysts.

Reformers and Power Systems Using Improved Catalysts

The catalysts of the present disclosure may be used compatibly with various power systems (e.g., reformers) for decomposing or cracking ammonia to generate hydrogen. The power systems may comprise, for example, one or more reformers that can perform a catalytic decomposition or cracking of ammonia to extract and/or produce hydrogen. Such reformer may be operated using heat energy. In some cases, the power system may comprise a combustor that generates heat energy to drive the operation of the reformer. In some cases, the heat energy may be generated from the combustion of a chemical compound (e.g., hydrogen or a hydrocarbon).

In some cases, the reformer may comprise an outlet configured to direct one or more fluids (e.g., ammonia, nitrogen, and/or hydrogen) to another system or subsystem. In some cases, the outlet may be configured to direct hydrogen gas produced by the reformer to one or more fuel cells and/or to one or more combustion engines. In some cases, the outlet may be configured to direct hydrogen gas produced by the reformer to one or more combustors to generate heat energy that can be used to power or heat the reformer (e.g., for autothermal heating or self-heating). In some cases, the outlet may be configured to direct hydrogen, nitrogen, and/or ammonia to at least one other reformer (e.g., for combustion of the hydrogen to heat the at least one other reformer).

Use of Produced Hydrogen in Fuel Cells or Engines

The hydrogen generated using the improved catalysts of the present disclosure may be provided to one or more fuel cells or proton-exchange membrane fuel cells (PEMFC) to generate electrical energy. The hydrogen generated using the improved catalysts of the present disclosure may also be provided to one or more combustion engines to generate mechanical work or mechanical energy. The hydrogen that is generated and/or extracted using the reformer may be provided to one or more fuel cells or to one or more combustion engines, which may produce electrical energy or mechanical work to power one or more systems, subsystems, or devices requiring electrical or mechanical energy to operate. In some cases, partially generated and/or extracted hydrogen and nitrogen from a reformer and at least a portion of the remaining ammonia mixture may be provided to one or more other reformers to enable a continuous reforming process. The partially generated and/or extracted hydrogen and nitrogen and the remaining ammonia may be part of a partially cracked stream of ammonia. The partially cracked stream of ammonia may be generated using a reformer having less than a 100% ammonia conversion efficiency. The partially cracked stream may be passed to one or more downstream reformers to minimize material waste and maximize an amount of ammonia that can be decomposed or cracked. In some cases, the hydrogen generated and/or extracted using the reformer may be provided to one or more other reformers. In such cases, the one or more other reformers may be configured to combust the hydrogen to generate additional thermal energy. Such additional thermal energy may be used to heat the one or more other reformers to facilitate a further catalytic decomposition or cracking of ammonia to extract and/or produce additional hydrogen.

Resistance Heating of Catalyst in Reformer

In some cases, the reformers may be configured to heat up the improved catalysts directly using resistance heating (e.g., by passing a current through the catalyst itself or through the catalyst support). In such cases, the reformers may comprise one or more electrodes for passing a current through the catalyst to heat the catalyst (e.g., by resistive heating or Joule heating). The one or more electrodes may comprise, for example, one or more metal (e.g., copper, steel, titanium, or carbon) electrodes. In other cases, the reformers may be configured to heat up the improved catalysts by combusting hydrogen. The improved catalysts may be configured to decompose ammonia into hydrogen and/or nitrogen when heated by combustion or resistance heating.

In some cases, the reformers may comprise one or more electrically conductive springs. The one or more electrically conductive springs may be provided adjacent to the improved catalysts disclosed herein. In some cases, the one or more electrically conductive springs may be provided on opposite ends of the catalyst. The one or more electrically conductive springs may be in physical, electrical, and/or thermal communication with the catalyst, the catalyst bed, and/or the one or more electrodes used to perform direct resistive heating of the catalyst. The one or more electrically conductive springs may be configured to reduce thermal stresses on the catalyst when the catalyst is subjected to thermal cycling. The one or more electrically conductive springs may be configured to accommodate thermal expansions during heating of the catalyst and thermal contractions during cooling of the catalyst. The one or more electrically conductive springs may lighten and/or redistribute the mechanical load on the catalyst bed so that the catalyst bed can withstand multiple thermal cycles without breaking or fracturing. In some cases, the one or more springs may be configured to alleviate thermal stresses on the catalyst due to a thermal expansion or a thermal contraction of the catalyst during one or more thermal cycling procedures. The one or more springs may comprise, for example, stainless steel, titanium, or copper springs. The use of the one or more electrically conductive springs may allow the reformer to provide fast startup capabilities with reduced or minimal thermal stresses on the catalyst bed during rapid temperature changes.

Hybrid Heating System

In some cases, the improved catalysts may undergo hybrid heating within a reformer. Such hybrid heating can improve heat transfer while minimizing reformer heat loss and increasing startup time. A hybrid heating design can also reduce a weight and a volume of the reformer and improve thermal management characteristics of the system while providing an improved heat source for ammonia conversion.

In some cases, the improved catalysts may be heated using one or more heat sources. In some cases, the one or more heat sources may comprise two or more heat sources or heating units. In some cases, the two or more heat sources may be the same or similar. In other cases, the two or more heat sources may be different. For example, a first heat source may be configured for joule heating, and a second heat source may be configured for combustion.

In some cases, the improved catalysts may be heated using a plurality of heating units. The plurality of heating units may comprise a first heating unit configured to heat at least a first portion of a catalyst by combusting hydrogen and a second heating unit configured to heat at least a second portion of the catalyst using electrical heating. The term "electrical heating," as used herein, generally refers to heating performed at least in part by flowing electrons through a material (e.g., an electrical conduit). The electrical conduit may be a resistive load. In some examples, electrical heating may comprise Joule heating (i.e., heating that follows Ohm's law). Joule heating, also known as resistive, resistance, or Ohmic heating, may comprise passing an electric current through a material (e.g., the electrical resistor, the catalyst, the catalyst material, or the catalyst bed) to produce heat or thermal energy. In some cases, the catalyst may be used to generate hydrogen from a source material comprising the ammonia when the catalyst is heated using the plurality of heating units. In some instances, the first portion and the second portion may be the same portion of the catalyst. In other instances, the first portion and the second portion may be different portions of the catalyst. In some cases, the first portion and the second portion may overlap or partially overlap.

In some cases, a first heating unit of a reformer may be configured to heat a first portion of the catalyst based on a combustion of hydrogen gas generated using a secondary reformer. In some cases, the first heating unit may be configured to heat the first portion of the catalyst based on a combustion of leftover hydrogen gas from (i) one or more fuel cells in fluid communication with the reformer or (ii) a secondary reformer. In some cases, the second heating unit may be configured to heat a second portion of the catalyst by passing an electrical current through the second portion of the catalyst. In some cases, the first portion of the catalyst and the second portion of the catalyst may be contiguous (i.e., physical connected). In other cases, the first portion of the catalyst and the second portion of the catalyst may be separated by a third portion of the catalyst. The third portion of the catalyst may be positioned between the first and second portions of the catalyst. In some cases, the first and second portions of the catalyst may be in thermal communication with each other (e.g., either directly or indirectly via the third portion of the catalyst). In other cases, the first and second portions of the catalyst may not or need not be in thermal communication with each other.

In some cases, a heat load distribution between the first heating unit and the second heating unit may be adjustable to increase an ammonia conversion efficiency and/or to enhance a thermal efficiency of the reformer. The heat load distribution may comprise a heating power ratio corresponding to a ratio between a heating power of the first heating unit and a heating power of the second heating unit. The heating power of the first heating unit and the second heating unit may be adjusted to achieve a desired ammonia conversion efficiency and thermal efficiency. In some cases, the system may further comprise a controller or processor configured to control an operation of the first heating unit and the second heating unit to adjust the heat load distribution within the reformer module. In some cases, such adjustments in the heat load distribution may be implemented in real-time based on one or more sensor measurements (e.g., temperature measurements) or based on a performance of the reformer (e.g., ammonia conversion efficiency and/or thermal efficiency of the reformer). In some cases, heaters with two or more heating zones may be used to control power and heat distribution within the heater. In some cases, the system may comprise a plurality of heating units.

The plurality of heating units may comprise at least two or more heating units. In some cases, a heat load distribution between the at least two or more heating units may be adjustable to increase an ammonia conversion efficiency and to enhance a thermal reforming efficiency of the reformer. In some cases, each of the at least two or more heating units may have one or more heating zones in the reformer to allow for a continuous heat distribution within one or more regions in the reformer module. In some cases, the at least two or more heating units may be configured to heat different zones in the reformer. In some cases, the at least two or more heating units may be configured to heat one or more same zones in the reformer.

Computer Systems

Figure 7:
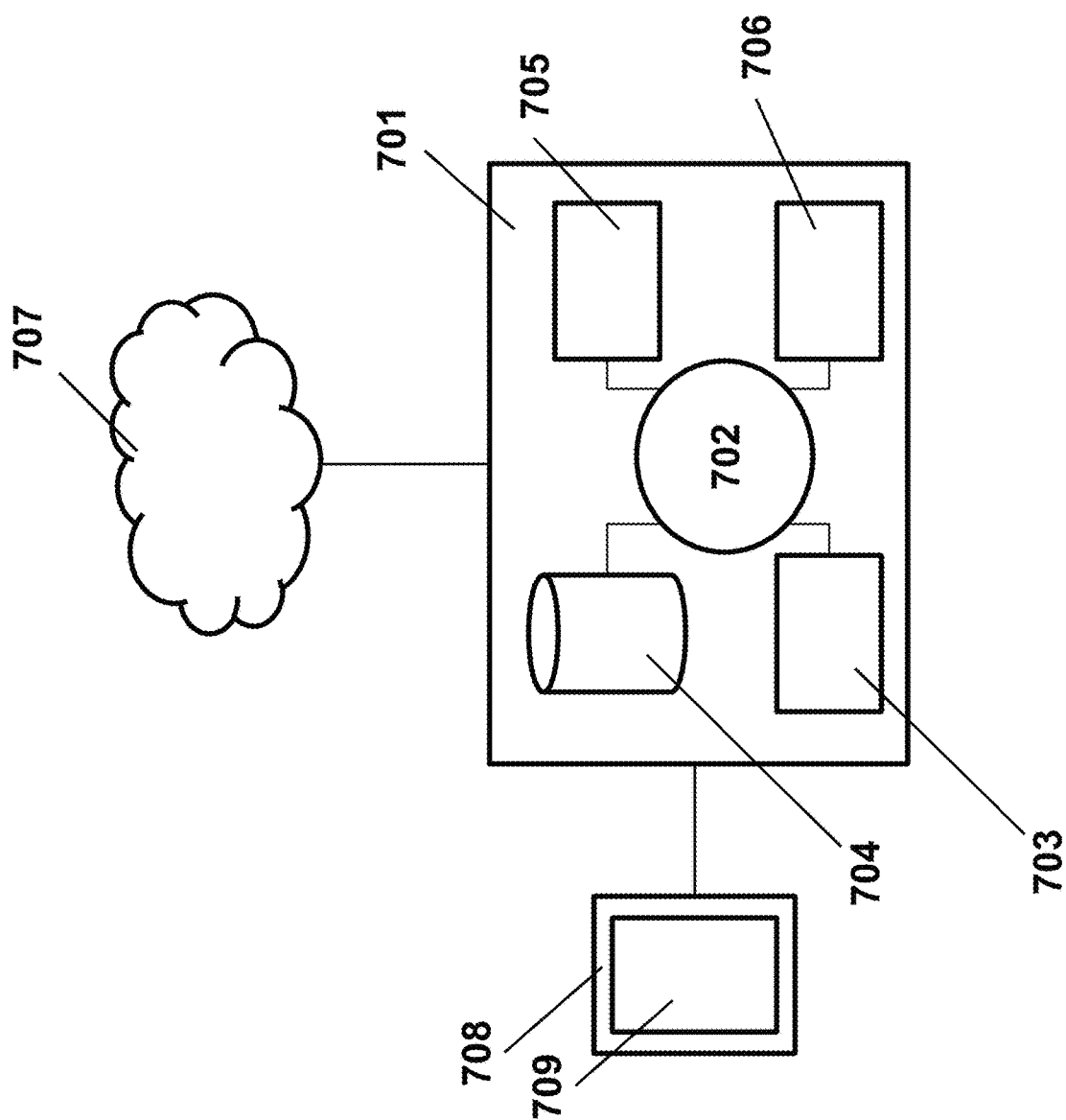
FIG. 7 schematically illustrates a computer system that is programmed or otherwise configured to implement methods provided herein.

The present disclosure provides computer systems (e.g., controllers, computing devices and/or computers) that are programmed to implement methods of the disclosure. FIG. 7 shows a computer system 701 that is programmed or otherwise configured to control the systems disclosed herein. The computer system 701 can regulate various aspects of the systems disclosed in the present disclosure. The computer system 701 can be an electronic device of a user or a computer system that is remotely located with respect to the electronic device. The electronic device can be a mobile electronic device.

The computer system 701 includes a central processing unit (CPU, also "processor" and "computer processor" herein) 702, which can be a single core or multi core processor, or a plurality of processors for parallel processing. The computer system 701 also includes memory or memory location 703 (e.g., random-access memory, read-only memory, flash memory), electronic storage unit 704 (e.g., hard disk), communication interface 705 (e.g., network adapter) for communicating with one or more other systems, and peripheral devices 706, such as cache, other memory, data storage and/or electronic display adapters. The memory 703, storage unit 704, interface 705 and peripheral devices 706 are in communication with the CPU 702 through a communication bus (solid lines), such as a motherboard. The storage unit 704 can be a data storage unit (or data repository) for storing data. The computer system 701 can be operatively coupled to a computer network ("network") 707 with the aid of the communication interface 705. The network 707 can be the Internet, an internet and/or extranet, or an intranet and/or extranet that is in communication with the Internet. The network 707 in some cases is a telecommunication and/or data network. The network 707 can include one or more computer servers, which can enable distributed computing, such as cloud computing. The network 707, in some cases with the aid of the computer system 701, can implement a peer-to-peer network, which may enable devices coupled to the computer system 701 to behave as a client or a server.

The CPU 702 can execute a sequence of machine-readable instructions, which can be embodied in a program or software. The instructions may be stored in a memory location, such as the memory 703. The instructions can be directed to the CPU 702, which can subsequently program or otherwise configure the CPU 702 to implement methods of the present disclosure. Examples of operations performed by the CPU 702 can include fetch, decode, execute, and writeback.

The CPU 702 can be part of a circuit, such as an integrated circuit. One or more other components of the system 701 can be included in the circuit. In some cases, the circuit is an application specific integrated circuit (ASIC).

The storage unit 704 can store files, such as drivers, libraries and saved programs. The storage unit 704 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 707. For instance, the computer system 701 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 707.

Methods as described herein can be implemented by way of machine (e.g., computer processor) executable code stored on an electronic storage location of the computer system 701, such as, for example, on the memory 703 or electronic storage unit 704. The machine executable or machine readable code can be provided in the form of software. During use, the code can be executed by the processor 702. In some cases, the code can be retrieved from the storage unit 704 and stored on the memory 703 for ready access by the processor 702. In some situations, the electronic storage unit 704 can be precluded, and machine-executable instructions are stored on memory 703.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 708 that comprises a user interface (UI) 709 for providing. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 702.

Catalyst Fabrication Methods

In another aspect, the present disclosure provides a method for fabricating one or more catalysts for processing ammonia to generate hydrogen. The method may comprise subjecting a catalyst support to one or more physical or chemical processes to modify one or more pores of the catalyst support. In some cases, the one or more physical or chemical processes for modifying the one or more pores of the catalyst support may comprise a thermal treatment (i.e., controlled heating) of the catalyst support. In some cases, modifying the one or more pores may comprise adjusting a size of the one or more pores, a pore density, and/or a pore volume of the catalyst support. In some cases, the method may further comprise thermally or chemically treating a surface of the catalyst support material to modify the one or more pores and/or one or more surface morphologies. In some cases, the catalyst support comprises a bead, a pellet, a powder, a thin film, a monolith, a foam, reformer wall, heating element, wires, mesh, engineered or corrugated sheet, or a porous solid material form factor. In some cases, the catalyst is powderless, for example, majority of the catalyst may be greater than 1 mm in a characteristic dimension or aspect.

In some instances, the method may further comprise depositing a composite support material on the catalyst support, wherein the composite support material comprises a morphology, and (c) depositing one or more active metals on at least one of the composite support material and the catalyst support, wherein the one or more active metals comprise one or more nanoparticles configured to conform to the morphology of the composite support material, thereby improving one or more active sites on the nanoparticles for ammonia processing. In some cases, the composite support material may be deposited using chemical vapor deposition. In some cases, the one or more active metals may be deposited using chemical vapor deposition. The active metals may comprise one or more nanoparticles with one or more active sites to which one or more ammonia molecules are attachable. The one or more ammonia molecules may be configured to bind or attach to the one or more active sites of the one or more active metal nanoparticles. The positions, orientations, and/or density of the one or more active sites may be determined based at least in part on a morphology and/or surface chemistry or property of the composite support material. In some embodiments, the morphology may comprise a grain structure, a grain size, or a grain shape.

In some cases, the catalyst support may comprise, for example, at least one of $Al_2O_3$, $MgO$, $CeO_2$, $SiO_2$, $SiC$, $Y_2O_3$, $TiO_2$, or $ZrO_2$. In some cases, the catalyst support may comprise, for example, at least one of $Al_xO_y$, $Mg_xO_y$, $Ce_xO_y$, $Si_xO_y$, $Y_xO_y$, $Ti_xO_y$, or $Zr_xO_y$. In some cases, the one or more active metals comprise, for example, at least one of ruthenium (Ru), nickel (Ni), rhodium (Rh), iridium (Ir), cobalt (Co), molybdenum (Mo), iron (Fe), platinum (Pt), chromium (Cr), palladium (Pd), or copper (Cu). In some cases, the composite support may comprise a carbon-based material, a boron-based material, or a metal oxide. The carbon-based material may comprise, for example, activated carbon (AC), one or more carbon nanotubes (CNT), one or more carbon nanofibers (CNF), graphene oxide (GO), graphite, or reduced graphene oxide (rGO). The boron-based material may comprise, for example, hexagonal boron nitride (hBN), boron nitride nanotubes (BNNT), or boron nitride nanosheets (BNNS). The metal oxide may comprise, for example, $TiO_2$, $MgO$, $La_2O_3$, $CeO_2$, $Y_2O_3$, one or more $CeO_2$ nanotubes, nanorods or nanocubes, mesoporous silica (e.g., KIT-6), $ZrO_2$, chromium oxide ($Cr_2O_3$), or calcium oxide (CaO). The metal oxide may comprise, for example, $Ti_xO_y$, $Mg_xO_y$, $La_xO_y$, $Ce_xO_y$, $Y_xO_y$, $Ce_xO_y$, $Zr_xO_y$, $Cr_xO_y$, or $Ca_xO_y$. In some cases, the composite support may comprise YSZ, Hydrotalcite ($Mg_2Al$-LDO), MOF (MIL-101, ZIFs), Alkaline amide ($NaNH_2$, $Ca(NH_2)_2$, $Mg(NH_2)_2$), Inorganic electride (C12A7:e-), Halloysite nanotubes (HNT), ABO3 Perovskite, AB2O4 Spinel, MCM-41.

In some cases, the method may further comprise thermally activating the one or more active metals. Thermally activating the one or more active metals may induce a growth of one or more nanoparticles of the active metals. In some cases, the one or more nanoparticles may be configured to grow while conforming to the morphology of the composite support material. In some cases, the method may further comprise promoting the catalyst, the active metal nanoparticles, and/or the composite support material of the catalyst with one or more promoters. The one or more promoters may comprise, for example, sodium (Na), potassium (K), rubidium (Rb), cesium (Cs), magnesium (Mg), calcium (Ca), strontium (Sr), or barium (Ba).

Selection of Catalyst Precursors

In some cases, the ammonia decomposition reaction may be driven using a catalyst. The catalyst may comprise, for example, a ruthenium nanoparticle catalyst. The ruthenium nanoparticle catalyst may comprise one or more ruthenium nanoparticles. The ruthenium nanoparticle catalyst may be utilized to facilitate an ammonia decomposition reaction as described herein, and may be fabricated by loading a given precursor onto an alumina carrier, or a modified alumina carrier, and performing a reduction at a high temperature.

Support Precursors

In some cases, the support comprises an amorphous, monoclinic, tetragonal, hexagonal, or perovskite phase. In some cases, the modified support comprises an amorphous, monoclinic, tetragonal, hexagonal, or perovskite phase. In some cases, a metal salt or a metal salt hydrate, such as $MNO_3$, may be initially deposited on a surface of the alumina carrier, followed by high-temperature calcination to generate an M-Al oxide support. As used herein, M may refer to any type of metal. In some cases, the M-Al oxide may form a perovskite phase, $MAlO_3/Al_2O_3$. In some cases, two or more types of metal salts or metal salt hydrates may be added to generate a mixed $M_1$-$M_2$-Al oxide support. Onto this support, a ruthenium precursor may be deposited, and the support and/or the ruthenium precursor may be reduced at an elevated temperature (e.g., an elevated temperature ranging from about 500° C. to about 1200° C.) to generate an improved nanoparticle catalyst. In some cases, a promoter may be added to the catalyst in the form of electron donors, e.g., Cs or K, which can further improve ammonia conversion efficiency.

Effect of Catalyst Support Form Factor

In some cases, the catalysts of the present disclosure may be synthesized using various alumina carriers. The alumina carriers may be in the form of a bead or a cylindrical pellet or a combination of both. In some cases, the alumina carrier may comprise any type of a porous solid material. In other cases, the alumina carrier may comprise a bead, a pellet, a powder, a monolith, a foam, or any combination thereof.

Figure 8:
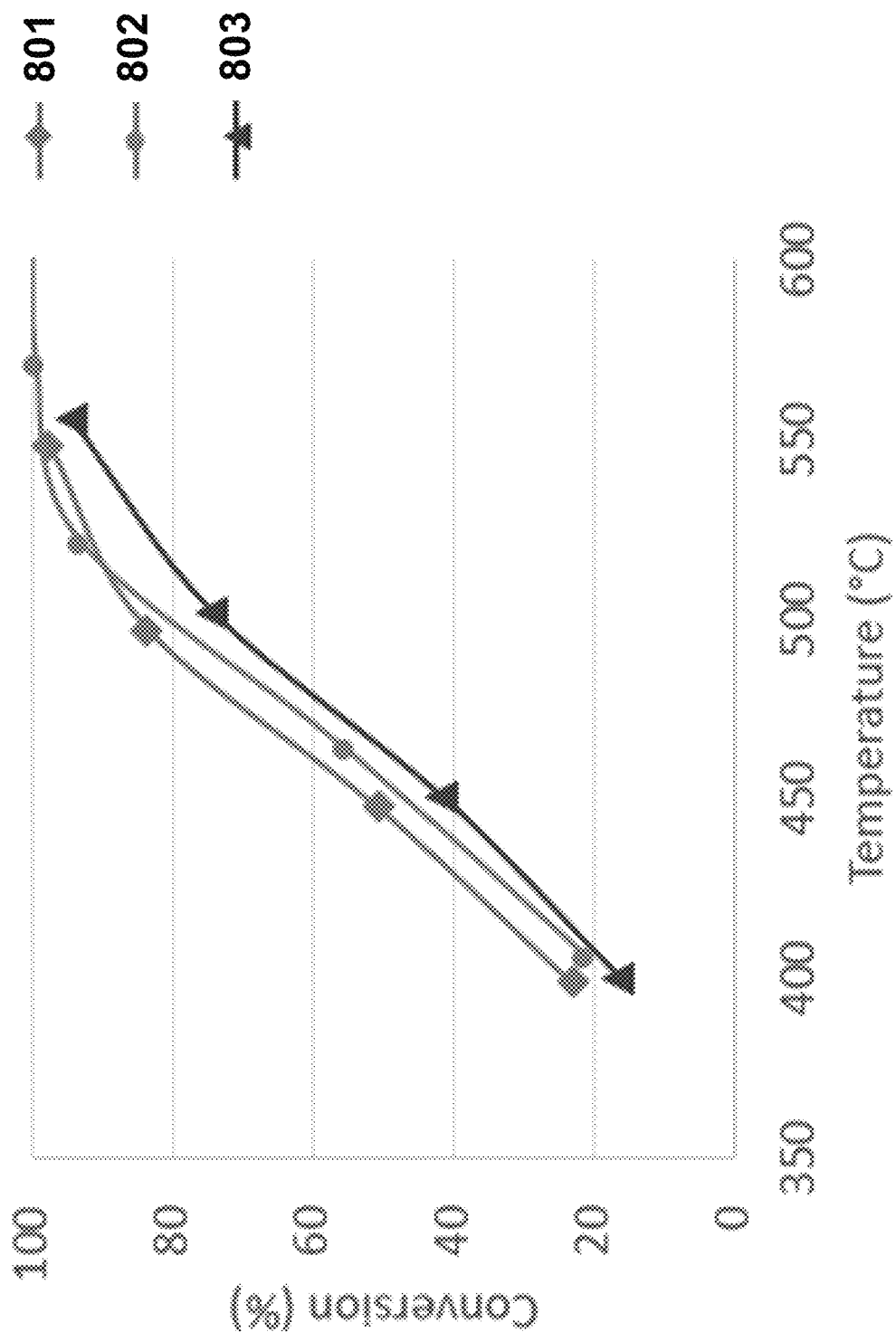
FIG. 8 illustrates a comparison of ammonia conversion efficiencies using various catalysts synthesized using different size alumina carriers, in accordance with some embodiments.

Described herein is an example of the effect of support form factor on the hydrogen generation performance of a Ru-alumina catalyst. Across a temperature range from about 400° C. to about 500° C., the catalyst based on 1.0 mm beads exhibited superior performance. Above a temperature of about 500° C., the difference between the catalyst using 1.0 mm beads and the catalyst using 1.5 mm beads seems to reduce in significance. The catalyst based on 3.2 mm pellets exhibits lower performance than the other two catalysts, across a temperature range from about 400° C. to about 575° C. With reference to FIG. 8, Ru-alumina catalysts may be prepared according to the same methods and materials (described herein), and with the same composition. The catalysts may be prepared using $RuCl_3$ as the active metal precursor and on support material comprising gamma-alumina (γ-alumina). The catalysts may comprise a form factor of: 1.0 mm beads 801, 1.5 mm beads 802, or 3.2 mm pellets 803.

In some cases, a smaller particle size may lead to a more active catalyst. In some cases, the bead or the pellet may have a diameter ranging from about 0.1 mm to about 10 mm. In some cases, the bead or the pellet may have a surface area per unit mass ranging from about 50 $m^2/g$ to about 500 $m^2/g$. In some cases, the bead or the pellet may have a diameter of at least about 0.1, 0.5, 1, 1.5, 2, 2.5, 3, 3.5, 4, 4.5, 5, 5.5, 6, 6.5, 7, 7.5, 8, 8.5, 9, or 9.5 mm. In some cases, the bead or the pellet may have a diameter of at most about 0.5, 1, 1.5, 2.0, 2.5, 3, 3.5, 4, 4.5, 5 5.5, 6, 6.5, 7, 7.5, 8, 8.5, 9, 9.5 or 10 mm. In some cases, the bead or the pellet may have a surface area per unit mass of at least about 50, 100, 150, 200, 250, 300, 350, 400, 450, 500, 550, 600, 650, 700, 750, 800, 850, 900, 950, 1000, 1050, 1100, or 1150 $m^2/g$. In some cases, the bead or the pellet may have a surface area per unit mass of at most about 100, 150, 200, 250, 300, 350, 400, 450, 500, 550, 600, 650, 700, 750, 800, 850, 900, 950, 1000, 1050, 1100, 1150, or 1200 $m^2/g$.

Application of Dopants

There are many well-established techniques for the application of metal oxides and their precursors onto the surface of a support, to form a modified or doped support. Such techniques include: wet impregnation, template ion exchange, precipitation, sol-gel, citric acid process, deposition-precipitation, hydrothermal synthesis, chemical vapor deposition (CVD), physical vapor deposition (PVD), single atom catalysts, thermal shock-high entropy alloy, galvanic exchange, ferromagnetic inductive heating and nanoparticle transfer.

Wet Impregnation Procedure

Wet (or wetness) impregnation may be a convenient technique, especially for laboratory preparations, and the procedure is described here as an example. Other techniques may also be used to prepare the catalysts of the present disclosure and should be considered as included by this disclosure.

Dopants may be applied to the support surface using separate solutions, with a drying step(s) between each application, or as a mixed solution of dopant metal precursor(s). Mixed dopant and precursor solutions are understood to produce improved support characteristics for the finished catalyst. When applying solutions of mixed dopant precursors it is important to ensure compatibility between them to avoid unintentional precipitation. Alternatively, precipitation may be induced within the pore structure via sequential deposition of a dopant precursor followed by a precipitant. The promoter/precipitant precursor may also be included at this stage (e.g. KOH, or $CsNO_3$).

To dope the support material, an aqueous solution of the chosen metal precursor(s) (e.g. $La(NO_3)_3$, $Ce(NO_3)_4$, and their hydrates) may be prepared, using e.g., deionized, distilled, or tap water. The mass of each dopant precursor(s) may be chosen to provide the desired metal loading on the support surface, and the volume of solvent water may be chosen to be about equal in mass to the support material, prior to deposition.

The steps involved in this procedure may include: (i) weigh the support material to determine its mass; (ii) knowing the chemical composition of the support, calculate the number of moles of support molecules (e.g. $Al_2O_3$, $SiO_2$, or $ZrO_2$) or key element (e.g. Al, Si, Zr, or C); (iii) calculate the number of moles of dopant metal required to achieve the desired loading (mol %) or molar ratio on the support; (iv) prepare a solution of the dopant precursor(s) in the appropriate mass of water (about equal to the mass of the support material for incipient wetness). The number of moles of precursor (or metal ion) in the required volume of water (calculated from the required mass) establishes the molarity of the solution with respect to the precursor (or metal ion). If excess precursor solution is required, then the mass of water and precursor are increased in proportion to the desired quantity.

Typically, the metal loading on the support may be expressed as mol % of the dopant metal. The metal loading on the support may be expressed as a molar ratio of the dopant metal(s) (e.g. La, or Ce) to each other or to the support material (e.g. alumina or zirconia), and may range from about 1:10 to about 10:1. The desired loading of each dopant metal(s) on the support may require a dopant solution concentration of from about 0.01 Molar (M) to about 10M with respect to each dopant metal. The pH of the precursor solution may also be adjusted (with a suitable strong acid or base) to improve the effectiveness of the doping process, or the precursor may be dissolved in a suitable, preprepared solution of an acid or base (e.g. 0.01M to 20M nitric acid, hydrochloric acid, acetic acid, sodium hydroxide, potassium hydroxide). The pH of the dopant solution may be at least about pH 0, 1, 2, 3, 4, 5, 6, 7, 8, 9, 10, 11, 12, 13, or 14. The pH of the dopant solution may be not more than about pH 1, 2, 3, 4, 5, 6, 7, 8, 9, 10, 11, 12, 13, 14, or 15.

The support material is immersed in the precursor solution for a duration of up to about 48 hours at ambient laboratory temperature (e.g., from about 15 to about 30° C.). If the pH of the dopant solution has been adjusted to a suitable range (e.g., about pH 1 to pH 2), the required immersion time may be reduced to within the range of about 1 to 2 hours. In some cases, the support material is immersed in the precursor solution for a duration of up to about 48 hours at temperature of at least about 0, 10, 20, 30, 40, 50, 60, 70, 80, 90, or 100° C. In some cases, the support material is immersed in the precursor solution for a duration of up to about 48 hours at temperature of at most about 0, 10, 20, 30, 40, 50, 60, 70, 80, 90, or 100° C. In some cases, the support material is immersed in the precursor solution at a temperature of about 0° C. to about 100° C., for a duration of at least about 1, 2, 3, 4, 5, 6, 7, 8, 9, 10, 15, 20, 25, 30, 35, 40, or 45 hours. In some cases, the support material is immersed in the precursor solution at a temperature of about 0° C. to about 100° C., for a duration of not more than about 1, 2, 3, 4, 5, 6, 7, 8, 9, 10, 15, 20, 25, 30, 35, 40, 45, or 48 hours.

The volume of the solution is selected to be at least equal to the total pore volume of the support material (when these values are about equal, it is termed "incipient wetness"). A greater volume of solution may be unnecessary and may reduce the efficiency of the doping process, but may be typically chosen when doping structured or monolith catalyst supports. At conclusion of the immersion time, the doped (wet) support material may be transferred to suitable equipment to remove or evaporate the bulk solvent. A rotary evaporator (or rotovap) is a convenient and efficient apparatus to facilitate the removal of solvent at moderate temperatures (e.g from about 20° C. to about 80° C.) below atmospheric pressure or in vacuo. The doped (wet) support may also be dried in a laboratory oven under vacuum or above atmospheric pressure, in which case higher temperatures (e.g. from about 80° C. to about 150° C.) and/or longer drying times may be required. Drying the doped support in a laboratory oven may also be performed as a supplemental step, before or after drying in other equipment (such as a rotary evaporator). Each drying step may be performed for up to 168 hours, depending on the conditions used.

Doping Conditions (Wet Impregnation)

In some embodiments, the dopant metal precursor(s) is applied to the support surface as one solution comprising, e.g. $La(NO_3)_3$, $CeCl_3$, $Ce(HCO_3)_3$, or $Ce(CH_3COO)_3$. In some embodiments, dopant metal precursor(s) are applied to the support surface as separate solutions (with a drying step between each application). In some embodiments, the concentration of the dopant metal precursor solution may comprise at least about 0.01, 0.05, 0.1, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.5, 4, 4.5, 5, 5.5, 6, 6.5, 7, 7.5, 8, 8.5, 9, or 9.5M, with respect to each dopant metal. In some embodiments, the concentration of the dopant metal precursor solution may comprise not more than about 0.05, 0.1, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.5, 4, 4.5, 5, 5.5, 6, 6.5, 7, 7.5, 8, 8.5, 9, 9.5, or not more than 10M, with respect to each dopant metal.

Drying Conditions for Doped Support

In some embodiments, the doped support may be maintained at a temperature of at least about 10, 15, 20, 25, 30, 35, 40, 45, 50, 55, 60, 65, 70, 75, 80, 85, 90, 95, 100, 105, 110, 115, 120, 125, 130, 135, 140, or 145° C., at a pressure of about 0.0001 to about 5 bar absolute, for a duration of about 0.1 to about 168 hours. In some embodiments, the doped support may be maintained at a temperature of not more than about 15, 20, 25, 30, 35, 40, 45, 50, 55, 60, 65, 70, 75, 80, 85, 90, 95, 100, 105, 110, 115, 120, 125, 130, 135, 140, 145, or 150° C., at a pressure of about 0.0001 to about 5 bar absolute, for a duration of about 0.1 to about 168 hours.

In some embodiments, the doped support may be maintained at a pressure of at least about 0.0001, 0.001, 0.1, 0.2, 0.3, 0.4, 0.5, 0.6, 0.7, 0.8, 0.9, 1, 2, 3, or 4 bar absolute pressure, at a temperature of about 10° C. to about 150° C., for a duration of about 0.1 hours to about 168 hours. In some embodiments, the doped support may be maintained at a pressure of not more than about 0.001, 0.01, 0.1, 0.2, 0.3, 0.4, 0.5, 0.6, 0.7, 0.8, 0.9, 1, 2, 3, or 4, or 5 bar absolute pressure, at a temperature of about 10° C. to about 150° C., for a duration of about 0.1 hours to about 168 hours.

In some embodiments, the doped support may be maintained at a temperature of about 10° C. to about 150° C., and a pressure of about 0.0001 bar absolute to about 5 bar absolute, for a duration of at least about 0.1, 0.5, 1, 2, 3, 4, 5, 6, 7, 8, 9, 10, 11, 12, 18, 24, 30, 36, 42, 48, 60, 72, 84, 96, 108, 120, 132, 144, or 156 hours. In some embodiments, the doped support may be maintained at a temperature of about 10° C. to about 150° C., and a pressure of about 0.0001 bar absolute to about 5 bar absolute, for a duration of not more than about 0.5, 1, 2, 3, 4, 5, 6, 7, 8, 9, 10, 11, 12, 18, 24, 30, 36, 42, 48, 60, 72, 84, 96, 108, 120, 132, 144, 156 or 168 hours.

If separate dopant solutions are to be used, or if the promoter precursor solution was not added during the wet impregnation process, then the immersion step and the drying step may need to be repeated for each dopant and/or promoter precursor solution. Once the support material has been impregnated with all of the desired dopant metals, then the doped support may be subjected to further heat treatment, including (but not limited to) calcination, annealing, nitriding and reduction. The heat treatment step(s) may be performed before the active metal precursor is applied to the surface of the doped support. The heat treatment step(s) may also be performed before the promoter precursor is applied to the surface of the doped support, in which case the drying step(s) and the heat treatment step(s) may need to be repeated before the active metal precursor is applied to the surface of the doped support.

Calcination of the Support or Doped Support

The chemical composition of the surface of the support or doped support can be modified, or thermally activated, to further improve the characteristics and properties of the catalyst. Such modifications may be used to improve or moderate the dispersion of active metal species, and/or the surface morphology, selectivity, activity, or temperature sensitivity of the catalyst. One such modification is calcination, which is performed at elevated temperatures, with the objective of converting up to 100% of the precursor species on the surface to the metal oxides or mixed metal oxides. The elevated temperatures may also be selected to promote solid state reaction(s) between the catalyst support material and/or the metal dopants and/or promoters to form solid solutions or alloys which further improve the desired characteristics and performance of the final catalyst. An oxidizing or inert (i.e. non-reducing) atmosphere, e.g. comprising air, $N_2$, $CO_2$, Ar, He, Xe (or mixtures thereof), may be used. Once the high temperature heat treatment has reached the end of the desired time duration, the nitrided material remains in the oven and in the same atmosphere, and it is allowed to cool to ambient temperature over a period of several hours. If a flowing or circulating atmosphere is used, then the time for effective heat treatment at high temperatures may be reduced significant (e.g. between 2 to 6 hours at temperatures from 500° C. to 1000° C.).

In some embodiments, the support or doped support may be maintained at a temperature of at least about 300, 350, 400, 450, 500, 550, 600, 650, 700, 750, 800, 850, 900, 950, 1000, 1050, 1100, 1150, 1200, or 1250° C., for a duration of about 0.1 to about 168 hours, in an oxidizing (e.g., an environment comprising at least oxygen) or inert atmosphere. In some embodiments, the support or doped support may be maintained at a temperature of not more than about 350, 400, 450, 500, 550, 600, 650, 700, 750, 800, 850, 900, 950, 1000, 1050, 1100, 1150, 1200, 1250, or 1300° C., for a duration of about 0.1 to about 168 hours, in an oxidizing or inert atmosphere.

In some instances, the support or doped support may be maintained at a temperature of about 300° C. to about 1300° C., fora duration of at least about 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 132, 144, or 156 hours, in an oxidizing or inert atmosphere. In some instances, the support or doped support may be maintained at a temperature of about 300° C. to about 1300° C., for a duration of not more than about 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 132, 144, 156, or 168 hours, in an oxidizing or inert atmosphere.

Annealing of the Support or Doped Support

The chemical composition of the surface of the support or doped support can be modified, or thermally activated, to further improve the characteristics and properties of the catalyst. Such modifications may be used to improve or moderate the dispersion of active metal species, and/or the surface morphology, selectivity, activity, or temperature sensitivity of the catalyst. One such modification is annealing, which is performed at elevated temperatures, with the objective of modifying the crystal structure, and/or size and/or composition of the surface layers. In some embodiments, annealing may be performed to agglomerate smaller particles to combine into larger particles and expose a larger area of the surface support or doped support. In some instances, annealing may be performed to partially reduce the support, or doped support. In some instances, annealing may be performed to generate oxygen vacancies in the support, or doped support. The elevated temperatures may also be selected to promote solid state reaction(s) between the catalyst support material and/or the metal dopants and/or promoters to form solid solutions or alloys which further improve the desired characteristics and performance of the final catalyst. An inert, anoxic, or non-oxidizing atmosphere, e.g., comprising any of $N_2$, $CO_2$, CO, $H_2$, Ar, He, Kr, Xe (or mixtures thereof), may be used. Once the high temperature heat treatment has reached the end of the desired time duration, the nitrided material remains in the oven and in the same atmosphere, and it is allowed to cool to ambient temperature over a period of several hours. If a flowing or circulating atmosphere is used, then the time for effective heat treatment at high temperatures may be reduced significant (e.g. between 2 to 6 hours at temperatures from 500° C. to 1000° C.).

In some embodiments, the support or doped support may be maintained at a temperature of at least about 300, 350, 400, 450, 500, 550, 600, 650, 700, 750, 800, 850, 900, 950, 1000, 1050, 1100, 1150, 1200, or 1250° C., for a duration of about 0.1 to about 168 hours, in an inert, anoxic or reducing atmosphere. In some embodiments, the support or doped support may be maintained at a temperature of not more than about 350, 400, 450, 500, 550, 600, 650, 700, 750, 800, 850, 900, 950, 1000, 1050, 1100, 1150, 1200, 1250, or 1300° C., for a duration of about 0.1 to about 168 hours, in an inert, anoxic or reducing atmosphere.

In some embodiments, the support or doped support may be maintained at a temperature of about 300° C. to about 1300° C., for a duration of at least about 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, or 100, 105, 110, 115, 120, 132, 144, or 156 hours, in an inert, anoxic or reducing atmosphere. In some embodiments, the support or doped support may be maintained at a temperature of about 300° C. to about 1300° C., for a duration of not more than about 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 132, 144, 156, or 168 hours, in an inert, anoxic or reducing atmosphere.

Nitriding of the Support or Doped Support

The chemical composition of the surface of the support or doped support can be modified, or thermally activated, to further improve the characteristics of the catalyst. Such modifications may be used to improve or moderate the dispersion of active metal species, and/or the surface morphology, selectivity, activity, or temperature sensitivity of the catalyst. One such modification is nitriding, which is performed at elevated temperatures, with the objective of converting up to 100% of the metal oxides or precursor species on the surface to the metal nitrides. The elevated temperatures may also be selected to promote solid state reaction(s) between the catalyst support material and/or the metal dopants and/or promoters to form solid solutions or alloys which further improve the desired characteristics and performance of the final catalyst. A reactive, nitrogen-rich or nitrogen-containing atmosphere comprising e.g. $NH_3$, $H_2$—$N_2$, forming gas, or endothermic gas (or mixtures thereof), may be used. Once the high temperature heat treatment has reached the end of the desired time duration, the nitrided material remains in the oven and in the same atmosphere, and it is allowed to cool to ambient temperature over a period of several hours. If a flowing or circulating atmosphere is used, then the time for effective heat treatment at high temperatures may be reduced significant (e.g. between 2 to 6 hours at temperatures from 500° C. to 1000° C.).

In some embodiments, the support or doped support may be maintained at a temperature of at least about 300, 350, 400, 450, 500, 550, 600, 650, 700, 750, 800, 850, 900, 950, 1000, 1050, 1100, 1150, 1200, or 1250° C., for a duration of about 0.1 to about 168 hours, in a reactive, nitrogen-rich or nitrogen-containing atmosphere. In some embodiments, the support or doped support may be maintained at a temperature of not more than about 350, 400, 450, 500, 550, 600, 650, 700, 750, 800, 850, 900, 950, 1000, 1050, 1100, 1150, 1200, 1250, or 1300° C., for a duration of about 0.1 to about 168 hours, in a reactive, nitrogen-rich or nitrogen-containing atmosphere.

In some embodiments, the support or doped support may be maintained at a temperature of about 300° C. to about 1300° C., for a duration of at least about 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 132, 144, or 156 hours, in a reactive, nitrogen-rich or nitrogen-containing atmosphere. In some embodiments, the support or doped support may be maintained at a temperature of about 300° C. to about 1300° C., for a duration of not more than about 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 132, 144, 156, or 168 hours, in a reactive, nitrogen-rich or nitrogen-containing atmosphere.

Reduction of the Support or Doped Support

As discussed above, once the active metal (e.g. Ru) precursor is deposited on the carrier or support (e.g. alumina, doped or modified alumina), reduction of the precursor may lead to an improved active metal nanoparticle catalyst that can be used to facilitate ammonia decomposition. The conditions of such reduction may strongly influence the physical or chemical properties or characteristics of the active metal on the surface of the support, and thus the activity and/or ammonia conversion efficiency of the catalyst. Furthermore, the conditions of reduction may strongly influence properties of the active metal nanoparticles on the surface, including, for example, size, dispersion and dominant crystal facets. In some cases, the reduction of the precursor(s) may be performed in an atmosphere comprising hydrogen. Once the high temperature heat treatment has reached the end of the desired time duration, the nitrided material remains in the oven and in the same atmosphere, and it is allowed to cool to ambient temperature over a period of several hours. When performed under ideal conditions, the heat treatment step under these conditions may be conducted for a period from 2 hours to 6 hours.

In some embodiments, the doped support may be maintained at a temperature of at least about 200, 250, 300, 350, 400, 450, 500, 550, 600, 650, 700, 750, 800, 850, 900, 950, 1000, 1050, 1100, 1150, 1200, or 1250° C., for a duration of about 0.1 hours to about 168 hours, in an atmosphere comprising hydrogen. In some embodiments, the doped support may be maintained at a temperature of not more than about 250, 300, 350, 400, 450, 500, 550, 600, 650, 700, 750, 800, 850, 900, 950, 1000, 1050, 1100, 1150, 1200, 1250, or 1300° C., for a duration of 0.1 hour to about 168 hours, in an atmosphere comprising hydrogen.

In some embodiments, the support or doped support may be maintained at a temperature of about 200° C. to about 1300° C., for a duration of at least about 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 132, 144, or 156 hours, in an atmosphere comprising hydrogen. In some embodiments, the support or doped support may be maintained at a temperature from about 200° C. to about 1300° C., for a duration of not more than about 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 132, 144, 156, or 168 hours, in an atmosphere comprising hydrogen.

Effect of Reduction Temperature

As discussed above, once the ruthenium precursor is deposited on the alumina carrier or support, reduction of the precursor may lead to an improved ruthenium nanoparticle catalyst that can be used to facilitate ammonia decomposition. The conditions of such reduction may strongly influence the physical or chemical properties or characteristics of the ruthenium on the surface of the support, and thus the activity and/or ammonia conversion efficiency of the catalyst. Surprisingly, the conditions of reduction may strongly influence properties of the ruthenium nanoparticles on the surface, including, for example, size, dispersion and dominant crystal facets.

Figure 9:
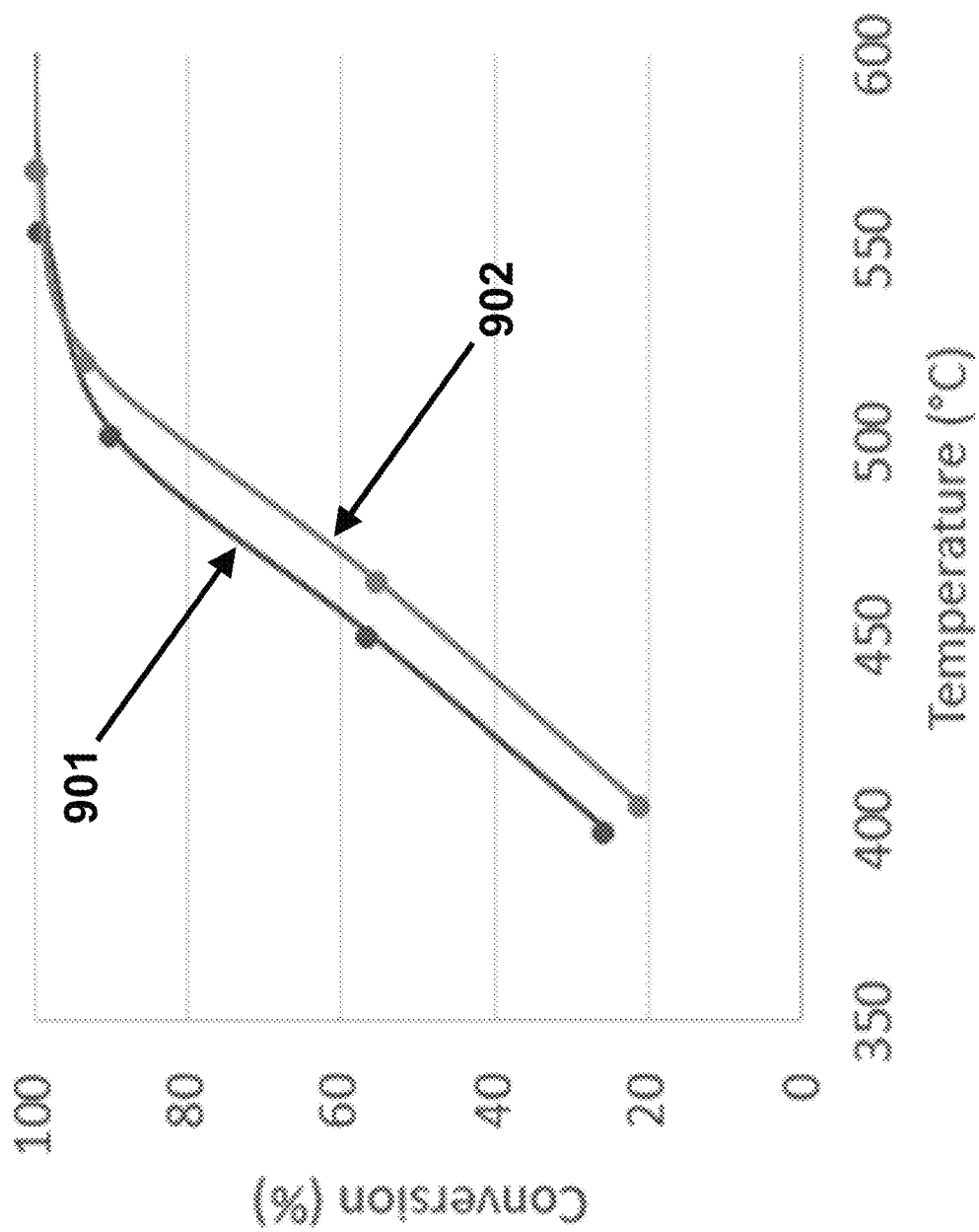
FIG. 9 illustrates a comparison of ammonia conversion efficiencies for various catalysts synthesized via reduction at different temperatures, in accordance with some embodiments.

Described herein is an example that reduction at a higher temperature may surprisingly result in improved ammonia conversion performance across a wide temperature range (from about 400° C. to about 550° C.), even for a more effective, doped catalyst. With reference to FIG. 9, a Ru/La-gamma-alumina catalyst may be prepared according to the methods and materials described herein, and reduced for a set period of time in a $H_2$ atmosphere, at a temperature of about 900° C. 901, or about 500° C. 902.

In some instances, the catalyst reduction temperature may range from about 500 to about 1300, from about 550 to about 1250, from about 600 to about 1200, from about 650 to about 1150, from about 700 to about 1100, from about 750 to about 1050, from about 800 to about 1000, or from about 850 to about 950° C. In some cases, the catalyst reduction period may range from about 0.5 hour to about 200 hours, from about 1 hour to about 190 hours, from about 5 hours to about 180 hours, or from about 10 hours to about 170 hours, from about 15 hours to about 160 hours, from about 20 hours to about 150 hours, from about 25 hours to about 140 hours, or from about 30 hours to about 130 hours, from about 35 hours to about 120 hours, from about 40 hours to about 110 hours, from about 45 hours to about 100 hours, or from about 50 hours to about 95 hours, from about 55 hours to about 90 hours, from about 60 hours to about 85 hours, from about 65 hours to about 80 hours, or from about 70 hours to about 75 hours.

Alumina Support Phase

While gamma-alumina is an alumina phase that is commonly used as a catalyst support, other phases of alumina exist, including alpha, theta, delta and eta. Alpha alumina ($\alpha$-$Al_2O_3$) can be provided in a highly sintered form of the support with a very low surface area, which can lead to poor catalyst dispersion. In contrast, theta alumina ($\theta$-$Al_2O_3$) can be a phase that is generated during the transition from gamma to alpha at very high temperatures and can retain a relatively high surface area, which can make theta alumina one example of a higher performing support material.

Described herein is an example that the unexpected effect of using theta-alumina ($\theta$-alumina) as the support material compared to using gamma-alumina ($\gamma$-alumina). Across a temperature range from about 400° C. to about 550° C., the catalyst using 1.6 mm beads of theta-alumina exhibited equivalent performance to the catalyst using 1.0 mm beads of gamma-alumina. Across a temperature range from about 400° C. to about 525° C., the catalyst using 1.6 mm beads of gamma-alumina gave inferior performance to the other two catalysts. It is surprising to observe improved performance using theta-alumina compared to higher porosity gamma-alumina, but these results indicate that larger form factors can be used with theta-alumina, reducing the pressure drop across the catalyst bed while maintaining conversion performance.

Figure 10:
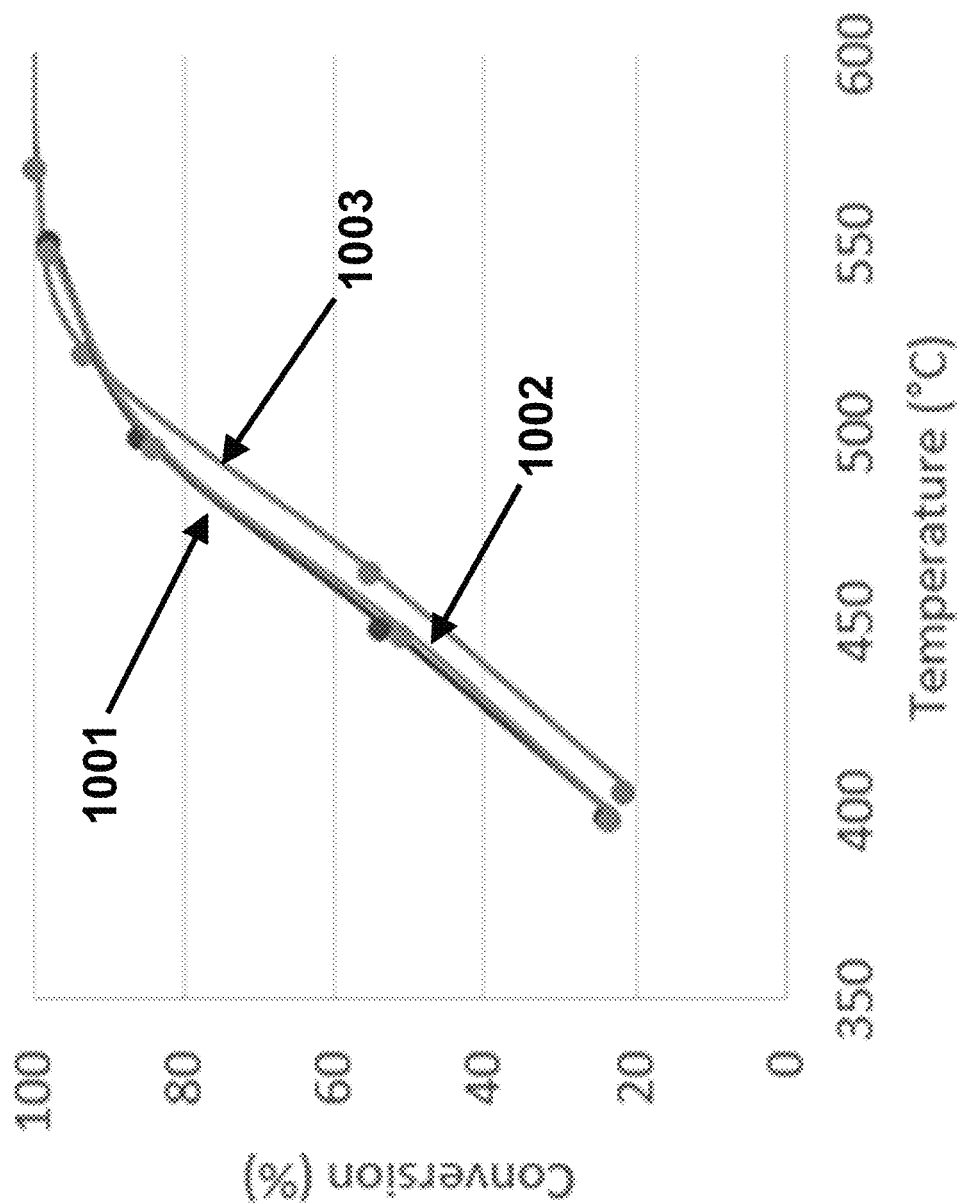
FIG. 10 illustrates a comparison of ammonia conversion efficiencies for various catalysts synthesized using different gamma- and theta-alumina supports, in accordance with some embodiments.
Figure 11:
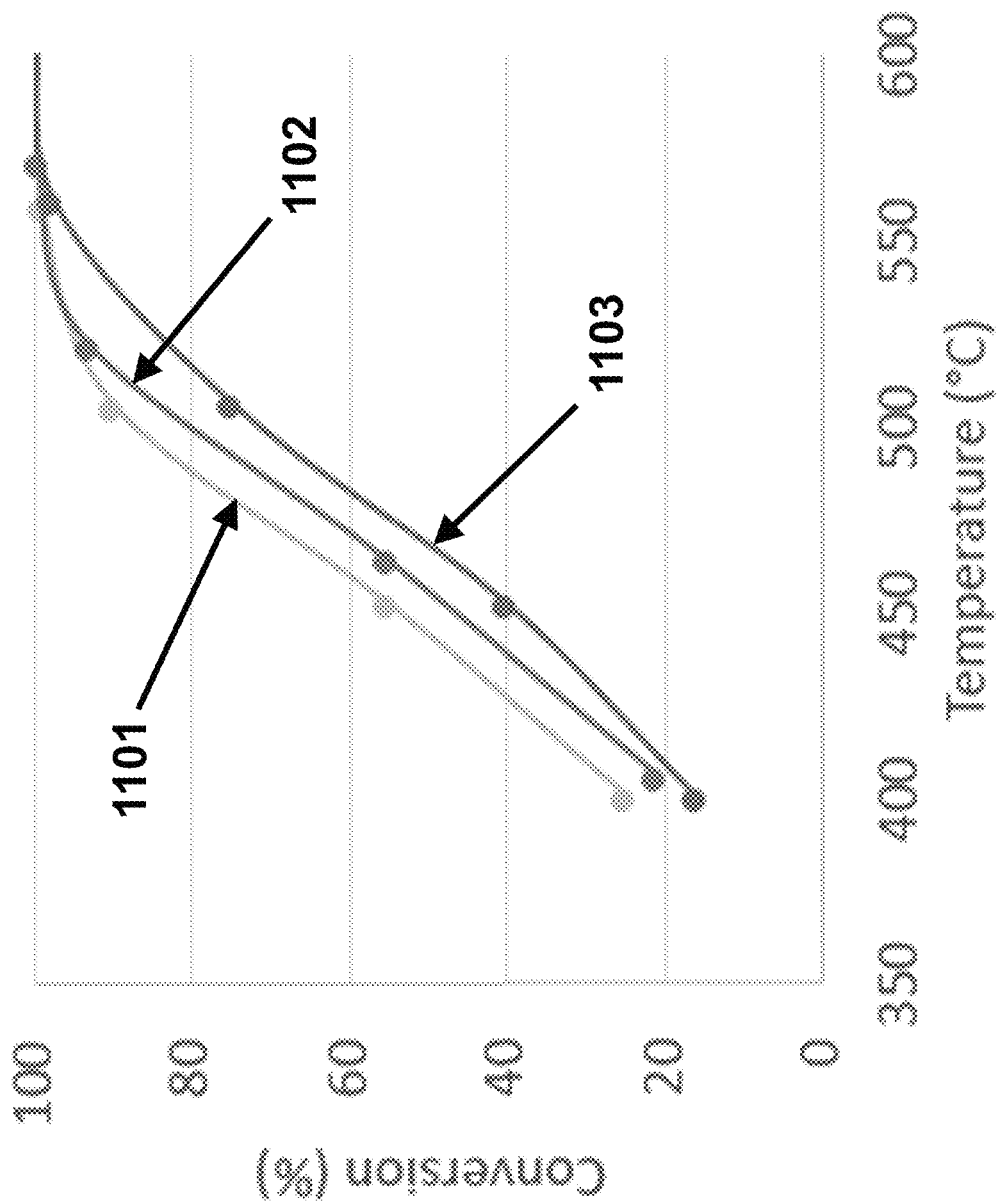
FIG. 11 illustrates a comparison of ammonia conversion efficiencies for various catalysts synthesized using different ruthenium precursors, in accordance with some embodiments.

With reference to FIG. 10, Ru-alumina catalysts may be prepared according to the same methods and materials (described herein) and with the same composition. The catalysts may use 1.6 mm beads comprised of theta-alumina 1001, 1.0 mm beads comprised of gamma-alumina 1002, or 1.6 mm beads comprised of gamma-alumina 1003.

In some cases, in a full-scale reformer, pressure drops may be significant and may be a function of the size of the support used, and as the particles get smaller, the pressure drop may increase. In some cases, switching the phase of the support from gamma-alumina to theta-alumina may allow the catalyst to perform comparably to smaller catalysts, while still minimizing pressure drop with a larger catalyst size. In some embodiments, the support comprises at least one of theta-alumina ($\theta$-$Al_2O_3$) or gamma-alumina ($\gamma$-$Al_2O_3$). In some embodiments, the support comprises theta-alumina ($\theta$-$Al_2O_3$). In some embodiments, the support comprises gamma-alumina ($\gamma$-$Al_2O_3$).

Effect of Ru Precursor

Described herein is an example of the unexpected effect of the choice of Ru precursor. In some cases, the ruthenium nanoparticle catalysts of the present disclosure may be synthesized using various ruthenium precursors comprising, for example, $Ru(NO)(NO_3)_3$, $RuCl_3$ and $Ru_3(CO)_{12}$.

The use of $Ru(NO)(NO_3)_3$ resulted in improved catalyst performance across a wide temperature range (from about 400° C. to about 525° C.). The use of $RuCl_3$ gave lower performance and $Ru_3(CO)_{12}$ provided the lowest performance in a temperature range from about 400° C. to about 600° C. With respect to FIG. 10, Ru-alumina catalysts with 2 wt % Ru content and having the same final composition may be prepared by the same method and materials, described herein. The catalysts may be prepared using a Ru precursor comprising: $Ru(NO)(NO_3)_3$ 1001, $RuCl_3$ 1002, or $Ru_4(CO)_{12}$ 1003.

Mixed La—Al, Ce—Al, and La—Ce—Al Oxide Supports

In some cases, the alumina support may be initially modified by incorporation of lanthanum via high-temperature calcination to generate a La—Al oxide support that can serve as an improved catalyst support.

The catalysts described in this disclosure were prepared by the wet impregnation method, as described herein. Other synthesis techniques (e.g. sol-gel, precipitation, CVD) may also be used to prepare these catalysts. In some embodiments, the catalyst may be prepared by doping a support material with at least one precursor comprising La. In some embodiments, the catalyst may be prepared by doping a support material with at least one precursor comprising Ce. In some instances, the catalyst may be prepared by doping a support material with at least one precursor comprising Cs. In some instances, the catalyst may be prepared by doping a support material with at least one precursor comprising La and Ce. In some embodiments, the catalyst may be prepared by doping a support material with at least one precursor comprising La, Ce and Cs.

In some instances, this may be achieved by using suitable precursors, for example, $La(NO_3)_3$, $Ce(NO_3)_3$, $CsNO_3$, and their hydrates. In some instances, the La and Ce precursors may be applied as one solution (using deionized water, or other suitable solvent), or separately. In some embodiments, the Cs precursor may be applied as a separate solution. In some instances, each precursor may be applied as a separate solution, with a drying step between each application, (as described herein). In some embodiments, the Ce precursor may be applied to the support material before the La precursor. In some embodiments, the La precursor may be applied to the support material before the Ce precursor.

The concentration of the precursor solutions is determined by the desired metal loading on the catalyst. In some embodiments, it may be convenient to use the desired loading of La on the catalyst as the basis for the concentrations of the precursor solution(s). In some embodiments, it may be convenient to use the desired loading of Ce as the basis for the concentrations of precursor solution(s). The relationships between catalyst loading, the required concentrations of the precursor solutions and their preparation are described herein.

Incorporation of La

Described herein is an example of the surprising improvement in ammonia conversion efficiency that may be achieved with the use of theta-alumina support material doped with lanthanum (La), the use of a more effective molar ratio of active metal and promoter, and the selection of appropriate reduction conditions.

Figure 12:
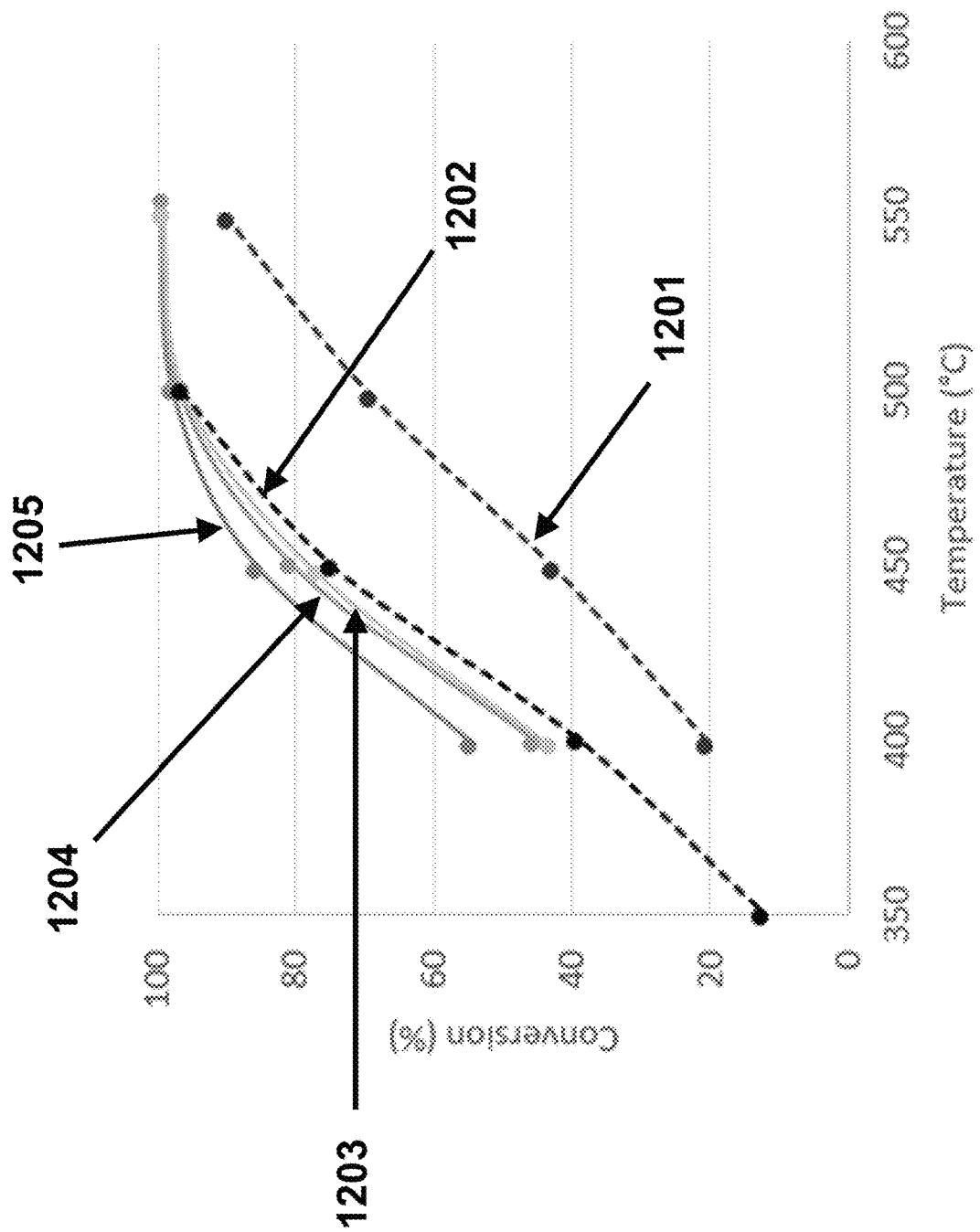
FIG. 12 illustrates a comparison of ammonia conversion efficiencies for various example catalysts fabricated using different combinations of materials and production methods, in accordance with some embodiments.

With respect to FIG. 12, Ru-alumina catalysts may be prepared with the same concentration of Ru and a constant dopant level of La, according to the same methods and materials described herein, and using the same form factor for the support materials. Gamma-alumina (γ-alumina) may be used for the support material (1201 and 1202) or theta-alumina (θ-alumina) may be used (1203, 1204, and 1205). The catalyst may not comprise a promoter 1201, 1203 and 1204, or it may comprise a promoter (Cs) 1202 and 1205. The catalyst may not be subjected to a heat treatment step 1201 and 1202, The catalyst may be subjected to a high temperature reduction step in a $H_2$ atmosphere, for a duration of about 2 hours 1203 and 1205, or for about 12 hours 1204.

In some embodiments, the concentration of La in the catalyst may comprise at least about 1, 2, 3, 4, 5, 6, 7, 8, 9, 10, 11, 12, 13, 14, 15, 16, 17, 18, 19, 20, 21, 22, 23, or 24 mol %. In some embodiments, the concentration of La in the catalyst may comprise not more than about 2, 3, 4, 5, 6, 7, 8, 9, 10, 11, 12, 13, 14, 15, 16, 17, 18, 19, 20, 21, 22, 23, 24, or 25 mol %. In some embodiments, the concentration of La in the catalyst may comprise from about 1 to about 15, about 1 to about 10, about 1 to about 5, about 2 to about 8, about 2 to about 6, about 2 to about 4, about 4 to about 10, about 4 to about 8, about 4 to about 6, about 5 to about 20, about 5 to about 15, about 5 to about 10, about 6 to about 10, about 6 to about 8, about 8 to about 10, about 10 to about 20, about 10 to about 18, about 10 to about 16, about 10 to about 14, about 10 to about 12, about 15 to about 20, about 12 to about 18, about 12 to about 16, about 12 to about 14, about 14 to about 20, about 14 to about 18, about 14 to about 16, about 16 to about 18, or about 18 to about 20 mol %

Incorporation of La with Ce

Figure 13:
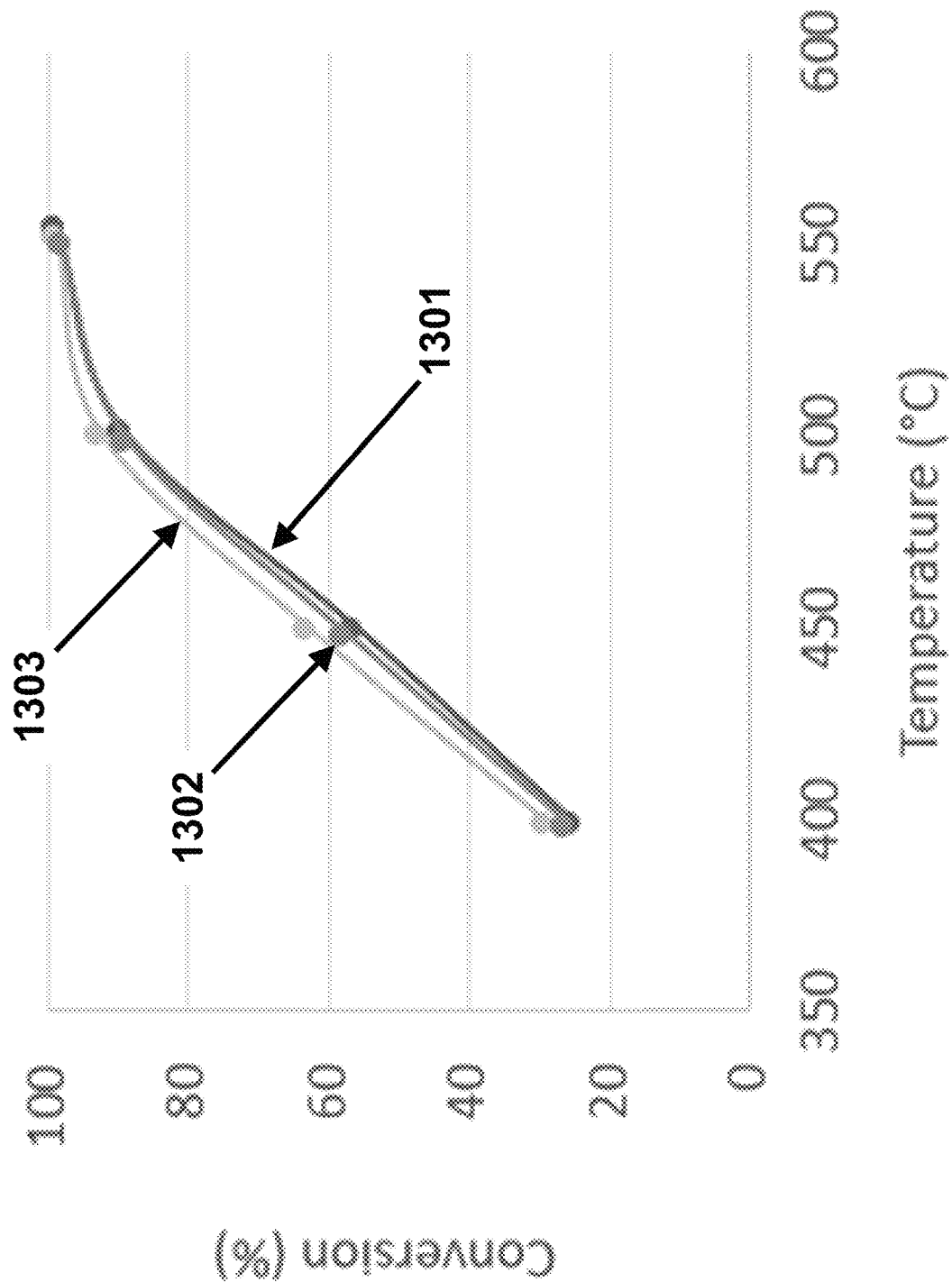
FIG. 13 illustrates a comparison of ammonia conversion efficiencies for various catalysts synthesized with different La and Ce ratios, in accordance with some embodiments.

Described herein is an example of the unexpected synergy between La and Ce to give improved catalyst performance beyond that demonstrated by each dopant alone, while maintaining a constant total dopant metal concentration of 15 mol %. With respect to FIG. 13, Ru-alumina catalysts may be prepared according to the methods and materials described herein, and based on the same form factor for the support. The catalyst may be doped with La 1301, the catalyst may be doped with Ce 1302, or the catalyst may be doped with a of La and Ce combined 1303.

In some instances, it may be convenient to determine the required concentration of Ce in the catalyst by the concentration of La and the desired molar ratio of La and Ce. In some instances, it may be convenient to determine the required concentration of La in the catalyst by the concentration of Ce and the desired molar ratio of Ce and La.

In some embodiments, the concentration of Ce in the catalyst may comprise at least about 1, 2, 3, 4, 5, 6, 7, 8, 9, 10, 11, 12, 13, 14, 15, 16, 17, 18, 19, 20, 21, 22, 23, or 24 mol %. In some embodiments, the concentration of Ce in the catalyst may comprise no more than about 2, 3, 4, 5, 6, 7, 8, 9, 10, 11, 12, 13, 14, 15, 16, 17, 18, 19, 20, 21, 22, 23, 24 or 25 mol %. In some embodiments, the concentration of Ce in the catalyst may comprise from about 1 to about 25, about 1 to about 15, about 1 to about 5, about 2 to about 8, about 2 to about 6, about 2 to about 4, about 4 to about 10, about 4 to about 8, about 4 to about 6, about 5 to about 20, about 5 to about 15, about 5 to about 10, about 6 to about 10, about 6 to about 8, about 8 to about 10, about 10 to about 20, about 10 to about 18, about 10 to about 16, about 10 to about 14, about 10 to about 12, about 15 to about 20, about 12 to about 18, about 12 to about 16, about 12 to about 14, about 14 to about 20, about 14 to about 18, about 14 to about 16, about 16 to about 18, or about 18 to about 20 mol %

In some embodiments, the combined concentration of La and Ce in the catalyst may comprise at least about 1, 2, 3, 4, 5, 6, 7, 8, 9, 10, 11, 12, 13, 14, 15, 16, 17, 18, 19, 20, 21, 22, 23, or 24 mol %. In some embodiments, the combined concentration of La and Ce in the catalyst may comprise no more than about 2, 3, 4, 5, 6, 7, 8, 9, 10, 11, 12, 13, 14, 15, 16, 17, 18, 19, 20, 21, 22, 23, 24 or 25 mol %. In some embodiments, the combined concentration of La and Ce in the catalyst may comprise from about 1 to about 15, about 1 to about 10, about 1 to about 5, about 2 to about 8, about 2 to about 6, about 2 to about 4, about 4 to about 10, about 4 to about 8, about 4 to about 6, about 5 to about 20, about 5 to about 15, about 5 to about 10, about 6 to about 10, about 6 to about 8, about 8 to about 10, about 10 to about 20, about 10 to about 18, about 10 to about 16, about 10 to about 14, about 10 to about 12, about 15 to about 20, about 12 to about 18, about 12 to about 16, about 12 to about 14, about 14 to about 20, about 14 to about 18, about 14 to about 16, about 16 to about 18, or about 18 to about 20 mol %.

High Temperature Treatment to Form Modified Surface Layer

In some cases, the conditions of the high temperature treatment may be selected to improve the solid-state reaction between the alumina ($Al_2O_3$) support and cerium oxide ($CeO_2$) and lanthanum oxide ($La_2O_3$) dopants (or precursors) on the support surface. In some instances, this reaction results in the formation of a surface layer comprised of a perovskite phase, comprising of Al, O, and La. In some instances, this reaction results in the formation of a surface layer comprised of a perovskite phase, comprising of Al, O, and Ce. In some embodiments, this reaction results in the formation of a surface layer comprised of a perovskite phase, comprising of Al, O, La, and Ce. In some instances, the perovskite phase may comprise a continuous matrix of mixed metal oxides $(La:Ce)AlO_x$, wherein the metals are dispersed homogeneously throughout the matrix. In some instances, the perovskite phase may comprise a non-continuous matrix of mixed metal oxides (La:Ce)AlO$_x$, where the metals are dispersed homogenously throughout the matrix. In some cases, the perovskite phase may comprise a continuous matrix of mixed metal oxides, wherein the metals are not dispersed homogeneously throughout the matrix. In some cases, the perovskite phase may comprise a non-continuous matrix of mixed metal oxides, where the metals are not dispersed homogenously throughout the matrix. In some cases, the perovskite phase may comprise one or more repeating unit cells spanning a lattice, where each unit cell comprises lanthanum, cerium, aluminum and oxygen. In some cases, the surface layer comprises theta-alumina (θ-alumina). In some cases, the surface layer comprises gamma-alumina (α-alumina).

In some embodiments, doping of a La—Al oxide support with an electron-donating metal such as cerium may comprise La—Ce—Al oxide supports of the general formula La$_{(1-x)}$Ce$_x$AlO$_3$/Al$_2$O$_3$. In some instances, the La$_{(1-x)}$Ce$_x$AlO$_3$/Al$_2$O$_3$ composition may comprise, for example, a mixed La—Ce oxide structure. In some embodiments, the surface layer comprises a perovskite phase of the general formula La$_{(1-x)}$Ce$_x$AlO$_3$. The value of x in this formula may be at least about 0.1, 0.2, 0.3, 0.4, 0.5, 0.6, 0.7, 0.8, or 0.9. The value of x in this formula may be no more than about 0.2, 0.3, 0.4, 0.5, 0.6, 0.7, 0.8, 0.9, or 0.95. The value of x may be from about 0.05 to about 0.9, from about 0.1 to about 0.7, from about 0.15 to about 0.5, from about 0.2 to about 0.4, or from about 0.25 to about 0.35.

Incorporation of Cs and Ru

In some cases, it may be convenient to determine the required concentration of Cs in the catalyst by the desired molar ratio of Cs and Ru, and the desired concentration of Ru in the catalyst. In some cases, it may be convenient to determine the required concentration of Ru in the catalyst by the desired molar ratio of Ru and Cs, and the desired concentration of Cs in the catalyst.

In some instances, the doped and calcined support is further doped with Cs. In some embodiments, the concentration of Cs in the catalyst may comprise at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 wt %. In some embodiments, the concentration of Cs in the catalyst may comprise not more than about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. In some embodiments, the concentration of Cs in the catalyst may comprise from about 1 to about 15, about 1 to about 10, about 1 to about 5, about 2 to about 8, about 2 to about 6, about 2 to about 4, about 4 to about 10, about 4 to about 8, about 4 to about 6, about 5 to about 20, about 5 to about 15, about 5 to about 10, about 6 to about 10, about 6 to about 8, about 8 to about 10, about 10 to about 20, about 10 to about 18, about 10 to about 16, about 10 to about 14, about 10 to about 12, about 15 to about 20, about 12 to about 18, about 12 to about 16, about 12 to about 14, about 14 to about 20, about 14 to about 18, about 14 to about 16, about 16 to about 18, or about 18 to about 20 wt %.

In some embodiments, the doped and calcined support is further doped with Ru. In some embodiments, the concentration of Ru in the catalyst may comprise at least about 0.1, 0.25, 0.5, 0.75, 1, 1.25, 1.5, 2, 2.5, 3, 3.5, 4, 4.5, 5, 6, 7, 8, 9, 10, 11, 12, 13, or 14 wt %. In some embodiments, the concentration of Ru in the catalyst may comprise no more than about 0.25, 0.5, 0.75, 1, 1.25, 1.5, 2, 2.5, 3, 3.5, 4, 4.5, 5, 6, 7, 8, 9, 10, 11, 12, 13, 14, or 15 wt %. In some embodiments, the concentration of Ru in the catalyst may comprise from about 1 to about 15, about 1 to about 10, about 1 to about 5, about 1 to about 3, about 2 to about 8, about 2 to about 6, about 2 to about 4, about 3 to about 5, about 4 to about 10, about 4 to about 8, about 4 to about 6, about 5 to about 10, about 5 to about 7, about 6 to about 10, about 6 to about 8, about 7 to about 9, or about 8 to about 10 mol %.

In some embodiments, the molar ratio of K or Cs and Ru may comprise at least about 1:2, 1:1, 1.5:1, 2:1, 2.5:1, 3:1, 3.5:1, 4:1, 4.5:1, 5:1, 5.5:1, 6:1, 7:1, 8:1, or 9:1. In some embodiments, the molar ratio of K or Cs and Ru may comprise no more than about 1:1, 1.5:1, 2:1, 2.5:1, 3:1, 3.5:1, 4:1, 4.5:1, 5:1, 5.5:1, 6:1, 7:1, 8:1, 9:1, or 10:1. In some instances, the molar ratio of K or Cs and Ru may comprise from about 1:2 to about 5.5:1, from about 1:1 to about 5:1, from about 1.5:1 to about 4.5:1, from about 2:1 to about 4:1, or from about 2.5:1 to about 3.5:1.

Mixed La—Ce—Al Oxide Support and Cs Promotion for Theta Alumina

Figure 14:
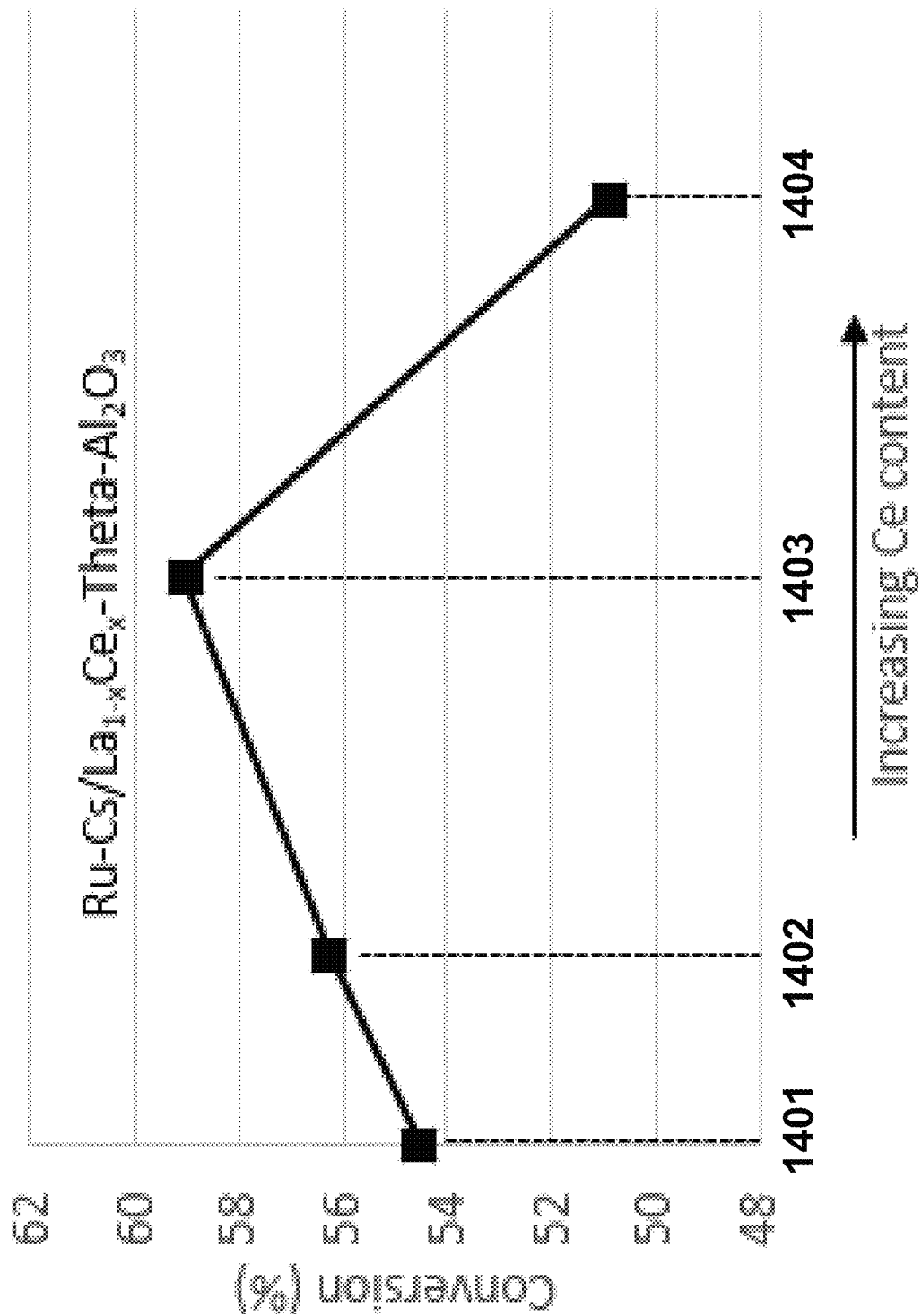
FIG. 14 illustrates a comparison of ammonia conversion efficiencies for various catalysts having different La:Ce molar ratios and variations in ammonia conversion efficiencies based on changes in Ce content, in accordance with some embodiments.
Figure 15:
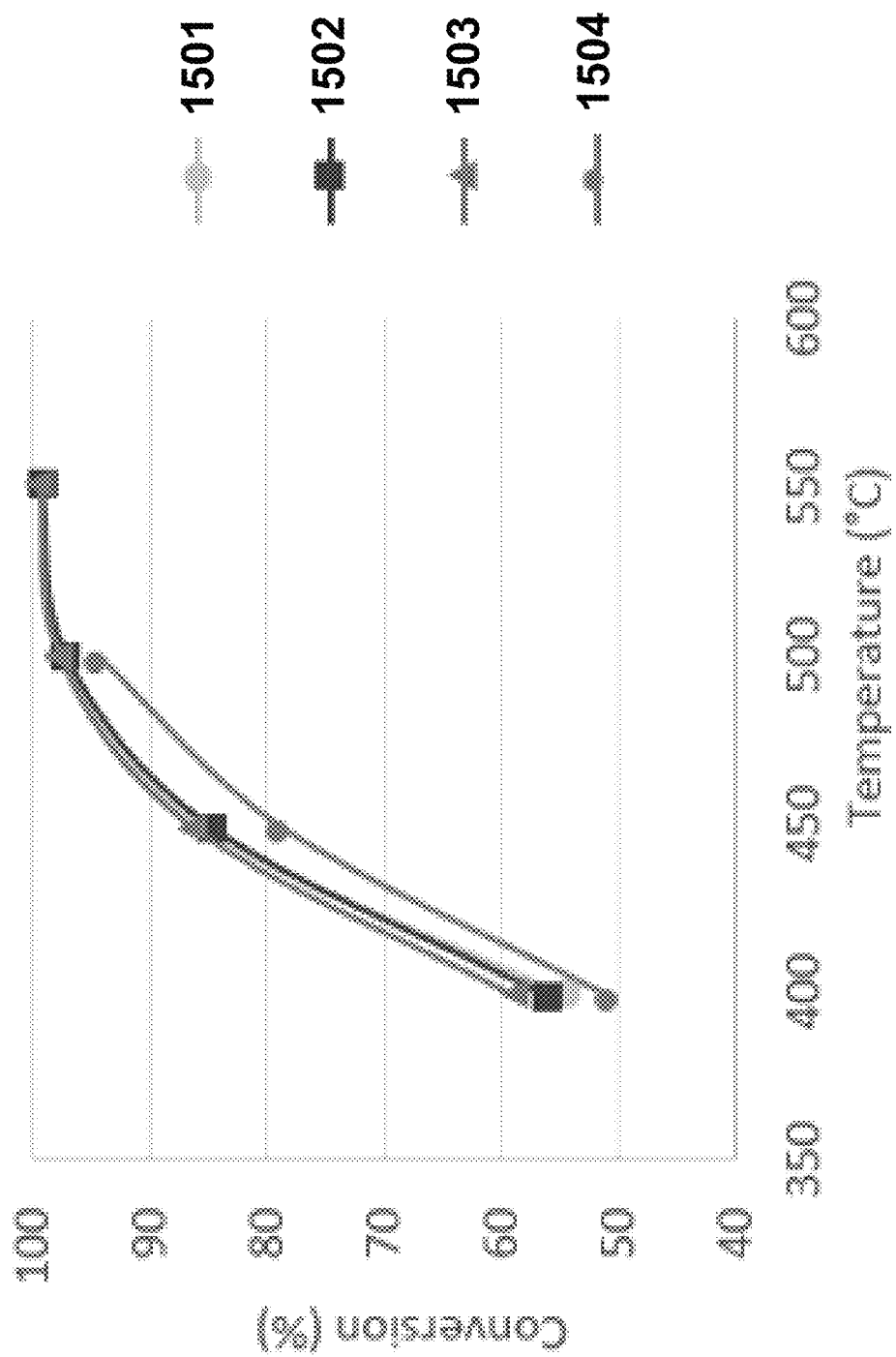
FIG. 15 illustrates a comparison of ammonia conversion efficiencies for various catalysts having different La:Ce molar ratios and variations in ammonia conversion efficiencies based on different operating temperatures, in accordance with some embodiments.

Referring to FIG. 14 and FIG. 15, in some cases, the catalysts of the present disclosure may be further improved by adjusting the molar ratio of La and Ce.

Described herein is an example showing that the unexpected synergy between La and Ce (according to the formula, Ru—Cs/La$_{1-x}$Ce$_x$-Theta-Al$_2$O$_3$) is most effective when the value of x is greater than 0 and less than 0.5 With respect to FIG. 14, Ru-alumina catalysts may be prepared according to the methods and materials described herein, based on theta-alumina (θ-alumina) and the same form factor for the support. The catalysts may comprise the same concentration of active metal (Ru), the same molar ratio of Ru and promoter (Cs), and different ratios of La and Ce dopants at a constant combined dopant loading, according to the formula: Ru—Cs/La$_{1-x}$Ce$_x$-Theta-Al$_2$O$_3$. The catalysts may comprise values for x of: x=0 (no Ce) 1401, x=0.1 1402, x=0.3 1403, or x=0.5 1404. The conversion efficiency of these catalysts was measured at a fixed temperature and fixed NH$_3$ flow rate.

Described herein is an example showing that unexpected synergy between La and Ce is observed across a wide temperature range (about 400° C. to about 550° C.), in the same ratios as used in Example 9. With respect to FIG. 15, Ru-alumina catalysts may be prepared with constant Ru concentration according to the methods and materials described herein, based on theta-alumina (θ-alumina) and the same form factor for the support. The catalysts may comprise Ru/La$_{(1-x)}$Ce$_x$-Theta-Al$_2$O$_3$ with values for x of: x=0 (no Ce) 1501, x=0.1 1502, x=0.3 1503, or x=0.5 1504. The conversion efficiency of these catalysts may be measured across a temperature range and at constant NH$_3$ flow rate.

Such further improvements may yield a catalyst that exhibits enhanced performance characteristics compared to other catalysts fabricated using various baseline conditions. In some examples, the baseline conditions may correspond to an incorporation amount of Ru, a molar ratio of Cs promoter to Ru, a type of Ru precursor, a catalyst reduction temperature, a catalyst reduction period and alumina support phase. In any of the embodiments described herein, the alumina support phase may be theta-alumina, gamma-alumina, or a combination of both. In some embodiments, a mixed La—Ce—Al oxide structure may be introduced on or to a support comprising theta alumina by varying a molar ratio of La and Ce, as shown in FIG. 14 and FIG. 15. In some embodiments, the molar ratio of La and Ce may be at least about 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, 5:95, or 0:100. In some embodiments, the molar ratio of La and Ce may be at least about 100:0, 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, or 5:95. In some embodiments, the molar ratio of La and Ce may be not more than about 100:0, 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, or 5:95. In some embodiments, the molar ratio of La and Ce may range from about 100:0 to about 0:100, 100:0 to 90:10, 100:0 to 80:20, 100:0 to 70:30, 100:0 to 60:40, 100:0 to 50:50, 90:10 to 10:90, 90:10 to 80:20, 90:10 to 70:30, 90:10 to 60:40, 90:10 to 50:50, 80:20 to 70:30, 80:20 to 60:40, 80:20 to 50:50, 75:25, to 70:30, 75:25 to 65:35, 75:25 to 60:40, 75:25 to 55:45, 75:25 to 50:50, 75:25 to 40:60, 70:30 to 65:35, 70:30 to 60:40, 70:30 to 55:45, 70:30 to 50:50, 70:30 to 40:60, 65:35 to 60:40, 65:35 to 55:45, 65:35 to 50:50, 65:35 to 40:60, 60:40 to 50:50, or 60:40 to 40:60. In some cases, there may be an upward trend in activity or ammonia conversion efficiency as a function of cerium content in the support.

Ammonia Reforming System

Figure 16:
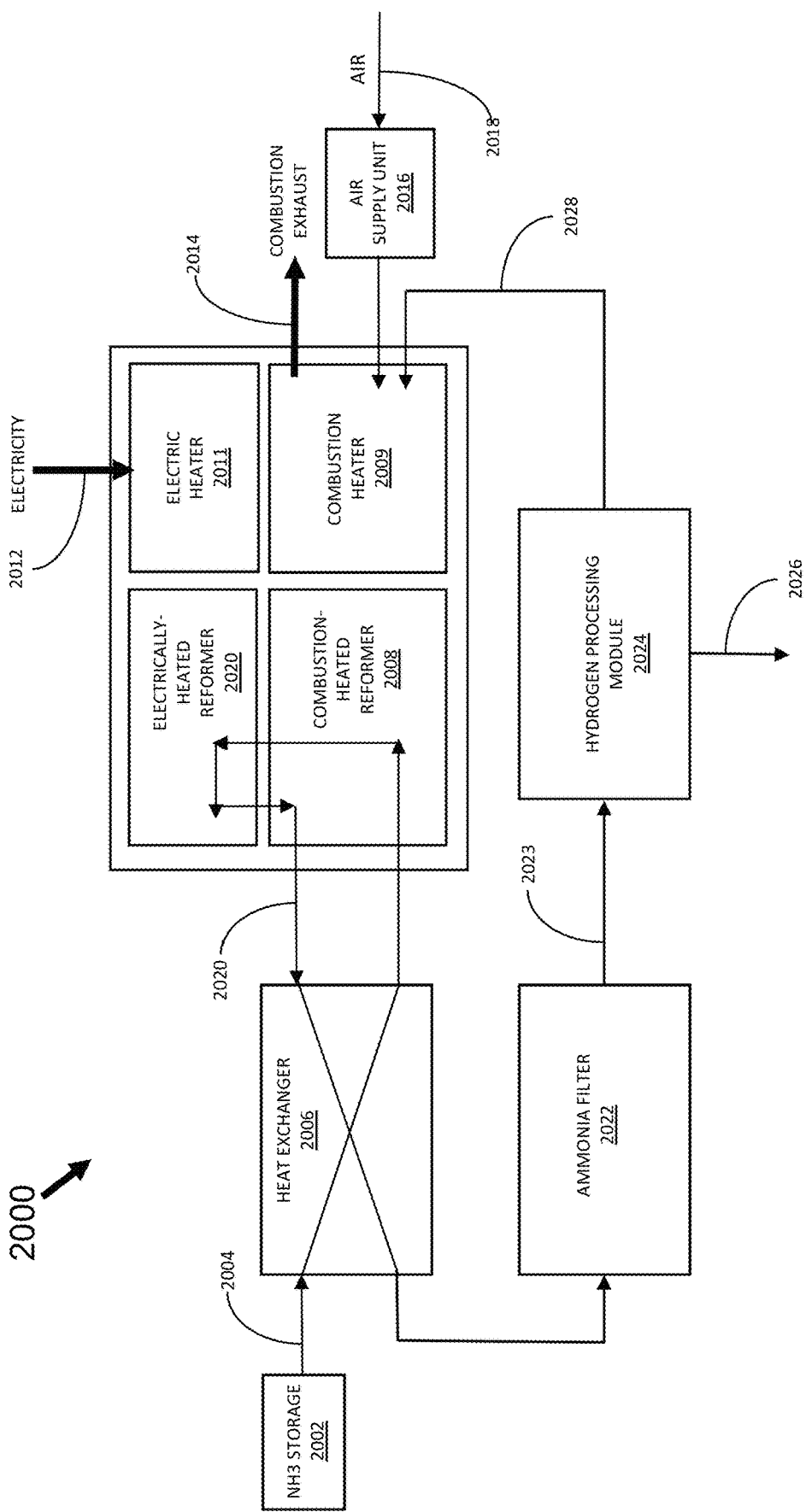
FIG. 16 is block diagram illustrating an ammonia reforming system, in accordance with some embodiments.

FIG. 16 is block diagram illustrating an ammonia reforming system 2000, in accordance with one or more embodiments of the present disclosure. The ammonia reforming system 2000 comprises an $NH_3$ storage tank 2002, a heat exchanger 2006, one or more combustion-heated reformers 2008, a combustion heater 2009, one or more electrically-heated reformers 2010, an electric heater 2011, an air supply unit 2016, an ammonia filter 2022, and a hydrogen processing module 2024. The ammonia reforming system is described in more detail in U.S. patent application Ser. No. 17/974,885, which is incorporated herein by reference in its entirety for all purposes.

The $NH_3$ storage tank 2002 may be configured to store $NH_3$ under pressure (e.g., 7-9 bars absolute) and/or at a low temperature (e.g., −30° C.). The $NH_3$ storage tank 2002 may comprise a metallic material that is resistant to corrosion by ammonia (e.g., steel). The storage tank 2002 may comprise one or more insulating layers (e.g., perlite or glass wool). In some cases, an additional heater may be positioned near, adjacent, at, or inside the $NH_3$ storage tank 2002 to heat and/or pressurize the $NH_3$ stored therein.

The heat exchanger 2006 may be configured to exchange heat between various input fluid streams and output fluid streams. For example, the heat exchanger 2006 may be configured to exchange heat between an incoming ammonia stream 2004 provided by the storage tank 2002 (e.g., relatively cold liquid ammonia) and a reformate stream 2020 (e.g., a relatively warm $H_2/N_2$ mixture) provided by the reformers 2008 and 2010. The heat exchanger 2006 may be a plate heat exchanger, a shell-and-tube heat exchanger, or a tube-in-tube heat exchanger, although the present disclosure is not limited thereto.

The reformers 2008 and 2010 may be configured to generate and output the reformate stream 2020 comprising at least a mixture of hydrogen ($H_2$) and nitrogen ($N_2$) (with a molar ratio of $H_2$ to $N_2$ of about 3:1 at a high ammonia conversion). The $H_2/N_2$ mixture may be generated by contacting the incoming ammonia stream 2004 with $NH_3$ reforming catalyst positioned inside each of the reformers 2008 and 2010. The reformers 2008 and 2010 may be heated to a sufficient temperature range to facilitate ammonia reforming (for example, of from about 400° C. to about 650° C.).

In some embodiments, the reformers 2008 and 2010 may comprise a plurality of reformers, which may fluidically communicate in various series and/or parallel arrangements. For example, an electrically-heated reformer 2010 may fluidically communicate in series or in parallel with a combustion-heated reformer 2008 (or vice versa) as a pair of reformers 2008-2010. Such a pair of reformers 2008-2010 may fluidically communicate in parallel with other reformer 2008-2010 or pairs of reformers 2008-2010 (so that pairs of reformers 2008-2010 combine their outputs into a single reformate stream 2020), or may fluidically communicate in series with other reformers 2008-2010 or pairs of reformers 2008-2010.

In some embodiments, the number of combustion-heated reformers 2008 may be the same as the number of electrically-heated reformers 2010, and the reformers 2008-2010 may fluidically communicate in various series and/or parallel arrangements. For example, two electrically-heated reformers 2010 may fluidically communicate in series with two combustion-heated reformers 2008 (or vice versa).

In some embodiments, the number of combustion-heated reformers 2008 may be different from the number of electrically-heated reformers 2010 and the reformers 2008-2010 may fluidically communicate in various series and/or parallel arrangements. For example, two electrically-heated reformers 2010 may fluidically communicate in series with four combustion-heated reformers 2008 (or vice versa).

The combustion heater 2009 may be in thermal communication with the combustion-heated reformer 2008 to heat the $NH_3$ reforming catalyst 2030 in the reformer 2008. The combustion heater 2009 may react at least part of the reformate stream 2020 (e.g., the $H_2$ in the $H_2/N_2$ mixture) with an air stream 2018 (e.g., at least oxygen ($O_2$)). The heat from the exothermic combustion reaction in the combustion heater 2009 may be transferred to the $NH_3$ reforming catalyst 2030 in the reformer 2008. For example, the hot combustion product gas 2014 may contact walls of the reformer 2008, and the hot combustion product gas 2014 may be subsequently output from the combustion heater 2009 as combustion exhaust 2014. The combustion heater 2009 may comprise a separate component from the reformer 2008 (and may be slidably insertable or removable in the reformer 2008). In some cases, the combustion heater 2009 is a unitary structure with the combustion-heated reformer 2008 (and both the reformer 2008 and the heater 2009 may be manufactured via 3D printing and/or casting).

The air supply unit 2016 (e.g., one or more pumps and/or compressors) may be configured to supply the air stream 2018 (which may be sourced from the atmosphere, and may comprise at least about 20% oxygen by molar fraction). The air stream 2018 may comprise pure oxygen by molar fraction, or substantially pure oxygen by molar fraction (e.g., at least about 99% pure oxygen).

The electric heater 2011 may be in thermal communication with the electrically-heated reformer 2010 to heat the $NH_3$ reforming catalyst 2030 in the reformer 2010. The electric heater 2011 may heat the $NH_3$ reforming catalyst 2030 in the electrically-heated reformer 2010 by resistive heating or Joule heating. In some cases, the electrical heater 2011 may comprise at least a heating element (e.g., nichrome or ceramic) that transfers heat to the catalyst 2030 in the electrically-heated reformer 2010. In some cases, the electrical heater 2011 may comprise metal electrodes (e.g., copper or steel electrodes) that pass a current through the catalyst 2030 to heat the catalyst 2030 in the reformer 2010.

The ammonia filter 2022 may be configured to filter or remove trace ammonia in the reformate stream 2020. The ammonia filter 2022 may be configured to reduce the concentration of $NH_3$ in the reformate stream 2020, for example, from greater than about 10,000 parts per million (ppm) to less than about 100 ppm. The ammonia filter 2022 may comprise a fluidized bed comprising a plurality of particles or pellets. The ammonia filter 2022 may be cartridge-based (for simple replaceability, for example, after the ammonia filter 2022 is saturated with ammonia).

The ammonia filter 2022 may comprise an adsorbent (e.g., bentonite, zeolite, clay, biochar, activated carbon, silica gel, metal organic frameworks (MOFs), and other nanostructured materials). The adsorbent may comprise pellets, and may be stored in one or more columns or towers. In some instances, the ammonia filter 2022 may comprise an absorbent, a solvent-based material, and/or a chemical solvent.

In some embodiments, the ammonia filter 2022 comprises a multi-stage ammonia filtration system (e.g., water-based) comprising a plurality of filtration stages. The replacement of water-based absorbents may be performed for continuous operation.

In some embodiments, the ammonia filter 2022 comprises a selective ammonia oxidation (SAO) reactor including oxidation catalysts configured to react the trace ammonia in the reformate stream 2020 with oxygen ($O_2$) to generate nitrogen ($N_2$) and water ($H_2O$). The air stream 2018 (or a separate oxygen source) may be provided to the SAO reactor to provide the oxygen for the oxidation reaction.

In some embodiments, the ammonia filter 2022 may comprise an acidic ammonia remover (for example, in addition to adsorbents), which may include an acidic solid or solution. The acidic ammonia remover may be regenerated (to desorb the ammonia captured therein) by passing an electric current through the acidic ammonia remover.

The hydrogen processing module 2024 may be a fuel cell comprising an anode, a cathode, and an electrolyte between the anode and the cathode. The fuel cell 2024 may comprise a polymer electrolyte membrane fuel cell (PEMFC), a solid oxide fuel cell (SOFC), a molten carbonate fuel cell (MCFC), a phosphoric acid fuel cell (PAFC), or an alkaline fuel cell (AFC), although the present disclosure is not limited thereto. The fuel cell 2024 may process the $H_2$ in the reformate stream 2020 at an anode, and process the $O_2$ in the air stream at a cathode, to generate electricity (to power an external electrical load). The fuel cell 2024 may be configured to receive hydrogen (e.g., at least part of the reformate stream 2020) via one or more anode inlets, and oxygen (e.g., at least part of the air stream 2018 or a separate air stream) via one or more cathode inlets.

In some embodiments, the fuel cell 2024 may output unconsumed hydrogen (e.g., as an anode off-gas) via one or more anode outlets, and/or may output unconsumed oxygen (e.g., as a cathode off-gas) via one or more cathode outlets. The anode off-gas and/or the cathode off-gas may be provided to the combustion heater 2009 as reactants for the combustion reaction performed therein.

The storage tank 2002 may be in fluid communication with the combustion-heated reformer 2008 and/or the electrically-heated reformer 2010 (e.g., using one or more lines or conduits). The storage tank 2002 may provide the incoming ammonia stream 2004 (for example, by actuating a valve). In some instances, the heat exchanger 2006 may facilitate heat transfer from the (relatively warmer) reformate stream 2020 to the (relatively cooler) incoming ammonia stream 2004 to preheat and/or vaporize the incoming ammonia stream 2004 (changing the phase of the ammonia stream 2004 from liquid to gas). The incoming ammonia stream 2004 may then enter the reformers 2008 and 2010 to be reformed into hydrogen and nitrogen.

In some embodiments, the incoming ammonia stream 2004 may first be partially reformed by the electrically-heated reformer 2010 into a partially cracked reformate stream 2020 (e.g., comprising at least about 10% $H_2/N_2$ mixture by molar fraction) (for example, during a start-up or initiation process). Subsequently, the partially cracked reformate stream 2020 may be further reformed in the combustion-heated reformer 2008 to generate a substantially cracked reformate stream (e.g., comprising less than about 10,000 ppm of residual or trace ammonia by volume and/or greater than about 99% $H_2/N_2$ mixture by molar fraction). Passing the ammonia stream 2004 through the electrically-heated reformer 2010 first, and then subsequently passing the ammonia stream 2004 through the combustion-heated reformer 2008, may advantageously result in more complete ammonia conversion (e.g., greater than about 99%).

In some embodiments, the incoming ammonia stream 2004 may first be partially reformed by the combustion-heated reformer 2008 into a partially cracked reformate stream 2020 (e.g., comprising at least about 10% $H_2/N_2$ mixture by molar fraction). Subsequently, the partially cracked reformate stream 2020 may be further reformed in the electrically-heated reformer 2010 to generate a substantially cracked reformate stream (e.g., comprising less than about 10,000 ppm of residual or trace ammonia by volume and/or greater than about 99% $H_2/N_2$ mixture by molar fraction). Passing the ammonia stream 2004 through the combustion-heated reformer 2008 first, and then subsequently passing the ammonia stream 2004 through the electrically-heated reformer 2010, may advantageously result in more complete ammonia conversion (e.g., greater than about 99%).

In some cases, the incoming ammonia stream 2004 may first be preheated by the combustion exhaust 2014 and/or the combustion heater 2009. In some cases, the preheated incoming ammonia stream 2004 may then enter the reformers 2008 and 2010 to be reformed into hydrogen and nitrogen.

In some embodiments, the incoming ammonia stream 2004 may first be reformed by the electrically-heated reformer 2010 to generate a partially or substantially cracked reformate stream 2020 (for example, during a start-up or initiation process). Subsequently, at least part of the partially or substantially cracked reformate stream 2020 generated by the electrically-heated reformer 2010 may be combusted as a combustion fuel to heat at least one combustion heater 2009 of the one or more combustion-heated reformers 2008.

In some cases, the electrically-heated reformer 2010 may be configured to preheat or vaporize the incoming ammonia stream 2004 (to avoid reforming liquid ammonia). In some cases, the electrically-heated reformer 2010 may reform or crack the incoming ammonia stream 2004 at an ammonia conversion efficiency of at least about 10, 15, 20, 25, 30, 35, 40, 45, 50, 55, 60, 65, 70, 75, 80, 85, 90, 95, 99, or 99.5%. In some cases, the electrically-heated reformer 2010 may reform or crack the incoming ammonia stream 2004 at an ammonia conversion efficiency of at most about 10, 15, 20, 25, 30, 35, 40, 45, 50, 55, 60, 65, 70, 75, 80, 85, 90, 95, 99, or 99.5%. In some cases, the electrically-heated reformer 2010 may reform or crack the incoming ammonia stream 2004 at an ammonia conversion efficiency of about 10 to about 30, about 20 to about 40, about 30 to about 50, about 40 to about 60, about 50 to about 70, about 60 to about 80, about 70 to about 90, about 80 to about 99%, or about 90 to about 99.5%.

In some cases, power input to the electric heater 2011 of the electrically-heated reformer 2010 may be reduced or entirely turned off based on a temperature of the combustion-heated reformer 2008 and/or the combustion heater 2009 being equal to or greater than a target temperature (e.g., in a target temperature range). In some cases, power input to the electric heater 2011 of the electrically-heated reformer 2010 may be reduced or entirely turned off based on a flow rate of the incoming ammonia stream 2004 being equal to or greater than a target flow rate range. In some cases, power input to the electric heater 2011 of the electrically-heated reformer 2010 may be turned on or increased during an entire operational time period of the ammonia reforming system 2000 (e.g., during the startup mode, the operation mode, and/or the hot standby mode described in the present disclosure). In some cases, power input to the electric heater 2011 of the electrically-heated reformer 2010 may be turned on or off, or increased intermittently during the operational time period of the ammonia reforming system 2000 (e.g., turned on or increased during the startup mode and/or the hot standby mode, and turned off or decreased during the operation mode).

In some cases, power input to the electric heater 2011 may be controlled so that the temperature of the electrically-heated reformer 2010 and/or the electrical heater 2011 increases or decreases at a target temperature change rate ($\Delta$Temperature/$\Delta$Time, e.g., $°$ C./minute). In some cases, the target temperature change rate is at least about 5, 10, 20, 25, 30, 35, 40, 45, 50, 60, 65, 70, 75, 80, 85, 90, 95, or $100°$ C./minute. In some cases, the target temperature change rate is at most about 5, 10, 20, 25, 30, 35, 40, 45, 50, 60, 65, 70, 75, 80, 85, 90, 95, or $100°$ C./minute.

The filtered reformate stream 2023 may be provided to the hydrogen processing module 2024 to generate electrical power 2026. An external load (e.g., an electrical motor to power a transport vehicle, or a stationary electrical grid) may utilize the electrical power 2026. The fuel cell 2024 may provide the anode off-gas 2028 (e.g., containing unconsumed or unconverted hydrogen) to the combustion heater 2009 to combust for self-heating.

In some embodiments, the ammonia reforming system 2000 includes a battery (so that the system 2000 is a hybrid fuel cell-battery system). The battery may be configured to power an external load in addition to the hydrogen processing module 2024. The hydrogen processing module 2024 may be configured to charge the battery (for example, based a charge of the battery being less than a threshold charge).

In some cases, the hydrogen processing module 2024 comprises steel or iron processing, a combustion engine, a combustion turbine, hydrogen storage, a chemical process, a hydrogen fueling station, and the like.

Reformer Control

In some cases, ammonia may be directed to a reformer at an ammonia flow rate to generate a reformate stream comprising hydrogen and nitrogen. The reformer may include any catalyst described herein. In some cases, the catalyst may be at a temperature greater than $575°$ C. and less than about $725°$ C., and the reformate stream may be generated at an ammonia conversion efficiency of greater than about 70% and less than about 99.99%.

The first portion of the reformate stream may be combusted with oxygen at an oxygen flow rate in a combustion heater to heat the reformer. A second portion of the reformate stream may be processed in a hydrogen processing module (e.g., a fuel cell or an internal combustion engine). Based at least in part on a stimulus, at least one of the following may be performed: (i) changing (increasing or decreasing) the ammonia flow rate to the reformer, (ii) changing (increasing or decreasing) a percentage of the reformate stream that is the first portion of the reformate stream, (iii) changing (increasing or decreasing) a percentage of the reformate stream that is the second portion of the reformate stream, or (iv) changing (increasing or decreasing) the oxygen flow rate.

In some cases, the stimulus comprises a change in an amount of the hydrogen used by the hydrogen processing module (e.g., change in hydrogen demand). In some cases, the stimulus comprises a temperature of the reformer being outside of a target temperature range. In some cases, the stimulus comprises a change in an amount or concentration of ammonia in the reformate stream.

In some cases, the stimulus is based at least in part on an increase in an amount of the hydrogen used by the hydrogen processing module. In some cases, the increase in an amount of hydrogen used is a projected increase in an amount of hydrogen used (in other words, a predicted increase in demand of hydrogen by the hydrogen processing module at a subsequent time) or a target increase in an amount of hydrogen used. In some cases, based on the increase in an amount of hydrogen used by the hydrogen processing module, one or more of (i) the ammonia flow rate is increased, (ii) the percentage of the reformate stream that is the first portion of the reformate stream is decreased, (iii) the percentage of the reformate stream that is the second portion of the reformate stream is increased, or (iv) the percentage of the reformate stream that is vented or flared (or directed out of the combustion heater) is decreased.

In some cases, the stimulus is based at least in part on a decrease in an amount of the hydrogen used by the hydrogen processing module. In some cases, the decrease in an amount of hydrogen used is a projected decrease in an amount of hydrogen used (in other words, a predicted decrease in demand of hydrogen by the hydrogen processing module at a subsequent time) or a target decrease in an amount of hydrogen used. In some cases, based on the decrease in an amount of hydrogen used by the hydrogen processing module, one or more of: (i) the ammonia flow rate is decreased, (ii) the percentage of the reformate stream that is the first portion of the reformate stream is increased, (iii) the percentage of the reformate stream that is the second portion of the reformate stream is decreased, or (iv) the percentage of the reformate stream that is vented or flared (or directed out of the combustion heater) is increased.

In some cases, the stimulus comprises (a) a discontinued processing of hydrogen using the hydrogen processing module or (b) a fault or malfunction of the hydrogen processing module.

In some cases, a plurality of hydrogen processing modules each comprise the hydrogen processing module, and the stimulus comprises at least one of (a) a discontinued processing of the hydrogen using one of the plurality of hydrogen processing modules and/or (b) a fault or malfunction in one of the plurality of hydrogen processing modules.

In some cases, the percentage of the reformate stream that is the second portion of the reformate stream (processed by the hydrogen processing module) is changed to about zero percent in response to the stimulus.

In some cases, substantially none of the reformate stream is directed to the hydrogen processing module in response to the stimulus.

In some cases, substantially all of the reformate stream is directed to at least one of a combustion-heated reformer and/or a combustion heater in thermal communication with the combustion-heated reformer in response to the stimulus.

In some cases, a portion of the reformate stream is vented or flared in response to the stimulus.

In some cases, the stimulus is detected using a sensor. In some cases, the stimulus is communicated to a controller. In some cases, the adjustment(s) are performed with the aid of a programmable computer or controller. In some cases, the adjustment(s) are performed using a flow control unit.

In some cases, the stimulus is a pressure. In some cases, the pressure is increased in response to decreasing a flow rate to the hydrogen processing module. In some cases, the stimulus is a pressure of the reformate stream.

In some cases, a temperature in the reformer or the combustion heater may be measured, and, based at least in part on the measured at least one of the following may be performed: (i) changing (increasing or decreasing) the ammonia flow rate to the reformer, (ii) changing (increasing or decreasing) a percentage of the reformate stream that is the first portion of the reformate stream, (iii) changing (increasing or decreasing) a percentage of the reformate stream that is the second portion of the reformate stream, (iv) changing (increasing or decreasing) the oxygen flow rate, or (v) changing a percentage of the reformate stream that is directed out of the combustion heater.

In some cases, the second portion of the reformate stream that is processed by the hydrogen processing module may not be completely consumed or utilized by the hydrogen processing. A leftover stream or off-gas (comprising at least hydrogen) may be provided from the hydrogen processing module to the combustion heater (to combust as fuel). Therefore, increasing or decreasing a percentage of the reformate stream that is the second portion of the reformate stream may provide more or less fuel to the combustion heater (therefore a percentage of the reformate stream that is the first portion of the reformate stream may be increased or decreased).

Embodiments

Embodiment 1: A catalyst for ammonia decomposition, comprising: a support comprising at least one of alumina, silica, carborundum, zeolite, ceria, zirconia, graphite oxide, carbon, graphene, carbon nanofibers and carbon nanotubes, and a layer adjacent to the support, wherein the layer comprises the support material doped with an oxide of at least one of an alkali metal, an alkaline earth metal, or a rare earth metal; and one or more active metal particles adjacent to the layer, wherein the one or more active metal particles comprises at least one of Ru, Ni, Rh, Ir, Co, Fe, Pt, Cr, Mo, Pd, or Cu; and wherein the concentration of the active metal particles is at least about 0.1, and not more than about 15 wt %.

Embodiment 2: The catalyst of embodiment 1, wherein the support comprises aluminum and oxygen.

Embodiment 3. The catalyst of embodiment 1, wherein the layer comprises at least one of theta-alumina (θ-alumina) or gamma-alumina (γ-alumina).

Embodiment 4. The catalyst of embodiment 1, wherein the layer comprises a perovskite phase.

Embodiment 5. The catalyst of embodiment 1, wherein the layer comprises La at a concentration of at least about 0.1, and not more than about 50 mol %.

Embodiment 6. The catalyst of embodiment 1, wherein said layer comprises La and Ce, wherein the molar ratio of the La to the Ce is at least about 10:90, and not more than about 90:10.

Embodiment 7. The catalyst of embodiment 1, wherein at least one of the support or the layer further comprises a promoter comprising at least one of K, Cs, or Rb.

Embodiment 8. The catalyst of embodiment 7, wherein a molar ratio of the promoter to the active metal particles is at least about 1:2, and not more than about 10:1.

Embodiment 9. The catalyst of embodiment 1, wherein the active metal particles comprise ruthenium (Ru).

Embodiment 10. The catalyst of embodiment 9, wherein the concentration of Ru is at least about 0.5, and not more than about 10 wt %.

Embodiment 11. The catalyst of embodiment 9, wherein the layer comprises nanoparticles of elemental Ru.

Embodiment 12. The catalyst of embodiment 1, wherein the layer comprises oxide nanoparticles of at least one of La, Ce, K, Cs or Rb.

Embodiment 13. The catalyst of embodiment 1, wherein the layer comprises annealed nanoparticles of at least one of La, Ce, K, Cs or Rb.

Embodiment 14. A method of producing a catalyst for ammonia decomposition, comprising: (a) providing a support comprising at least one of alumina, silica, carborundum, zeolite, ceria, zirconia, graphite oxide, carbon, graphene, carbon nanofibers, or carbon nanotubes or precursor(s) thereof; (b) depositing a layer adjacent to the support comprising at least one of an alkali metal oxide or precursors thereof, an alkaline earth metal oxide or precursors thereof, or a rare earth metal oxide or precursor(s) thereof, to form a doped support; (c) depositing a precursor of one or more active metal particles adjacent to the layer, wherein the one or more active metal particles comprise at least one of Ru, Ni, Rh, Ir, Co, Fe, Pt, Cr, Mo, Pd, or Cu, wherein the concentration of the active metal particles is at least about 0.1 wt % and not more than about 15 wt %; and (d) maintaining the doped support at a temperature of at least about 200° C. and not more than about 1300° C. for a duration of at least about 0.1 hour and not more than about 168 hours in an atmosphere comprising hydrogen.

Embodiment 15. The method of embodiment 14, wherein (b) further comprises: maintaining the doped support at a temperature of at least about 20° C. and not more than about 150° C., for a duration of at least about 0.1 hour and not more than about 168 hours in vacuo, or in an inert, anoxic or non-oxidizing atmosphere below 5 bar absolute pressure.

Embodiment 16. The method of embodiment 14, wherein (b) further comprises maintaining the doped support at a temperature of at least about 300° C. and not more than about 1300° C. for a duration of at least about 0.1 hour and not more than about 168 hours, in a non-reducing atmosphere, comprising at least one of: air, $N_2$, $CO_2$, Ar, He, Kr, or Xe.

Embodiment 17. The method of embodiment 14, wherein (b) further comprises maintaining the doped support at a temperature of at least about 300° C. and not more than about 1300° C. for a duration of at least about 0.1 hour and not more than about 168 hours, in an inert, anoxic or non-oxidizing atmosphere, comprising at least one of: $N_2$, $H_2$, Ar, $NH_3$, CO, $CO_2$, He, Kr, or Xe.

Embodiment 18. The method of embodiment 14, wherein the support comprises aluminum and oxygen.

Embodiment 19. The method of embodiment 14, wherein the layer comprises at least one of theta alumina (θ-alumina) or gamma alumina (γ-alumina).

Embodiment 20. The method of embodiment 14, wherein the layer comprises a perovskite phase.

Embodiment 21. The method of embodiment 14, wherein the layer comprises La at a concentration of at least about 0.1 and not more than about 50 mol %.

Embodiment 22. The method of embodiment 14, wherein the layer comprises La and Ce, wherein a molar ratio of the La to the Ce is at least about 10:90 and not more than about 90:10.

Embodiment 23. The method of embodiment 14, wherein the layer comprises depositing one or more promoters or promoter precursor(s); wherein the one or more promoters or promoter precursor(s) comprise at least one of K, Cs, or Rb.

Embodiment 24. The method of embodiment 23, wherein the layer further comprises a molar ratio of the one or more promoters or promoter precursor(s) to the one or more active metal particles comprising at least about 1:2 and not more than about 10:1.

Embodiment 25. The method of embodiment 14, wherein the one or more active metal particles further comprise ruthenium (Ru).

Embodiment 26. The method of embodiment 25, wherein a concentration of Ru comprises at least about 0.5 wt % and not more than about 10 wt %.

Embodiment 27. The method of embodiment 25, wherein (c) the precursor of the one or more active metal particles comprises at least one of $Ru(NO)(NO_3)_3$, $Ru(NO_3)_3$, $RuCl_3$, $Ru_3(CO)_{12}$, $Ru(NH_3)_6Cl_3$ (ruthenium(III) chloride hexaammoniate), $(CHD)Ru(CO)_3$ (cyclohexadiene ruthenium tricarbonyl), $(BD)Ru(CO)_3$ (butadiene ruthenium tricarbonyl), or $(DMBD)Ru(CO)_3$ (dimethylbutadiene ruthenium tricarbonyl).

Embodiment 28. The method of embodiment 14, wherein (a) the support or precursor(s) thereof comprise beads or pellets; wherein the beads or the pellets comprise at least one of (i) a diameter of at least about 0.1 mm and not more than about 10 mm, or (ii) a surface area per unit mass of at least about 50 $m^2$/g and not more than about 500 $m^2$/g.

Embodiment 29. A method of ammonia decomposition comprising: (a) providing a catalyst, comprising: a support comprising at least one of alumina, silica, carborundum, zeolite, ceria, zirconia, graphite oxide, carbon, graphene, carbon nanofibers and carbon nanotubes, and a layer adjacent to the support, wherein the layer comprises the support material doped with an oxide of at least one of an alkali metal, an alkaline earth metal and a rare earth metal; and one or more active metal particles adjacent to the layer, wherein the one or more active metal particles comprise at least one of Ru, Ni, Rh, Ir, Co, Fe, Pt, Cr, Mo, Pd, or Cu; and wherein the concentration of the active metal particles is at least about 0.1, and not more than about 15 wt %; and (b) bringing the catalyst in contact with ammonia at a temperature of at least about 400° C. and not more than about 700° C. to generate hydrogen and nitrogen at an ammonia conversion efficiency of at least 70%.

Embodiment 30. The method of embodiment 29, wherein the ammonia is contacted on the catalyst at a space velocity of at least about 1 and not more than about 30 liters per hour per gram of catalyst, at a temperature of at least about 400° C. and not more than about 700° C.

Embodiment 31. The method of embodiment 29, further comprising generating electricity by providing hydrogen produced by the catalyst to at least one fuel cell, wherein the at least one fuel cell comprises a Proton Exchange Membrane Fuel Cell (PEMFC), a Solid Oxide Fuel Cell (SOFC), a Molten Carbonate Fuel Cell (MCFC), an Alkaline Fuel Cell (AFC), an Alkaline Membrane Fuel Cell (AMFC), or a Phosphoric Acid Fuel Cell (PAFC).

Embodiment 32. The method of embodiment 29, further comprising generating power or electricity by providing hydrogen produced by the catalyst to one or more combustion engines or turbines.

Embodiment 33. A system configured to reform ammonia using the method of embodiment 29.

Embodiment 34. A catalyst for ammonia decomposition, comprising: a support comprising at least one of alumina, silica, carborundum, zeolite, ceria, zirconia, graphite oxide, carbon, graphene, carbon nanofibers and carbon nanotubes, and a layer adjacent to the support, wherein the layer comprises the support material doped with an oxide of at least one of an alkali metal, an alkaline earth metal, or a rare earth metal; and one or more active metal particles adjacent to the layer, wherein the one or more active metal particles comprises at least one of Ru, Ni, Rh, Ir, Co, Fe, Pt, Cr, Mo, Pd, or Cu; and wherein the concentration of the active metal particles is at least about 0.1, and not more than about 15 wt %.

Embodiment 35. The catalyst of embodiment 34, wherein the support comprises aluminum and oxygen.

Embodiment 36. The catalyst of embodiment 34, wherein the layer comprises at least one of theta-alumina (θ-alumina) or gamma-alumina (γ-alumina).

Embodiment 37. The catalyst of embodiment 34, wherein the layer comprises a perovskite phase.

Embodiment 38. The catalyst of embodiment 34, wherein the layer comprises La at a concentration of at least about 0.1, and not more than about 50 mol %.

Embodiment 39. The catalyst of embodiment 34, wherein said layer comprises La and Ce, wherein the molar ratio of the La to the Ce is at least about 10:90, and not more than about 90:10.

Embodiment 40. The catalyst of embodiment 34, wherein at least one of the support or the layer further comprises a promoter comprising at least one of K, Cs, or Rb.

Embodiment 41. The catalyst of embodiment 40, wherein a molar ratio of the promoter to the active metal particles is at least about 1:2, and not more than about 10:1.

Embodiment 42. The catalyst of embodiment 34, wherein the active metal particles comprise ruthenium (Ru).

Embodiment 43. The catalyst of embodiment 42, wherein the concentration of Ru is at least about 0.5, and not more than about 10 wt %.

Embodiment 44. The catalyst of embodiment 42, wherein the layer comprises nanoparticles of elemental Ru.

Embodiment 45. The catalyst of embodiment 34, wherein the layer comprises oxide nanoparticles of at least one of La, Ce, K, Cs or Rb.

Embodiment 46. The catalyst of embodiment 34, wherein the layer comprises annealed nanoparticles of at least one of La, Ce, K, Cs or Rb.

Embodiment 47. A method of producing a catalyst for ammonia decomposition, comprising: (a) providing a support comprising at least one of alumina, silica, carborundum, zeolite, ceria, zirconia, graphite oxide, carbon, graphene, carbon nanofibers, or carbon nanotubes or precursor(s) thereof; (b) depositing a layer adjacent to the support comprising at least one of an alkali metal oxide or precursors thereof, an alkaline earth metal oxide or precursors thereof, or a rare earth metal oxide or precursor(s) thereof, to form a doped support; (c) depositing a precursor of one or more active metal particles adjacent to the layer, wherein the one or more active metal particles comprise at least one of Ru, Ni, Rh, Ir, Co, Fe, Pt, Cr, Mo, Pd, or Cu, wherein the concentration of the active metal particles is at least about 0.1 wt % and not more than about 15 wt %; and (d) maintaining the doped support at a temperature of at least about 200° C. and not more than about 1300° C. for a duration of at least about 0.1 hour and not more than about 168 hours in an atmosphere comprising hydrogen.

Embodiment 48. The method of embodiment 47, wherein (b) further comprises: maintaining the doped support at a temperature of at least about 20° C. and not more than about 150° C., for a duration of at least about 0.1 hour and not more than about 168 hours in vacuo, or in an inert, anoxic or non-oxidizing atmosphere below 5 bar absolute pressure.

Embodiment 49. The method of embodiment 47, wherein (b) further comprises maintaining the doped support at a temperature of at least about 300° C. and not more than about 1300° C. for a duration of at least about 0.1 hour and not more than about 168 hours, in a non-reducing atmosphere, comprising at least one of: air, $N_2$, $CO_2$, Ar, He, Kr, or Xe.

Embodiment 50. The method of embodiment 47, wherein (b) further comprises maintaining the doped support at a temperature of at least about 300° C. and not more than about 1300° C. for a duration of at least about 0.1 hour and not more than about 168 hours, in an inert, anoxic or non-oxidizing atmosphere, comprising at least one of: $N_2$, $H_2$, Ar, $NH_3$, CO, $CO_2$, He, Kr, or Xe.

Embodiment 51. The method of embodiment 47, wherein the support comprises aluminum and oxygen.

Embodiment 52. The method of embodiment 14, wherein the layer comprises at least one of theta alumina (θ-alumina) or gamma alumina (γ-alumina).

Embodiment 53. The method of embodiment 47, wherein the layer comprises a perovskite phase.

Embodiment 54. The method of embodiment 47, wherein the layer comprises La at a concentration of at least about 0.1 and not more than about 50 mol %.

Embodiment 55. The method of embodiment 47, wherein the layer comprises La and Ce, wherein a molar ratio of the La to the Ce is at least about 10:90 and not more than about 90:10.

Embodiment 56. The method of embodiment 47, wherein the layer comprises depositing one or more promoters or promoter precursor(s); wherein the one or more promoters or promoter precursor(s) comprise at least one of K, Cs, or Rb.

Embodiment 57. The method of embodiment 56, wherein the layer further comprises a molar ratio of the one or more promoters or promoter precursor(s) to the one or more active metal particles comprising at least about 1:2 and not more than about 10:1.

Embodiment 58. The method of embodiment 47, wherein the one or more active metal particles further comprise ruthenium (Ru).

Embodiment 59. The method of embodiment 58, wherein a concentration of Ru comprises at least about 0.5 wt % and not more than about 10 wt %.

Embodiment 60. The method of embodiment 58, wherein (c) the precursor of the one or more active metal particles comprises at least one of $Ru(NO)(NO_3)_3$, $Ru(NO_3)_3$, $RuCl_3$, $Ru_3(CO)_{12}$, $Ru(NH_3)_6Cl_3$ (ruthenium(III) chloride hexaammoniate), $(CHD)Ru(CO)_3$ (cyclohexadiene ruthenium tricarbonyl), $(BD)Ru(CO)_3$ (butadiene ruthenium tricarbonyl), or $(DMBD)Ru(CO)_3$ (dimethylbutadiene ruthenium tricarbonyl).

Embodiment 61. The method of embodiment 47, wherein (a) the support or precursor(s) thereof comprise beads or pellets; wherein the beads or the pellets comprise at least one of (i) a diameter of at least about 0.1 mm and not more than about 10 mm, or (ii) a surface area per unit mass of at least about 50 $m^2/g$ and not more than about 500 $m^2/g$.

Embodiment 62. A method of ammonia decomposition comprising: (a) providing a catalyst, comprising: a support comprising at least one of alumina, silica, carborundum, zeolite, ceria, zirconia, graphite oxide, carbon, graphene, carbon nanofibers and carbon nanotubes, and a layer adjacent to the support, wherein the layer comprises the support material doped with an oxide of at least one of an alkali metal, an alkaline earth metal and a rare earth metal; and one or more active metal particles adjacent to the layer, wherein the one or more active metal particles comprise at least one of Ru, Ni, Rh, Jr, Co, Fe, Pt, Cr, Mo, Pd, or Cu; and wherein the concentration of the active metal particles is at least about 0.1, and not more than about 15 wt %; and (b) bringing the catalyst in contact with ammonia at a temperature of at least about 400° C. and not more than about 700° C. to generate a reformate stream comprising hydrogen and nitrogen at an ammonia conversion efficiency of at least about 70% and at most about 99.9%.

Embodiment 63. The method of embodiment 62, wherein the ammonia is contacted on the catalyst at a space velocity of at least about 1 and not more than about 100 liters of ammonia per hour per gram of catalyst.

Embodiment 64. The method of embodiment 62, further comprising generating electricity by providing hydrogen produced by the catalyst to at least one fuel cell, wherein the at least one fuel cell comprises a Proton Exchange Membrane Fuel Cell (PEMFC), a Solid Oxide Fuel Cell (SOFC), a Molten Carbonate Fuel Cell (MCFC), an Alkaline Fuel Cell (AFC), an Alkaline Membrane Fuel Cell (AMFC), or a Phosphoric Acid Fuel Cell (PAFC).

Embodiment 65. The method of embodiment 62, further comprising generating power or electricity by providing hydrogen produced by the catalyst to one or more combustion engines or turbines.

Embodiment 66. A system configured to reform ammonia using the method of embodiment 62.

Embodiment 67. The method of embodiment 62, wherein contacting the catalyst with ammonia to generate the reformate stream is an auto-thermal reforming process so that at least part of the reformate stream provides heat for the auto-thermal reforming process.

Embodiment 68. The method of embodiment 67, wherein the at least part of the reformate stream is at least one of: (1) combusted to generate the heat, or (2) converted by hydrogen-to-electricity conversion to generate the heat, thereby providing the heat for the auto-thermal reforming process.

Embodiment 69. The method of embodiment 62, wherein undecomposed ammonia in the reformate stream is removed by an ammonia filter.

Embodiment 70. The method of embodiment 69, wherein the ammonia filter comprises at least one of an adsorbent, a membrane separation module, or an ammonia scrubber.

Embodiment 71. The method of embodiment 62, wherein a pressure swing adsorption (PSA) module is used to remove nitrogen from the reformate stream.

Embodiment 72. The method of embodiment 62, wherein (b) comprises directing the ammonia to a first reformer to generate the reformate stream; wherein the method comprises combusting the reformate stream in a combustion heater to heat a second reformer; and directing additional ammonia to the second reformer to generate additional hydrogen for the reformate stream, wherein a first portion of the reformate stream is combusted to heat the second reformer.

Embodiment 73. The method of embodiment 72, wherein the first reformer is heated using at least one of an electrical heater or combustion of the reformate stream.

Embodiment 74. The method of embodiment 62, wherein (b) comprises directing the ammonia to a reformer at an ammonia flow rate to generate the reformate stream, wherein the method further comprises: combusting a first portion of the reformate stream with oxygen at an oxygen flow rate in a combustion heater to heat the reformer; processing a second portion of the reformate stream in a hydrogen processing module; and based at least in part on a stimulus, performing one or more of: i. changing the ammonia flow rate; ii. changing a percentage of the reformate stream that is the first portion of the reformate stream; iii. changing a percentage of the reformate stream that is the second portion of the reformate stream; or iv. changing the oxygen flow rate.

Embodiment 75. The method of embodiment 62, wherein (b) comprises directing the ammonia to a reformer at an ammonia flow rate to generate the reformate stream, wherein the method further comprises: combusting a first portion of the reformate stream with oxygen at an oxygen flow rate in a combustion heater to heat the reformer; processing a second portion of the reformate stream in a hydrogen processing module; measuring a temperature in the reformer or the combustion heater; and based at least in part on the measured temperature being outside of a target temperature range of the reformer or the combustion heater, performing one or more of: i. changing the ammonia flow rate; ii. changing the oxygen flow rate; iii. changing a percentage of the reformate stream that is the second portion of the reformate stream; iv. changing a percentage of the reformate stream that is the first portion of the reformate stream; or v. changing a percentage of the reformate stream that is directed out of the combustion heater.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that systems, methods and structures within the scope of these claims and their equivalents be covered thereby.

What is claimed is:

1. A method of ammonia decomposition comprising:
    (a) providing a catalyst, comprising:
        a support comprising alumina and a layer adjacent to the support, wherein the layer comprises the support doped with an oxide of at least one of an alkali metal and a rare earth metal;
        wherein the layer comprises aluminum (Al), cerium (Ce), and lanthanum (La), wherein a molar ratio of La and Ce comprises at least about 50:50 and not more than about 90:10; and
        one or more active metals adjacent to the layer, wherein the one or more active metals comprise Ru, Pt, or Pd;
        wherein a concentration of the one or more active metals is at least about 0.1, and not more than about 15 wt %; and
    (b) bringing the catalyst in contact with ammonia at a temperature of at least about 400° C. and not more than about 700° C. to generate a reformate stream comprising hydrogen and nitrogen at an ammonia conversion efficiency of at least about 70% and at most about 99.9%.

2. The method of claim 1, wherein the layer comprises theta alumina (θ-alumina) or gamma alumina (γ-alumina).

3. The method of claim 1, wherein the layer comprises La at a concentration of at least about 1 and not more than about 20 mol % with respect to the layer and support.

4. The method of claim 1, wherein the alkali metal is K or Cs, and the layer comprises a molar ratio of K or Cs to the one or more active metals comprising at least about 1:2 and not more than about 6:1.

5. The method of claim 1, wherein the one or more active metals is Ru, and a concentration of the Ru comprises at least about 0.5 wt % and not more than about 5 wt % with respect to a weight of the catalyst.

6. The method of claim 1, wherein the ammonia is brought in contact with the catalyst at a space velocity of at least about 1 and not more than about 100 liters of ammonia per hour per gram of catalyst.

7. The method of claim 1, further comprising generating electricity by providing hydrogen produced by the catalyst to at least one fuel cell, wherein the at least one fuel cell comprises a Proton Exchange Membrane Fuel Cell (PEMFC), a Solid Oxide Fuel Cell (SOFC), a Molten Carbonate Fuel Cell (MCFC), an Alkaline Fuel Cell (AFC), an Alkaline Membrane Fuel Cell (AMFC), or a Phosphoric Acid Fuel Cell (PAFC).

8. The method of claim 1, wherein contacting the catalyst with ammonia to generate the reformate stream is an auto-thermal reforming process so that at least part of the reformate stream provides heat for the auto-thermal reforming process.

9. The method of claim 8, wherein the at least part of the reformate stream is at least one of: (1) combusted to generate the heat, or (2) converted by hydrogen-to-electricity conversion to generate the heat, thereby providing the heat for the auto-thermal reforming process.

10. The method of claim 1, wherein undecomposed ammonia in the reformate stream is removed by an ammonia filter, wherein the ammonia filter comprises an adsorbent, a membrane separation module, or an ammonia scrubber.

11. The method of claim 1, wherein a pressure swing adsorption (PSA) module is used to remove nitrogen from the reformate stream.

12. The method of claim 1, wherein (b) comprises directing the ammonia to a first reformer to generate the reformate stream; wherein the method comprises combusting the reformate stream in a combustion heater to heat a second reformer; and directing additional ammonia to the second reformer to generate additional hydrogen for the reformate stream, wherein a first portion of the reformate stream is combusted to heat the second reformer.

13. The method of claim 1, wherein (b) comprises directing the ammonia to a reformer at an ammonia flow rate to generate the reformate stream, wherein the method further comprises:

combusting a first portion of the reformate stream with oxygen at an oxygen flow rate in a combustion heater to heat the reformer; and processing a second portion of the reformate stream in a hydrogen processing module; and based at least in part on a stimulus, performing one or more of:
i. changing the ammonia flow rate;
ii. changing a percentage of the reformate stream that is the first portion of the reformate stream;
iii. changing a percentage of the reformate stream that is the second portion of the reformate stream; or
iv. changing the oxygen flow rate.

14. The method of claim 1, wherein (b) comprises directing the ammonia to a reformer at an ammonia flow rate to generate the reformate stream, wherein the method further comprises:

combusting a first portion of the reformate stream with oxygen at an oxygen flow rate in a combustion heater to heat the reformer;

processing a second portion of the reformate stream in a hydrogen processing module;

measuring a temperature in the reformer or the combustion heater; and based at least in part on the measured temperature being outside of a target temperature range of the reformer or the combustion heater, performing one or more of:
i. changing the ammonia flow rate;
ii. changing the oxygen flow rate;
iii. changing a percentage of the reformate stream that is the second portion of the reformate stream;
iv. changing a percentage of the reformate stream that is the first portion of the reformate stream; or
v. changing a percentage of the reformate stream that is directed out of the combustion heater.

15. A method of ammonia decomposition comprising:
(a) providing a catalyst, comprising:
   a support comprising alumina and a layer adjacent to the support, wherein the layer comprises the support doped with an oxide of at least one of an alkali metal and a rare earth metal;
   wherein the layer comprises aluminum (Al), cerium (Ce), and lanthanum (La), wherein the alkali metal is K or Cs; and
   one or more active metals adjacent to the layer, wherein the one or more active metals comprise Ru, Pt, or Pd;
   wherein the layer comprises a molar ratio of K or Cs to the one or more active metals comprising at least about 1:2 and not more than about 6:1;
   wherein the concentration of the one or more active metals is at least about 0.1, and not more than about 15 wt %; and
(b) bringing the catalyst in contact with ammonia at a temperature of at least about 400° C. and not more than about 700° C. to generate a reformate stream comprising hydrogen and nitrogen at an ammonia conversion efficiency of at least about 70% and at most about 99.9%.

16. The method of claim 15, wherein the layer comprises theta alumina (θ-alumina) or gamma alumina (γ-alumina).

17. The method of claim 15, wherein the layer comprises La at a concentration of at least about 1 and not more than about 20 mol % with respect to the layer and support.

18. The method of claim 15, wherein a molar ratio of La and Ce comprises at least about 50:50 and not more than about 90:10.

19. The method of claim 15, wherein the one or more active metals is Ru, and a concentration of the Ru comprises at least about 0.5 wt % and not more than about 5 wt % with respect to a weight of the catalyst.

20. The method of claim 15, wherein the ammonia is brought in contact with the catalyst at a space velocity of at least about 1 and not more than about 100 liters of ammonia per hour per gram of catalyst.

21. The method of claim 15, further comprising generating electricity by providing hydrogen produced by the catalyst to at least one fuel cell, wherein the at least one fuel cell comprises a Proton Exchange Membrane Fuel Cell (PEMFC), a Solid Oxide Fuel Cell (SOFC), a Molten Carbonate Fuel Cell (MCFC), an Alkaline Fuel Cell (AFC), an Alkaline Membrane Fuel Cell (AMFC), or a Phosphoric Acid Fuel Cell (PAFC).

22. The method of claim 15, wherein contacting the catalyst with ammonia to generate the reformate stream is an auto-thermal reforming process so that at least part of the reformate stream provides heat for the auto-thermal reforming process.

23. The method of claim 22, wherein the at least part of the reformate stream is at least one of: (1) combusted to generate the heat, or (2) converted by hydrogen-to-electricity conversion to generate the heat, thereby providing the heat for the auto-thermal reforming process.

24. The method of claim 15, wherein undecomposed ammonia in the reformate stream is removed by an ammonia filter, wherein the ammonia filter comprises an adsorbent, a membrane separation module, or an ammonia scrubber.

25. The method of claim 15, wherein a pressure swing adsorption (PSA) module is used to remove nitrogen from the reformate stream.

26. The method of claim 15, wherein (b) comprises directing the ammonia to a first reformer to generate the reformate stream; wherein the method comprises combusting the reformate stream in a combustion heater to heat a second reformer; and directing additional ammonia to the second reformer to generate additional hydrogen for the reformate stream, wherein a first portion of the reformate stream is combusted to heat the second reformer.

27. The method of claim 15, wherein (b) comprises directing the ammonia to a reformer at an ammonia flow rate to generate the reformate stream, wherein the method further comprises:

combusting a first portion of the reformate stream with oxygen at an oxygen flow rate in a combustion heater to heat the reformer; and processing a second portion of the reformate stream in a hydrogen processing module; and based at least in part on a stimulus, performing one or more of:
i. changing the ammonia flow rate;
ii. changing a percentage of the reformate stream that is the first portion of the reformate stream;
iii. changing a percentage of the reformate stream that is the second portion of the reformate stream; or
iv. changing the oxygen flow rate.

28. The method of claim 15, wherein (b) comprises directing the ammonia to a reformer at an ammonia flow rate to generate the reformate stream, wherein the method further comprises:

combusting a first portion of the reformate stream with oxygen at an oxygen flow rate in a combustion heater to heat the reformer;

processing a second portion of the reformate stream in a hydrogen processing module;

measuring a temperature in the reformer or the combustion heater; and based at least in part on the measured temperature being outside of a target temperature range of the reformer or the combustion heater, performing one or more of:
i. changing the ammonia flow rate;
ii. changing the oxygen flow rate;
iii. changing a percentage of the reformate stream that is the second portion of the reformate stream;
iv. changing a percentage of the reformate stream that is the first portion of the reformate stream; or
v. changing a percentage of the reformate stream that is directed out of the combustion heater.

29. A method of ammonia decomposition comprising:
(a) providing a catalyst, comprising:
a support comprising alumina and a layer adjacent to the support, wherein the layer comprises the support doped with an oxide of at least one of an alkali metal and a rare earth metal;
wherein the layer comprises aluminum (Al), cerium (Ce), and lanthanum (La); and
one or more active metals adjacent to the layer, wherein the one or more active metals comprise Ru, Pt, or Pd;
wherein a concentration of the one or more active metals is at least about 0.1, and not more than about 15 wt %; and
(b) bringing the catalyst in contact with ammonia at a temperature of at least about 400° C. and not more than about 700° C. to generate a reformate stream comprising hydrogen and nitrogen at an ammonia conversion efficiency of at least about 70% and at most about 99.9%,
wherein the ammonia is brought in contact with the catalyst at a space velocity of at least about 1 and not more than about 100 liters of ammonia per hour per gram of catalyst.

30. The method of claim 29, wherein the layer comprises theta alumina (θ-alumina) or gamma alumina (γ-alumina).

31. The method of claim 29, wherein the layer comprises La at a concentration of at least about 1 and not more than about 20 mol % with respect to the layer and support.

32. The method of claim 29, wherein a molar ratio of La and Ce comprises at least about 50:50 and not more than about 90:10.

33. The method of claim 29, wherein the alkali metal is K or Cs, and the layer comprises a molar ratio of K or Cs to the one or more active metals comprising at least about 1:2 and not more than about 6:1.

34. The method of claim 29, wherein the one or more active metals is Ru, and a concentration of the Ru comprises at least about 0.5 wt % and not more than about 5 wt % with respect to the weight of the catalyst.

35. The method of claim 29, further comprising generating electricity by providing hydrogen produced by the catalyst to at least one fuel cell, wherein the at least one fuel cell comprises a Proton Exchange Membrane Fuel Cell (PEMFC), a Solid Oxide Fuel Cell (SOFC), a Molten Carbonate Fuel Cell (MCFC), an Alkaline Fuel Cell (AFC), an Alkaline Membrane Fuel Cell (AMFC), or a Phosphoric Acid Fuel Cell (PAFC).

36. The method of claim 29, wherein contacting the catalyst with ammonia to generate the reformate stream is an auto-thermal reforming process so that at least part of the reformate stream provides heat for the auto-thermal reforming process.

37. The method of claim 36, wherein the at least part of the reformate stream is at least one of: (1) combusted to generate the heat, or (2) converted by hydrogen-to-electricity conversion to generate the heat, thereby providing the heat for the auto-thermal reforming process.

38. The method of claim 29, wherein undecomposed ammonia in the reformate stream is removed by an ammonia filter, wherein the ammonia filter comprises an adsorbent, a membrane separation module, or an ammonia scrubber.

39. The method of claim 29, wherein a pressure swing adsorption (PSA) module is used to remove nitrogen from the reformate stream.

40. The method of claim 29, wherein (b) comprises directing the ammonia to a first reformer to generate the reformate stream; wherein the method comprises combusting the reformate stream in a combustion heater to heat a second reformer; and directing additional ammonia to the second reformer to generate additional hydrogen for the reformate stream, wherein a first portion of the reformate stream is combusted to heat the second reformer.

41. The method of claim 29, wherein (b) comprises directing the ammonia to a reformer at an ammonia flow rate to generate the reformate stream, wherein the method further comprises:
combusting a first portion of the reformate stream with oxygen at an oxygen flow rate in a combustion heater to heat the reformer; and
processing a second portion of the reformate stream in a hydrogen processing module; and based at least in part on a stimulus, performing one or more of:
v. changing the ammonia flow rate;
ii. changing a percentage of the reformate stream that is the first portion of the reformate stream;
iii. changing a percentage of the reformate stream that is the second portion of the reformate stream; or
iv. changing the oxygen flow rate.

42. The method of claim 29, wherein (b) comprises directing the ammonia to a reformer at an ammonia flow rate to generate the reformate stream, wherein the method further comprises:
combusting a first portion of the reformate stream with oxygen at an oxygen flow rate in a combustion heater to heat the reformer;
processing a second portion of the reformate stream in a hydrogen processing module;
measuring a temperature in the reformer or the combustion heater; and
based at least in part on the measured temperature being outside of a target temperature range of the reformer or the combustion heater, performing one or more of:
v. changing the ammonia flow rate;
ii. changing the oxygen flow rate;
iii. changing a percentage of the reformate stream that is the second portion of the reformate stream;
iv. changing a percentage of the reformate stream that is the first portion of the reformate stream; or
v. changing a percentage of the reformate stream that is directed out of the combustion heater.

43. A method of ammonia decomposition comprising:
(a) providing a catalyst, comprising:
a support comprising alumina and a layer adjacent to the support, wherein the layer comprises the support doped with an oxide of at least one of an alkali metal and a rare earth metal;
wherein the layer comprises aluminum (Al), cerium (Ce), and lanthanum (La); and
one or more active metals adjacent to the layer, wherein the one or more active metals comprise Ru, Pt, or Pd;

wherein a concentration of the one or more active metals is at least about 0.1, and not more than about 15 wt %; and (b) bringing the catalyst in contact with ammonia at a temperature of at least about 400° C. and not more than about 700° C. to generate a reformate stream comprising hydrogen and nitrogen at an ammonia conversion efficiency of at least about 70% and at most about 99.9%, wherein (b) comprises directing the ammonia to a first reformer to generate the reformate stream; wherein the method comprises combusting the reformate stream in a combustion heater to heat a second reformer; and directing additional ammonia to the second reformer to generate additional hydrogen for the reformate stream, wherein a first portion of the reformate stream is combusted to heat the second reformer.

44. The method of claim 43, wherein the first reformer is heated using at least one of an electrical heater or combustion of the reformate stream.

45. A method of ammonia decomposition comprising:
(a) providing a catalyst, comprising:
a support comprising alumina and a layer adjacent to the support, wherein the layer comprises the support material doped with an oxide of at least one of an alkali metal and a rare earth metal;
wherein the layer comprises aluminum (Al), cerium (Ce), and lanthanum (La); and
one or more active metals adjacent to the layer, wherein the one or more active metals comprise Ru, Pt, or Pd;
wherein the concentration of the one or more active metals is at least about 0.1, and not more than about 15 wt %; and (b) bringing the catalyst in contact with ammonia at a temperature of at least about 400° C. and not more than about 700° C. to generate a reformate stream comprising hydrogen and nitrogen at an ammonia conversion efficiency of at least about 70% and at most about 99.9%, wherein (b) comprises directing the ammonia to a reformer at an ammonia flow rate to generate the reformate stream, wherein the method further comprises:
combusting a first portion of the reformate stream with oxygen at an oxygen flow rate in a combustion heater to heat the reformer; and
processing a second portion of the reformate stream in a hydrogen processing module; and based at least in part on a stimulus, performing one or more of:
i. changing the ammonia flow rate;
ii. changing a percentage of the reformate stream that is the first portion of the reformate stream;
iii. changing a percentage of the reformate stream that is the second portion of the reformate stream; or
iv. changing the oxygen flow rate.

46. The method of claim 45, wherein the stimulus comprises:
x. a change in an amount of the hydrogen used by the hydrogen processing module;
y. a temperature of the reformer being outside of a target temperature range; or
z. a change in an amount or concentration of ammonia in the reformate stream.

47. The method of claim 46, wherein the change in an amount of the hydrogen used by the hydrogen processing module is a projected change in the amount of the hydrogen used by the hydrogen processing module.

48. The method of claim 45, wherein the hydrogen processing module comprises a fuel cell and the fuel cell provides an anode off-gas comprising hydrogen to the combustion heater.

* * * * *